(12) United States Patent
Edson

(10) Patent No.: US 9,420,017 B2
(45) Date of Patent: Aug. 16, 2016

(54) INFORMATION ORGANIZATION, MANAGEMENT, AND PROCESSING SYSTEM AND METHODS

(71) Applicant: Kuhoo Edson, San Jose, CA (US)

(72) Inventor: Kuhoo Edson, San Jose, CA (US)

( * ) Notice: Subject to any disclaimer, the term of this patent is extended or adjusted under 35 U.S.C. 154(b) by 0 days.

(21) Appl. No.: 14/595,092

(22) Filed: Jan. 12, 2015

(65) Prior Publication Data

US 2015/0200945 A1 Jul. 16, 2015

Related U.S. Application Data

(60) Provisional application No. 61/925,737, filed on Jan. 10, 2014.

(51) Int. Cl.
| | |
|---|---|
| *G06F 7/04* | (2006.01) |
| *G06F 17/30* | (2006.01) |
| *H04N 7/16* | (2011.01) |
| *H04L 29/06* | (2006.01) |
| *G06F 21/62* | (2013.01) |

(52) U.S. Cl.
CPC .............. *H04L 65/403* (2013.01); *G06F 17/30* (2013.01); *G06F 21/62* (2013.01); *G06F 21/6218* (2013.01); *H04L 63/102* (2013.01); *G06F 2221/2147* (2013.01)

(58) Field of Classification Search
CPC . G06F 21/6245; G06F 21/6218; G06F 21/10; G06F 21/62; H04L 63/102
USPC ............................................................ 726/28
See application file for complete search history.

(56) References Cited

U.S. PATENT DOCUMENTS

| | | | | |
|---|---|---|---|---|
| 8,256,014 | B2 * | 8/2012 | Kori ........................ | G06F 21/10 370/469 |
| 2012/0167167 | A1 * | 6/2012 | Kruger .................... | G06F 12/00 726/1 |
| 2012/0198564 | A1 * | 8/2012 | Abuelsaad .......... | G06F 21/6218 726/28 |
| 2012/0291133 | A1 * | 11/2012 | Nagpal ............... | G06F 21/6218 726/26 |
| 2012/0297188 | A1 * | 11/2012 | van der Linden ..... | G06F 21/602 713/165 |

* cited by examiner

*Primary Examiner* — Ali Abyaneh
*Assistant Examiner* — Stephen Sanders
(74) *Attorney, Agent, or Firm* — William C. Milks, III

(57) ABSTRACT

A cloud-based system is disclosed including at least one local client device communicatively coupled, via an intermediate network, with a server device having an information processing, organization, and management engine, and further including distributed local and cloud databases spread across separately owned user accounts. The information processing, organization, and management engine includes one or more information processing, organization, and management blocks responsive to selections by the owner of content and other users of the system to control access to and use of content by users of the system.

5 Claims, 64 Drawing Sheets

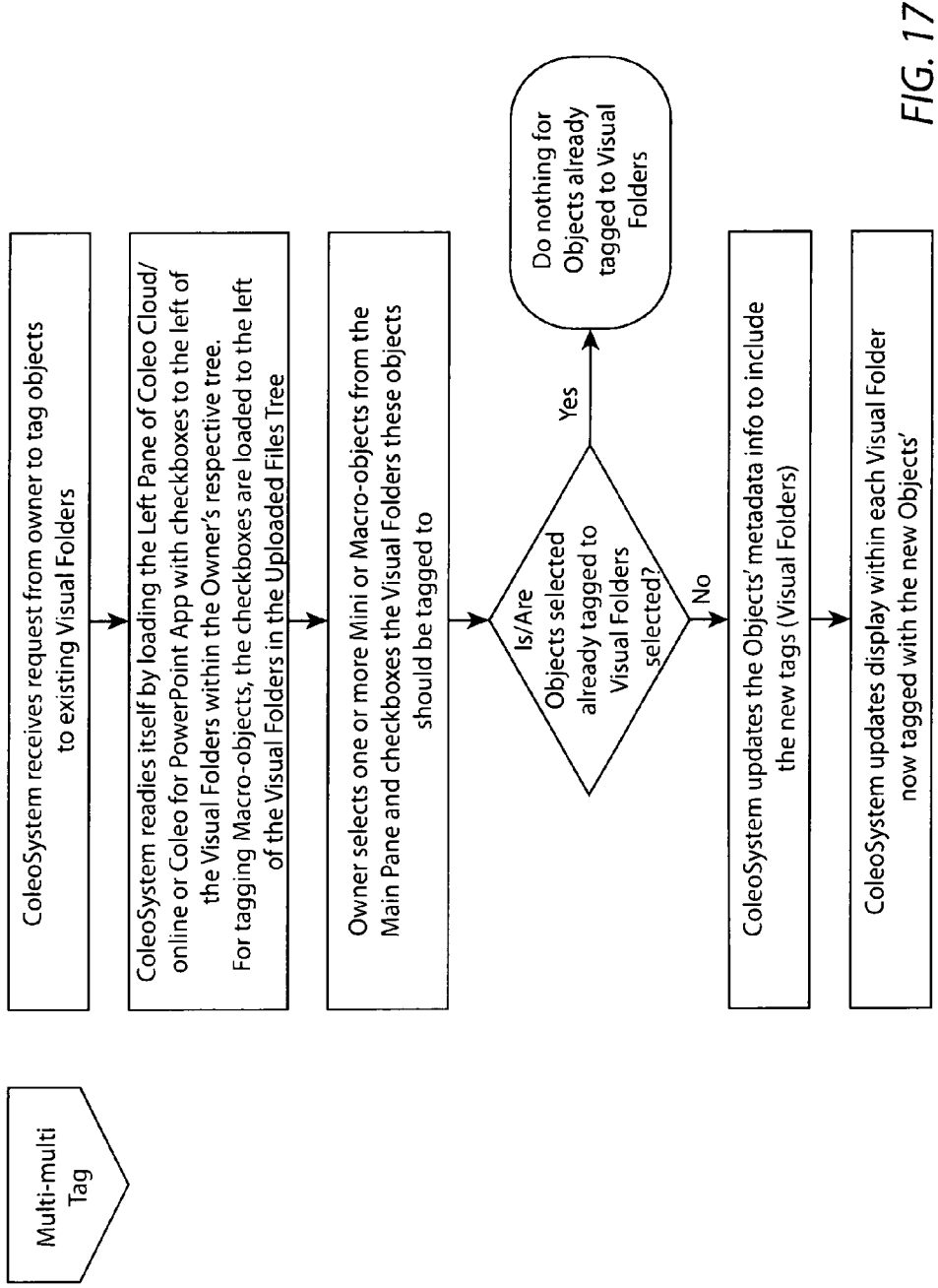
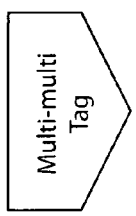
FIG. 17

FIG. 16, 17 (COPY AND MULTI TAG)

(COPY AND MULTI TAG)

FIG. 33

DESKTOP COLEO INTERFACE (INITIAL LOADING)

Desktop Coleo Interface

THINGS TO DO
- Get started
- Add files

⌐ 🖻 MY WORKSPACE
  ⌐ 🖻 MY VISUAL CONTENT
      🖻 UNTAGGED (1)
  ⌐ 🖻 MY FILES
      🖻 CARS (0) (1)
      🖻 UNTAGGED (1)
⌐ 🖻 TESTY TESTER'S WORKSPACE
  ⌐ 🖻 TESTY FILES
      🖻 CARS (0) (1)

*FIG. 34*

DESKTOP COLEO > PREFERENCES > HOW TO HANDLE SYNCING CONTENT

Desktop Coleo Preferences                                    ✕

| General | Account Info | File Syncing | Modified Content |

Check Duplicates ⓘ
Do you want to process duplicates immediately?
⦿ Later
○ Now

Privacy Level ⓘ
Set the privacy level for any new contact (slides or presentations)
○ Public
○ Private
⦿ Confidential Deleted Content ⓘ
If you have any deleted content (slides or presentations), the content may be used by other people in your connected Workspaces.

Do you want to delete only within your Coleo workspace (My Workspace) or Everywhere?

Note:
Deleting from "My workspace" deletes the content only for you; Everyone else will get the option to copy the content to their workspace.
Deleting "Everywhere" removes the content from all the Connected Workspaces where they have been used. This option is useful when you need to retract confidential or incorrect information.
⦿ My workspace
○ Everywhere

[Cancel]                                              [Ok]

FIG. 38

FIG. 45   FIG. 16, 17 (COPY AND MULTI TAG)

FIG. 46

SMART TAGGING - RULES SET TO APPLY TO CONTENT BEING UPLOADED OR ALREADY IN WORKSPACE coleo  HOME  | MY WORKSPACE |  MY COMMUNITY   APP DOWNLOADS

| Enter keywords | | CATEGORIZATION RULES | |
|---|---|---|---|
| ▼THINGS TO DO | | ☐ | |
| ▪ Get started | | ☐ Rule 1 | Active |
| ▪ Add files | | ☐ Rule 2 | Inactive |
| ▪ Tag content | | ☐ Rule 3 | Active |
| ▪ Download files | | ☐ Rule 4 | Active |
| ▪ Create new | | ☐ Rule 5 | Inactive |
| ▪ Manage access | | ☐ Rule 6 | Inactive |
| ▪ Check for duplicates | | ☐ Rule 7 | Active |
| ▽ MY WORKSPACE | | ☐ Rule 8 | Inactive |
| △ MY VISUAL CONTENT | | ☐ Rule 9 | Inactive |
| △ MY FILES | | | |
| ▽ KUHOO EDSON'S W... | | | |
| △ KUHOO'S FILES | | | |
| △ TESTY TESTER'S WO... | | | |
| △ HIDDEN | | | |

FIG. 47

SMART TAGGING - ADD NEW RULE, STEP 1 coleo  HOME  [MY WORKSPACE]  MY COMMUNITY  APP DOWNLOADS    |  Tina

▼ THINGS TO DO
- Get started
- Add files
- Tag content
- Download files
- Create new
- Manaage access
- Check for duplicates ▼ MY WORKSPACE
▷ MY VISUAL CONTENT
▷ MY FILES
▷ KUHOO EDSON'S W...
▷ KUHOO'S FILES
▷ TESTY TESTER'S WO...

CATEGORIZATION RULES

| ☐ Rule 1 | Active |
| ☐ Rule 2 | Inactive |
| ☐ Rule 3 | Active |
| ☐ Rule 4 | Active |
| ☐ Rule 5 | Inactive |
| ☐ Rule 6 | Inactive |
| ☐ Rule 7 | Active |
| ☐ Rule 8 | Inactive |
| ☐ Rule 9 | Inactive |

[NewRule[05/22/2014]]  I'm done

▼ Step 1 - Content to categorize
  ○ Uploaded Files
    ☐ audio
    ☐ video
    ☐ images
    ☐ pdf
    ☐ Word
    ☐ Excel
    ☐ PowerPoint
  ○ Custom Visual Presentations
  ○ Visual Slides
▷ Step 2 - Categorization based u
▷ Step 3 - Exceptions
▷ Step 4 - Categorize to
▷ Step 5 - Options

FIG. 48

SMART TAGGING - ADD NEW RULE, STEP 4

| coleo | HOME | MY WORKSPACE | MY COMMUNITY | APP DOWNLOADS | | | | Tina |

Enter keywords

▼ THINGS TO DO
- Get started
- Add files
- Tag content
- Download files
- Create new
- Manage access
- Check for duplicates ▼ ♁ MY WORKSPACE
▷ MY VISUAL CONTENT
▷ MY FILES
▼ ♁ KUHOO EDSON'S W...  ≡
▷ KUHOO'S FILES
▷ ♁ TESTY TESTER'S WO... ≡

CATEGORIZATION RULES

| ☐ Rule 1 | Active |
| ☐ Rule 2 | Inactive |
| ☐ Rule 3 | Active |
| ☐ Rule 4 | Active |
| ☐ Rule 5 | Inactive |
| ☐ Rule 6 | |
| ☐ Rule 7 | Active |
| ☐ Rule 8 | Inactive |
| ☐ Rule 9 | Inactive |

NewRule[05/22/2014] I'm done
▷ Step 1 - Content to categorize
▷ Step 2 - Categorization based u
▷ Step 3 - Exceptions
▼ Step 4 - Categorize to
  ▼ ☑ MY WORKSPACE  ≡
  ◁ ☐ level 22rr (14)
      ☐ level 1 (145)
      ☐ jj (0)
      ☐ ttt (1)
  ▼ ♁ DEVELOPERS GROUP  ≡
  ◁ ☐ level 22rr (14)
      ☐ level 1 (145)
      ☐ jj (0)
      ☐ ttt (1)
▷ Step 5 - Options

BUSINESS SOCIAL - TAKING ACTIONS ON REPORTS (WHO IS USING WHAT)

| Used Content | | | | Run on: [Date] | Page 1 of 20 | |
|---|---|---|---|---|---|---|
| Content Type | Modified Date | Content Title | Used By | # of Times Used | Actions | |
| Adobe Acrobat page | 2014-01-10 | My PDF Title | a@b.com | 3 | [Revoke] | [Delete] |
| | | | bb@b.com | 1 | [Revoke] | |
| | | | cc@b.com | 5 | [Revoke] | |
| | | | dd@g.org | 1 | [Revoke] | |
| | | | Total: | 10 | | |
| Adobe Acrobat page | 2014-01-01 | Some other PDF Title | a@b.com | 2 | [Revoke] | [Delete] |
| | | | d@d.com | 111 | [Revoke] | |
| | | | Total: | 113 | | |
| Excel worksheet | 2014-01-01 | Finances | bb@b.com | 4 | [Revoke] | [Delete] |
| | | | dd@g.org | 7 | [Revoke] | |
| | | | Total: | 11 | | |
| Excel worksheet | 2014-05-10 | Finances - 2014 | bb@b.com | 99 | [Revoke] | [Delete] |
| | | | Total: | 99 | | |
| PowerPoint slide | 2014-03-01 | Slide A | bb@b.com | 3 | [Revoke] | [Delete] |
| | | | cc@b.com | 7 | [Revoke] | |
| | | | d@d.com | 5 | [Revoke] | |
| | | | e@f.com | 1 | [Revoke] | |
| | | | ea@f.com | 1 | [Revoke] | |
| | | | Total: | 17 | | |

MICRO-OBJECT EXTRACION - SAMPLE OF OBJECTS/PROPERTIES EXTRACTED FROM POWERPOINT SLIDES

| PowerPoint Micro-objects extracted and saved | PowerPoint Micro-objects extracted and saved | PowerPoint Micro-objects extracted and saved | PowerPoint Micro-objects extracted and saved |
|---|---|---|---|
| ActionSettings Property | Creator Property | Id Property | ShapeStyle Property |
| Adjustments Property | CustomerData Property | Left Property | SmartArt Property |
| AlternativeText Property | Fill Property | Line Property | SoftEdge Property |
| AnimaitonSettings Property | Glow Property | LinkFormat Property | Table Property |
| Application Property | GroupItems Property | | Tags Property |
| AutoShapeType Property | HasChart Property | LockAspectRatio Property | TextEffect Property |
| BackgroundStyle Property | HasSmartArt Property | MediaFormat Property | TextFrame Property |
| BlackWhiteMode Property | HasTable Property | Name Property | TextFrame2 Property |
| Callout Property | HasTextFrame Property | Nodes Property | ThreeD Property |
| Chart Property | Height Property | OLEFormat Property | Title Property |
| Child Property | HorizontalFlip Property | Parent Property | Top Property |
| | | ParentGroup Property | Type Property |
| ConnectionSiteCount Property | | PictureFormat Property | VerticalFlip Property |
| Connector Property | | | Vertices Property |
| ConnectorFormat Property | | PlaceholderFormat Property | Visible Property |
| | | Refleciton Property | Width Property |
| | | Rotation Property | |
| | | Shadow Property | ZOrderPosition Property |

FIG.58

INFORMATION ORGANIZATION, MANAGEMENT, AND PROCESSING SYSTEM AND METHODS

CROSS-REFERENCE TO RELATED PATENT APPLICATION

This application claims the benefit of U.S. Provisional Patent Application No. 61/925,737 filed on Jan. 10, 2014, entitled DOCUMENT PROCESSING SYSTEM AND METHODS, the disclosure of which is hereby incorporated herein in its entirety by this reference.

FIELD OF THE INVENTION

The present invention relates to document processing systems and methods. More particularly, the present invention is directed to an electronic information production and management system and methods to generate information from existing information and documents as well as new information and compile the generated information and create documents based on the compiled information.

DESCRIPTION OF THE PRIOR ART

With prior art applications such as box.com, Google Drive, dropbox.com, hightail.com and all other similar cloud file sharing applications, sharing of content is limited to files, and in some cases, folder-level content. In other words, the only information users can share amongst each other is a complete file or a folder containing complete files. Once the complete files or folder is shared with other users, the other users may access the file(s) and/or folder(s) which become available in their account. The content is typically not organized by users, and in most cases, multiple actions are required to determine the ownership of shared content. In addition, current file sharing applications employ the one-to-many technique where one user shares his/her content with multiple other users. What these systems lack is a technique of many-to-many sharing where users can share content collectively amongst themselves and access collectively shared content organized by the users.

SUMMARY OF THE INVENTION

Various examples in accordance with the present invention provide a cloud-based system comprising at least one local client device communicatively coupled via an intermediate network with a server device including an information processing, organization, and management engine, and further comprising distributed local and cloud databases spread across separately owned user accounts. The information processing, organization, and management engine comprises one or more information processing, organization, and management blocks.

By way of non-limiting examples in accordance with the present invention, the information processing, organization, and management engine comprises one or more of the following blocks: a Connected Workspaces Block to determine how an owner of information Macro-objects (presentations, spreadsheets, word processing documents, etc.), Mini-objects (content within the documents such as slides, pages, worksheets, etc.), and Micro-objects (e.g., information within the Mini-objects such as text, images, tables, charts, graphics, embedded video, embedded audio, etc.) shares content by granting other users secure access to the information and how the information is visually displayed for those who have access to that content and how they are able to use, manage, and manipulate the information and to organize and display available users with whom the owner may share his/her content; a Grant Access/Smart Sharing Block to connect the owner's workspace to another user's workspace; a Smart Security Block to allow the owner to apply security to Macro- and Mini-objects, to apply inheritance rules, to protect content which is marked confidential, to notify the owner when confidential information is re-shared, and to enable the owner to revoke access to another user who has access to the content via a re-share; a Make Content Non-Editable Block to determine how the owner may prevent a user from editing portions of a Macro- or Mini-object to which that user has been granted access by enabling an owner to mark portions of his/her Macro- or Mini-objects as uneditable by other users; a Smart Search Block to enable a user to find and access content across multiple distributed cloud-based user accounts or across an enterprise; a Display Search Results Block to determine how search results are displayed and how a user requests access to results to which he/she does not have access; a Find Similar Block to enable a user to search across connected workspaces or his/her enterprise to find content similar to his/her own content, including searching for an image within other content, and to replace his/her own content, in his/her own workspace or everywhere the content has been used, with content located during the search; a Smart Version Management Block to maintain versions of Macro- and Mini-objects as changed by any user who has been enabled to edit the Macro- and Mini-objects through permissions and to enable the owner of the content to rollback to any previous version, back to and including the original version, of a Mini-object that has been modified; a Smart Copy/Create New Block to enable a user to copy content owned by another user to his/her own workspace and maintain the provenance of a Mini-object including attribution to allow an original creator of content to be identified; a Smart Replace Block to enable the owner of Mini-objects to replace his/her Mini-objects with other Mini-objects of the same type and to propagate the replacement Mini-objects across all workspaces and within all Macro-objects that included the original Mini-objects; a Coleo for PowerPoint® Block to enable a user to access and use connected workspaces from the cloud or from his/her desktop directly from within PowerPoint® to access Macro- and Mini-objects to which he/she has been granted access within PowerPoint® to create new Macro-objects or modify existing Macro- and Mini-objects; a Desktop Coleo Block to control the way owned and shared content is synchronized to the owner's client device including synchronization of Macro- and Mini-objects and to enable a user to grant access to other users directly from the user's local database; a Synchronization Block to synchronize both Macro- and Mini-objects once the user is connected to the network; a Smart Delete Block to enable a user to delete his/her own Macro- and Mini-objects from either only his/her workspace, or everywhere those objects are used, including another user's Macro-objects in that other user's workspace; a Smart View Block to enable a user to view all uploaded Macro- and Mini-object content and have the ability to filter the uploaded content regardless of the folder in which the content resides; a Smart Categorization/Tagging Block to enable content to be categorized automatically based on user defined rules as the content is being uploaded to the user's workspace; a Smart Business Social Graph Block to enable persons who share content with each other to take advantage of their online business social communities to gain access to content to which they would not otherwise have access; a Manage Workspaces Block to enable users to manage and organize their connected workspaces in the cloud by hiding workspaces or adding workspaces to favorites; a Smart Statistics Block to enable statistics to be provided to the owner of content respecting use of the content; an Object Extraction Block to extract Macro- and Mini-objects as well as Micro-objects from within the Mini-objects; a Remove Duplicate Block to enable a user to identify and eliminate duplicate Mini-objects from within his/her Macro-objects, ensuring every Mini-object has only one copy existing in a user's workspace so when changes are made to that one copy, the changes are reflected within every Macro-object in which the Mini-object resides; and a Create New File Block to enable a user to mix-and-match Mini-objects from multiple workspaces across the distributed cloud databases from within the cloud interface to create new Macro-objects.

The present invention solves the following prior art shortcomings which users who want to share content deal with today:
- a) How information (entire files and within files) is shared and viewed
- b) How the shared information is maintained
- c) How the shared information is tracked
- d) How the shared information is controlled
- e) How the shared information is used to create new information
- f) How ownership is determined for shared information at file level or information within a file at document level The present invention provides new capabilities currently missing in the prior art including the following capabilities:
- g) How shared information is protected/secured
- h) The level at which the information is protected/secured
- i) How the shared information is used to search for similar information across databases/workspaces of multiple users
- j) How collaborators can use portions of the shared information from multiple sources/documents to create new information
- k) How enterprises in the business of licensing information for use can track and charge users who have used proprietary information without authorization
- l) How an enterprise can avert liability by searching for and removing incorrect/invalid/outdated/unauthorized/confidential information from every network node existing within the enterprise
- m) How owners of information can revert to any previous revision of their information and manage that decision across all network nodes that have used the information in their own content
- n) How owners and users of information can view and use all information to which they have access directly within third party applications used to create new information. This includes, but is not limited to: Microsoft® Office products; Adobe® Creative Suite Products; Google® Docs; and Apple® Pages, Numbers, Keynote, Docs to go.

BRIEF DESCRIPTION OF THE DRAWING

In the following description, for purposes of explanation, numerous specific examples are set forth in order to provide a thorough understanding of the present invention. It will be apparent, however, to persons skilled in the art that the present invention can be practiced without the specific details described by way of example. In other instances, structures and devices are shown in block diagram form only in order to avoid obscuring the present invention.

The present invention, in accordance with one or more various examples, is described in detail with reference to the following drawing figures. The drawing figures are provided for purposes of illustration only and merely depict examples in accordance with the present invention. These drawing figures are provided to facilitate the reader's understanding of the present invention and shall not be considered limiting of the breadth, scope, or applicability of the present invention. It should be noted that for clarity and ease of illustration the drawing figures are not necessarily made to scale.

Figure 1:
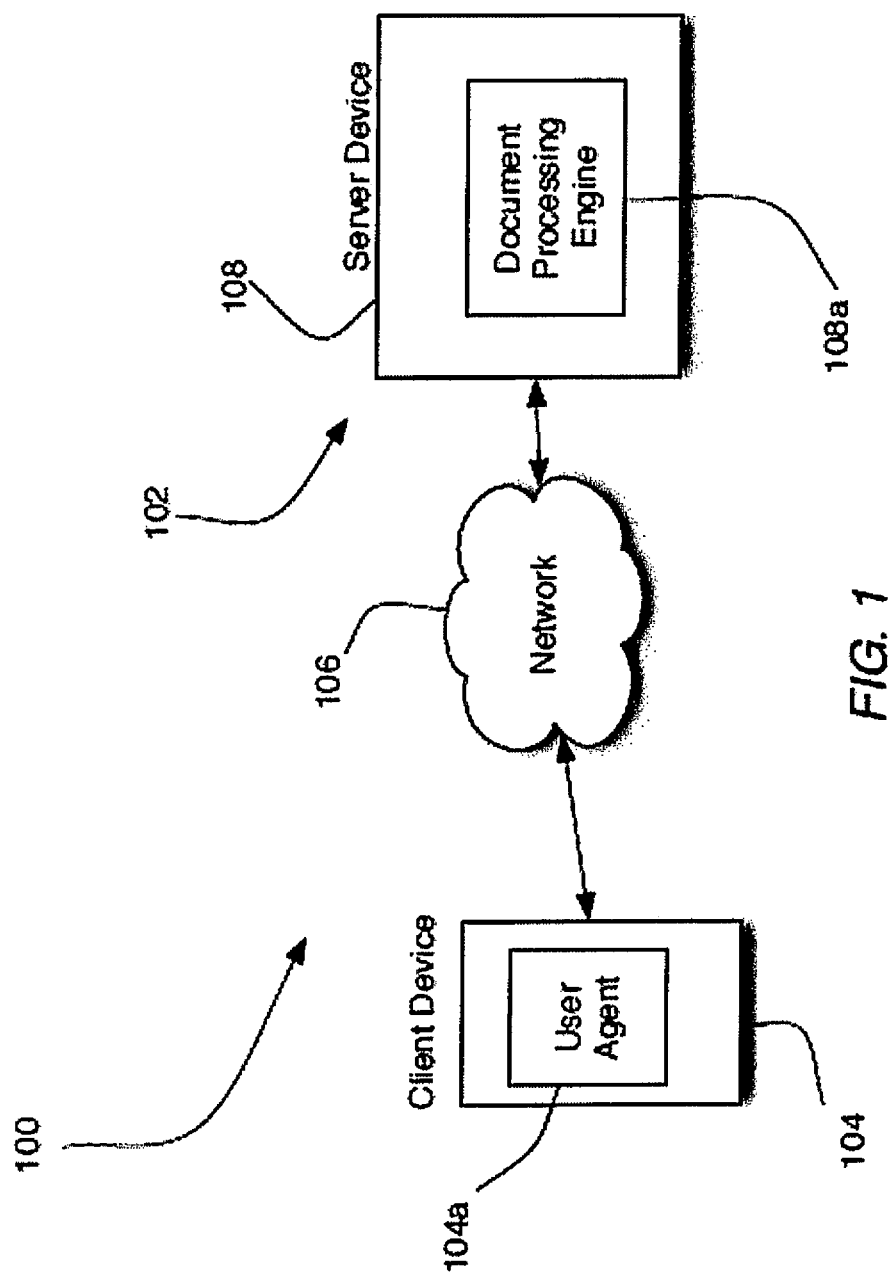
FIG. 1 shows a block diagram of a deployment scenario for a document and information processing system, in accordance with a non-limiting example of the present invention.

The drawing figures are not intended to be exhaustive or to limit the present invention to the precise form disclosed. It should be understood that the present invention can be practiced with modification and alteration, and that the present invention be limited only by the claims and the equivalents thereof.

DETAILED DESCRIPTION OF THE PREFERRED EXAMPLES

Reference in this specification to "an example" or "one example" means that a particular feature, structure, or characteristic described in connection with the example is included in at least one example of the present invention. The appearance of the phrase "in one example" in various places in the specification are not necessarily all referring to the same example, nor are separate or alternative examples mutually exclusive of other examples. Moreover, various features are described which may be exhibited by some examples and not by others. Similarly, various requirements may be described which are requirements for some examples but not other examples.

Moreover, although the following description contains many details for the purposes of illustration, persons skilled in the art will appreciate that many variations and/or alterations to said details are within the scope of the present invention. Similarly, although many of the features of the present invention are described in terms of each other, or in conjunction with each other, persons skilled in the art will appreciate that many of these features can be provided independently of other features. Accordingly, the following description of the present technology is set forth without any loss of generality to, and without imposing limitations upon, the present invention.

As used herein, the term "block" or "module" describes a given unit of functionality that can be performed in accordance with one or more examples of the present invention. A module might be implemented utilizing any form of hardware, software, or a combination thereof. For example, one or more processors, controllers, ASICs, PLAs, PALs, CPLDs, FPGAs, logical components, software routines, or other instrumentalities might be implemented to make up a module. In implementation, the various modules described herein might be implemented as discrete modules or the functions and features described can be shared in part or in total among one or more modules. In other words, as would be apparent to persons skilled in the art after reading this description, the various features and functionality described herein may be implemented in any given application and can be implemented in one or more separate or shared modules in various combinations and permutations. Even though various features or elements of functionality may be individually described or claimed as separate modules, persons skilled in the art will understand that these features and functionality can be shared among one or more common software and hardware elements, and such description shall not require or imply that separate hardware or software components are used to implement such features or functionality.

Where components or modules described in conjunction with the examples of the present invention are implemented in whole or in part using software, in one example, these software elements can be implemented to operate with a computing or processing module capable of carrying out the functionality described with respect thereto. After reading this description, it will become apparent to persons skilled in the relevant art how to implement the invention using other computing modules or architectures.

Broadly, examples of the present invention provide an information processing, organization, and management system and methods. As used herein the term "file" is to be construed broadly to include any type of document or information stored in office applications such as the Microsoft Office® or Adobe Creative Suite®. The term "document" may include a PowerPoint® file, an Excel file, a Word file, an image, a video, or an audio file, etc.

For descriptive convenience, the information processing, organization, and management system in accordance with the various examples of the present invention will be referred to as the "Coleo System" 100 in FIG. 1. FIG. 1 illustrates a cloud based implementation 102 for the Coleo System 100 in accordance with one example of the present invention.

The following is a glossary of terms to be used in describing the Coleo System 100 and the information processing, organization, and management methods implemented by said system in accordance with various examples of the present invention.

| Terms | Definition |
| --- | --- |
| Prior Art applications | All current cloud file sharing applications such as dropbox, box, Hightail, Sharefile, Google Drive, Microsoft Sharepoint, and any other applications that enable users to share files in the cloud and have corresponding desktop applications for offline operations |
| Macro-Object Type | Document received by the Coleo System to process (presentations, word processer files, spreadsheets, images, graphic files, audio and video files, compressed files, etc. |
| Mini-Object Type | Next level of hierarchy in a Macro-Object Type - pages inside a document<br>Example: slides, pages, worksheets, frames, layers, etc. |
| Micro-Objects Type | Next level of hierarchy in a Mini-Object Type - information on pages<br>Example: tables, charts, text boxes, images, embedded sound files, embedded video files, graphics, etc. |
| ColeoObject Handles | Boxes the ColeoSystem displays around Micro-Objects to indicate to a user that the object(s) is/are available to drag and drop onto custom Mini-Objects |
| Coleo Visual Organizational Hierarchy | Method employed by the Coleo System to organize Macro, Mini, and Micro-Objects for storing, displaying, and using. |

-continued

| Terms | Definition |
| --- | --- |
| Visual Folders | Folders where all Mini-Object Type content is visually available. The same content may belong to multiple folders without being copied and stored multiple times. |
| Owner | User that owns content stored in the Coleo Cloud or Coleo Desktop Applications |
| Share Designee | A user with whom an Owner shares folders, Macro-, Mini-, and/or Micro-objects. The Share Designee is assigned permissions to read, co-edit, and re-share confidential content. |
| Owner's Connected Workspaces | A method of displaying all users who have shared content with each other and have accepted the sharing of content amongst each other. |
| Macro-Object Sharing | A Workspace Owner can share entire Macro-Objects (files or documents) |
| Locked Mini-Objects | A Workspace Owner may have used shared Mini-Objects as to which the Owner has since revoked access. Any Macro-Object a Share Designee created using these Locked Mini-Objects will still contain these Mini-Objects, but they will be designated with a lock icon. Additionally, upon being loaded, the notification area will show the message: "WARNING: This Macro-object contains Mini-objects to which you no longer have access, which are designated by the lock icon. If you remove a Mini-object with the lock icon, they cannot be added back to the Macro-object." The Coleo System enables Share Designees to copy the locked Mini-Objects to their own workspace. |
| Coleo Tree Pane | A pane added to PowerPoint® to display the Owner's workspace tree. Available only in the PowerPoint® Add-on |
| Coleo ColeoObjects Pane | A pane directly to the right of the Coleo Tree Pane added to PowerPoint® to display the Coleo Objects within the Visual Folders in the Coleo Tree Pane. Available only in the PowerPoint® Add-on |
| Collections | Components of information management and organization methods used to collect specific information regarding a piece of content - Macro-, Mini-, Micro-objects. |

Referring again to FIG. 1, in accordance with one non-limiting example of the present invention, the Coleo System 100 comprises a client device 104 communicatively coupled with a server device 108 via an intermediate network 106. In one example, the network 106 may comprise the Internet, a wide area network (WAN), metropolitan area network (MAN), local area network (LAN), telephone networks, and/or a combination of these and other networks (wired, wireless, public, private, or otherwise).

In one example, the server device 108 may include a digital data processing apparatus of the type commercially available in the marketplace suitable for operation as described herein, as adapted in accordance with the teachings hereof. Although the server device 108 may typically be implemented in a server-class computer, such as a minicomputer, it may also be implemented in a desktop computer, workstation, laptop computer, tablet computer, PDA, mobile phone, car mapping device, or other suitable apparatus (again, as adapted in accordance with the teachings hereof).

The server device 108 also comprises central processing, memory, storage and input/output units and other constituent components (not shown) of the type conventional in the art that are configured in accordance with the teachings hereof by a document processing engine 108a.

Although only a single server device 108 is depicted and described here, it will be appreciated by persons skilled in the art that other examples may have greater numbers of server devices disposed near and/or far from one another, colocated behind one or more common firewalls or otherwise. Those other server devices may differ in architecture and operation from that shown and described here and/or from each other, all consistent with the teachings hereof.

The client device 104 may include a mobile phone, a laptop computer, a tablet computer, a personal digital assistant (PDA), or other digital data processing apparatus of the type that is commercially available in the marketplace and that is suitable for operation as described herein, or as adapted in accordance with the teachings hereof. In one example, the client device 104 may be provisioned with a user agent 104*a*, e.g., a browser, whereby the client device 104 may access the document processing engine 108*a*.

Figure 2:
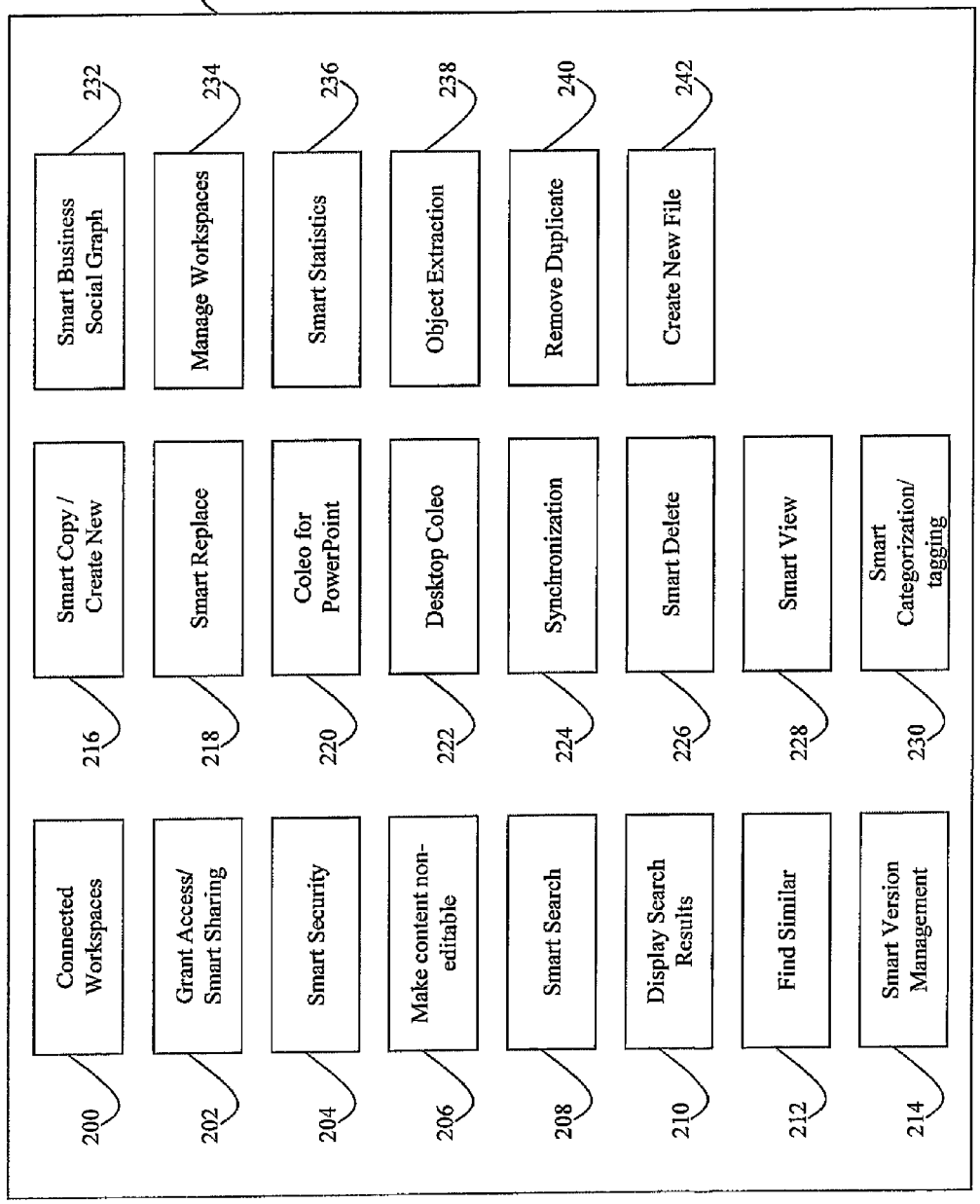
FIG. 2 shows a high-level functional block diagram of various components of the document and information processing system in accordance with one non-limiting example of the present invention.

FIG. 2 illustrates the components of the document processing engine 108*a*, in accordance with one non-limiting example of the present invention. As shown, the information processing, organization, and management engine 108*a* comprises a Connected Workspaces Block 200; a Grant Access/Smart Sharing Block 202; a Smart Security Block 204; a Make Content Non-Editable Block 206; a Smart Search Block 208; a Display Search Results Block 210, a Find Similar Block 212; a Smart Version Management Block 214; a Smart Copy/Create New Block 216; a Smart Replace Block 218; a Coleo for PowerPoint® Block 220; a Desktop Coleo Block 222; a Synchronization Block 224; a Smart Delete Block 226; a Smart View Block 228; a Smart Categorization/Tagging Block 230; a Smart Business Social Graph Block 232; a Manage Workspaces Block 234; a Smart Statistics Block 236; an Object Extraction Block 238; a Remove Duplicate Block 240; and a Create New File Block 242. The functions and operations of each of the aforesaid components/blocks will become apparent from the description below.

The Connected Workspaces Block 200 provides a functionality that determines how owners of information Macro-objects (presentations, spreadsheets, word processing documents, etc.), Mini-objects (the content within the documents such as slides, pages, worksheets, etc.), and Micro-objects (information within the Mini-objects such as text, images, tables, charts, graphics, embedded video, embedded audio, etc.) share the content by granting other users secure access to the information and how the information is visually displayed for those who have access to that content and how they are able to use, manage, and manipulate the information using the information management method in accordance with the present invention. This also creates a new approach to organizing and displaying available users with whom the owner may share his/her content. Prior art cloud file sharing applications, as defined in the glossary, only enable sharing of complete documents and do not organize shared documents by owner, preventing users from quickly determining ownership of content that is shared with them. Also, prior art applications provide their customers an email-like interface where they do not have a graphical or textual list of all users with whom they have shared before. Their customers have to instead type in email addresses every single time they want to share content with other users.

In one example, once the owner has instantiated the Grant Access/Smart Sharing Block 202, the following steps are performed to connect the owner's workspace to the Share Designee's workspace.
1. A request is sent to an API containing the ID(s) of the selected content/multiple contents/Visual Folder(s), the USERIDs to whom access is being granted, and the permission level (read and/or edit), and the parentID of the selected content.
2. A search is performed for the ID of the selected content in all collections to identify the type of content selected.
3. A check of a UserID database is performed to determine if any of the UserIDs already have existing access/permission to one or more of the pieces of content in the appropriate collections.
4. If the UserID does not exist for a particular collection, the UserID is added to the database.
5. The user permission is updated so the UserID sent in the request is added to UserID property of user permissions, and the permission level property is updated to grant permission.
6. The users corresponding to the UserIDs are notified of their permission to access the new content.

In accordance with one non-limiting example, if this is the first time the owner has granted access to the user in order to connect workspaces with the user, the user will be asked to accept the request to connect workspaces with the owner. Once accepted, the owner's workspace will be loaded into the user's workspace and will include only content to which access has been granted, based on privacy rules defined in the Smart Security Block 204 as will be described below.

If the user's workspace was already connected to the owner's workspace, the owner's workspace is loaded into the user's workspace and will include only content to which access has been granted, based on the privacy rules as defined in the Smart Security Block 204 as will be described below.
7. The connected workspace may then be built and connected.

A request is sent to the API, containing the UserID for the logged-in user.
   All Visual Folders to which this user has access are located.
   A new list that contains all Visual Folders and objects for that user with access to Visual Folders is created.
   For each Visual Folder:
      The Visual Folder in the Visual Folders Collection is accessed.
      The tree structure for the accessed Visual Folders is fetched.
      The tree structure is then added to the List Visual Folder Trees
   A new list is created: Content Tree>that will contain all Macro-object to which the user has access.
   An action is performed to locate all Macro-objects from [corresponding Macro-object] Permission Collection where the UserID is equal to the ID of the logged user.
   For each Macro-object that is located, the following operations are performed:
      Get the TreeID from the object.
      Find the Visual Folders in the Visual Folders Collection where the Visual Folder ID is equal to the TreeID.
      Get the tree structure for this Visual Folder.
      Add the Macro-object and the tree structure for this Macro-object in the Macro-object list
   A tree object is created comprising:
      Tree list
      Visual Folder tree list
      Macro-object list
   A response is sent back containing this tree object.
   The tree structure may be displayed according to the following process:
      First, the tree will be built based upon the Visual Folder tree list.
      Then, for each Macro-object from the macro-object list, check if the Macro-object tree list tree structure is already built; if yes, add the Macro-object in the folder with ID equal to the TreeID from the Macro-object; otherwise, build the tree according to the Macro-object list tree structure.

List Mini-object tree structure.

Figure 3:
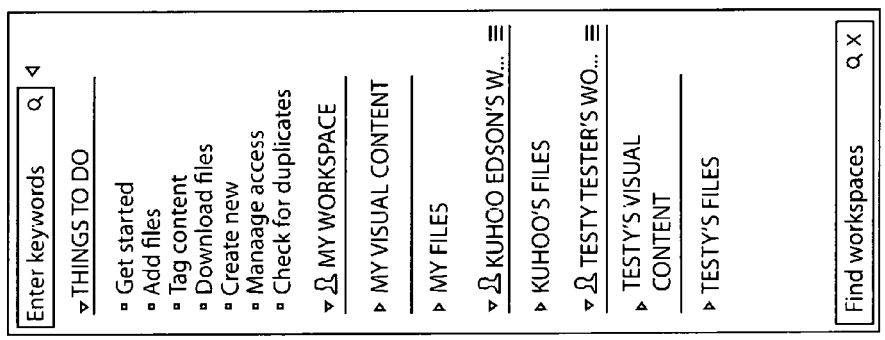
FIGS. 3-61 show flowcharts, user interfaces (UIs), and tables pertaining to various techniques for document processing in accordance with examples of the methods of the present invention.

FIG. 3 shows how connected workspaces may be displayed as performed by the Connected Workspaces Block 200 in accordance with one example of the present invention.

In one example, workspaces from multiple users are connected together based on how access was granted to the workspaces and how viewing and editing permissions were set. Once the owner of a workspace has populated the workspace with content (folders, documents, and content inside the documents), the owner can begin the process of sharing the content by granting access to other users.

In one example, when the owner of information wishes to grant access to My Visual Content Folders or My Files Folder in order for the folder and its content to be connected to the workspaces of one or more other users, the owner selects a "Grant Access" function.

Figure 4:
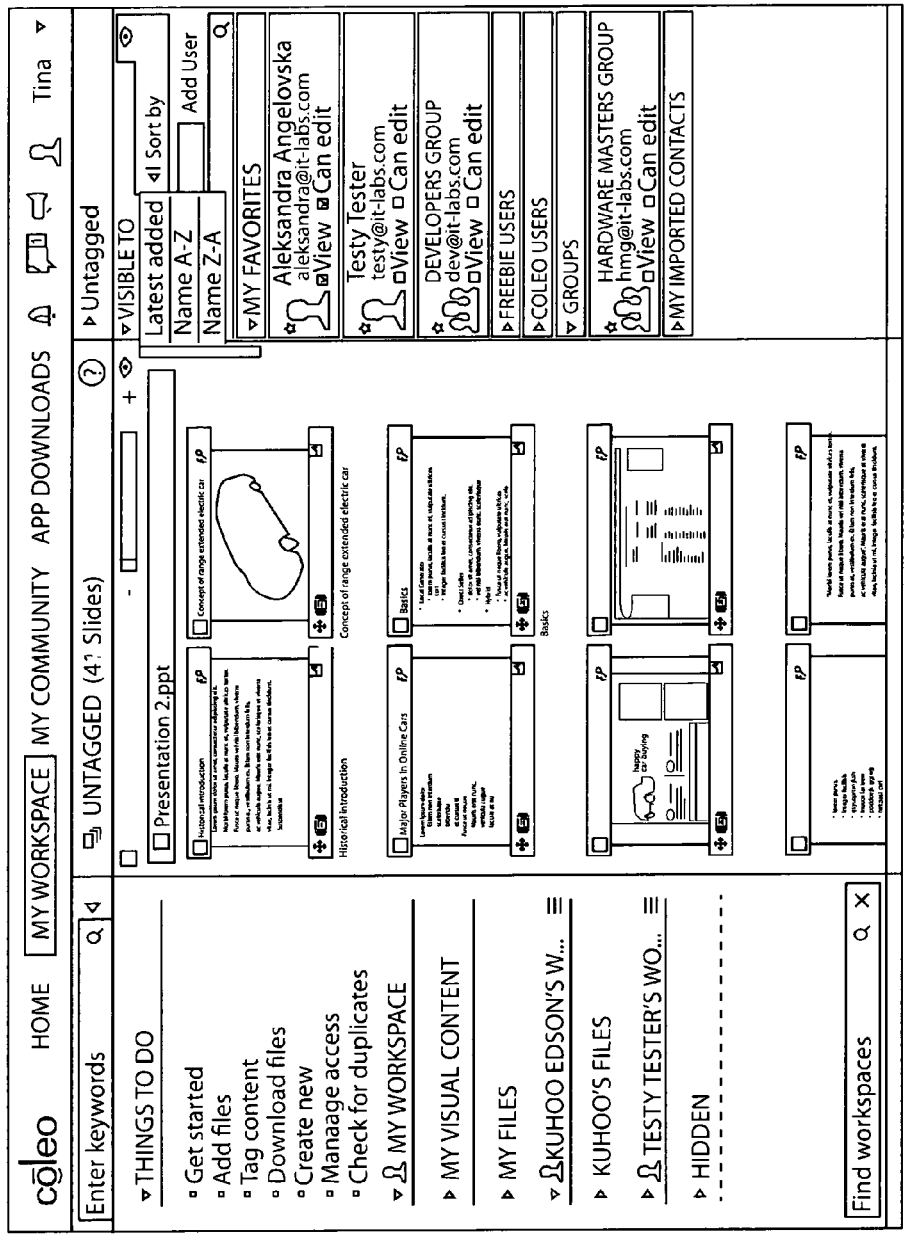
Figure 5:
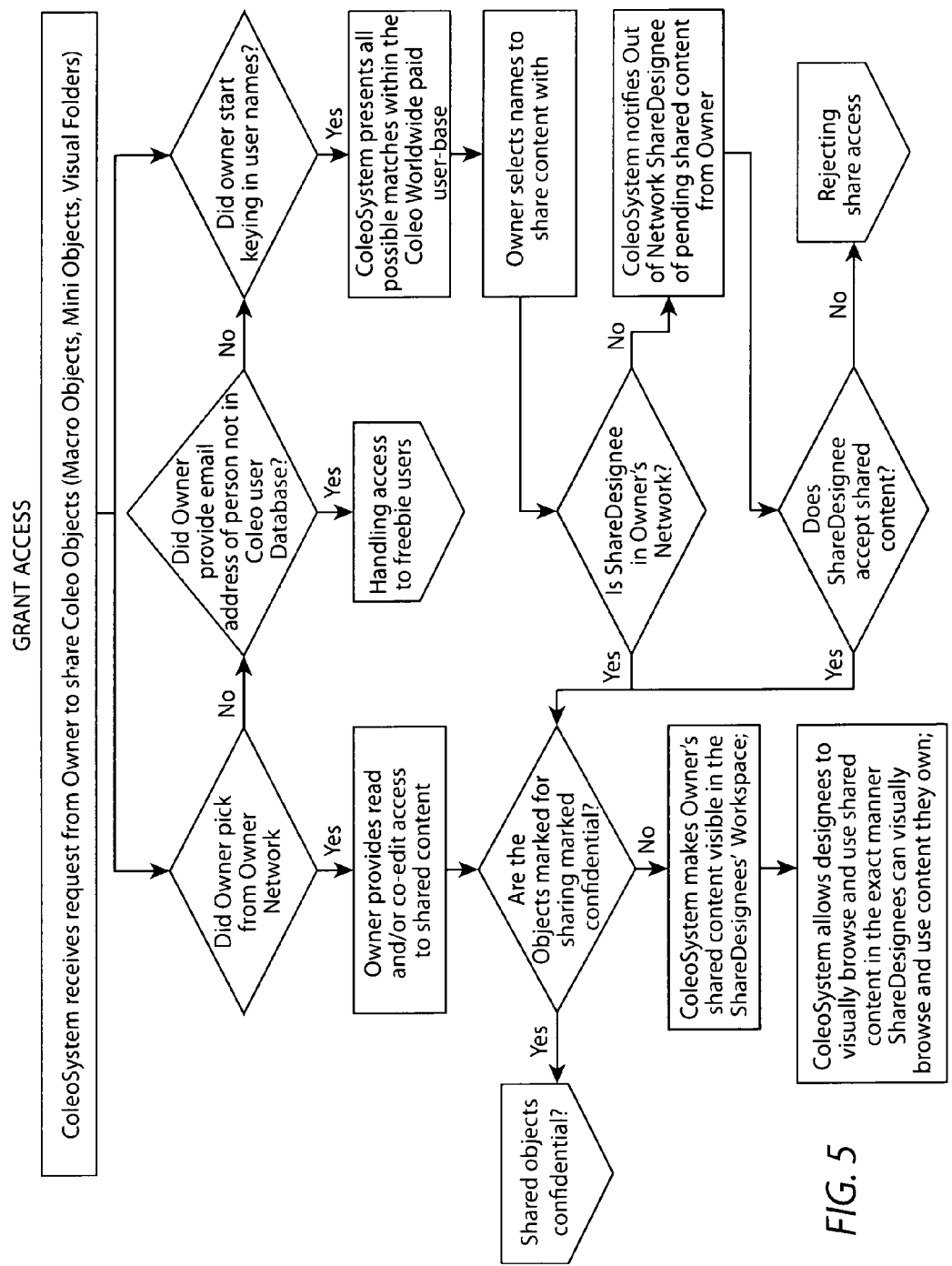
Figure 6:
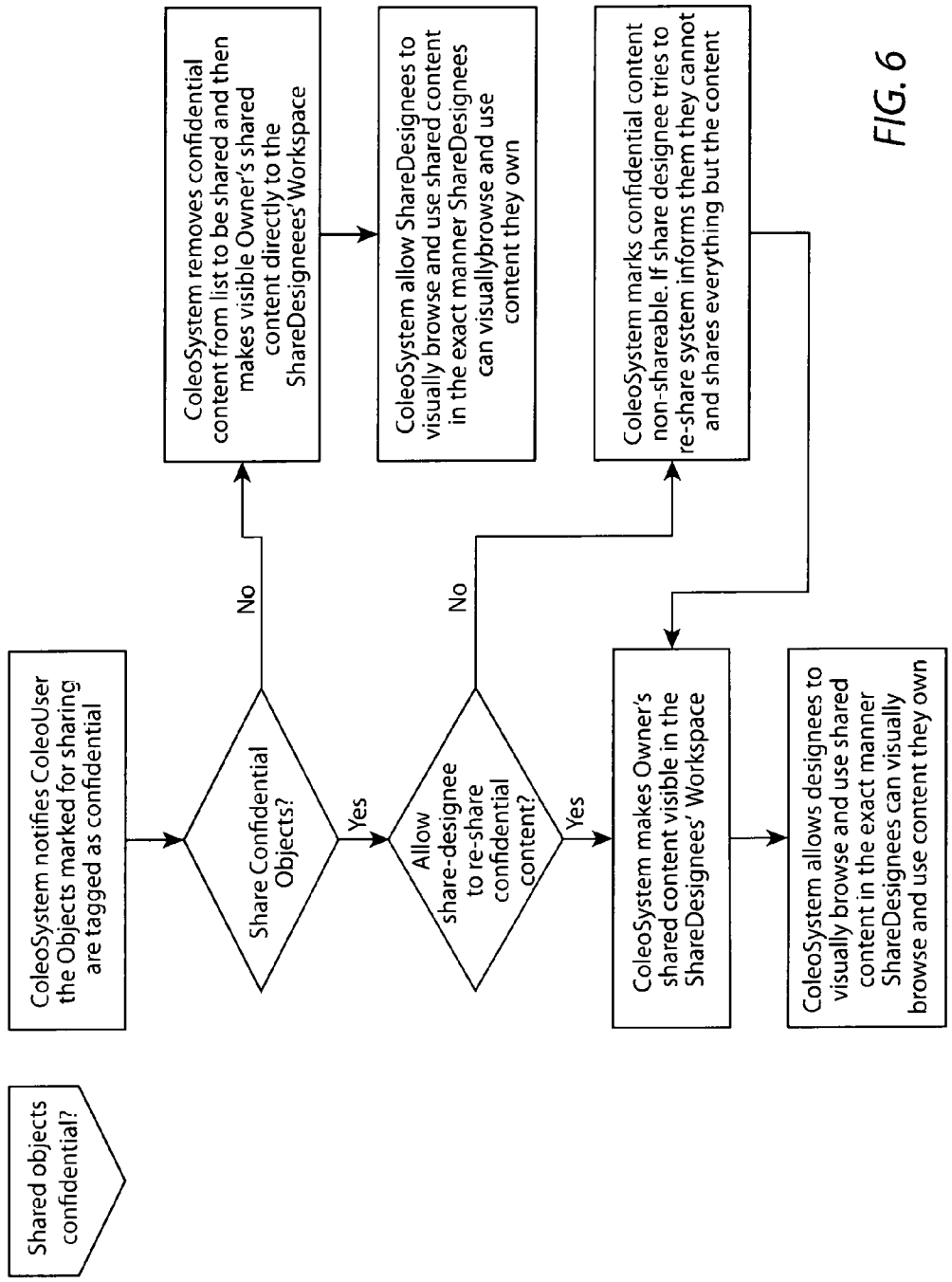
Figure 7:
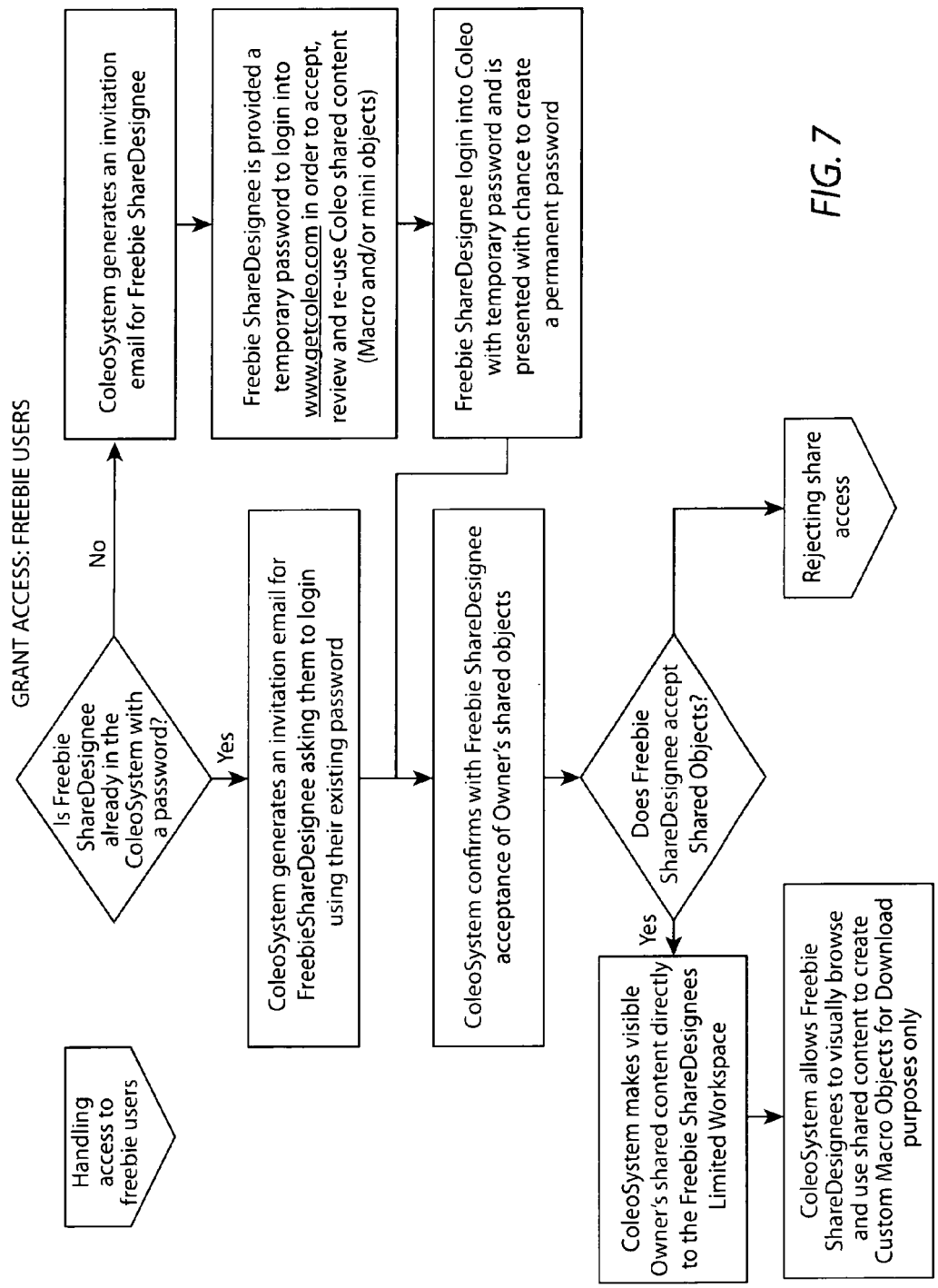
Figure 8:
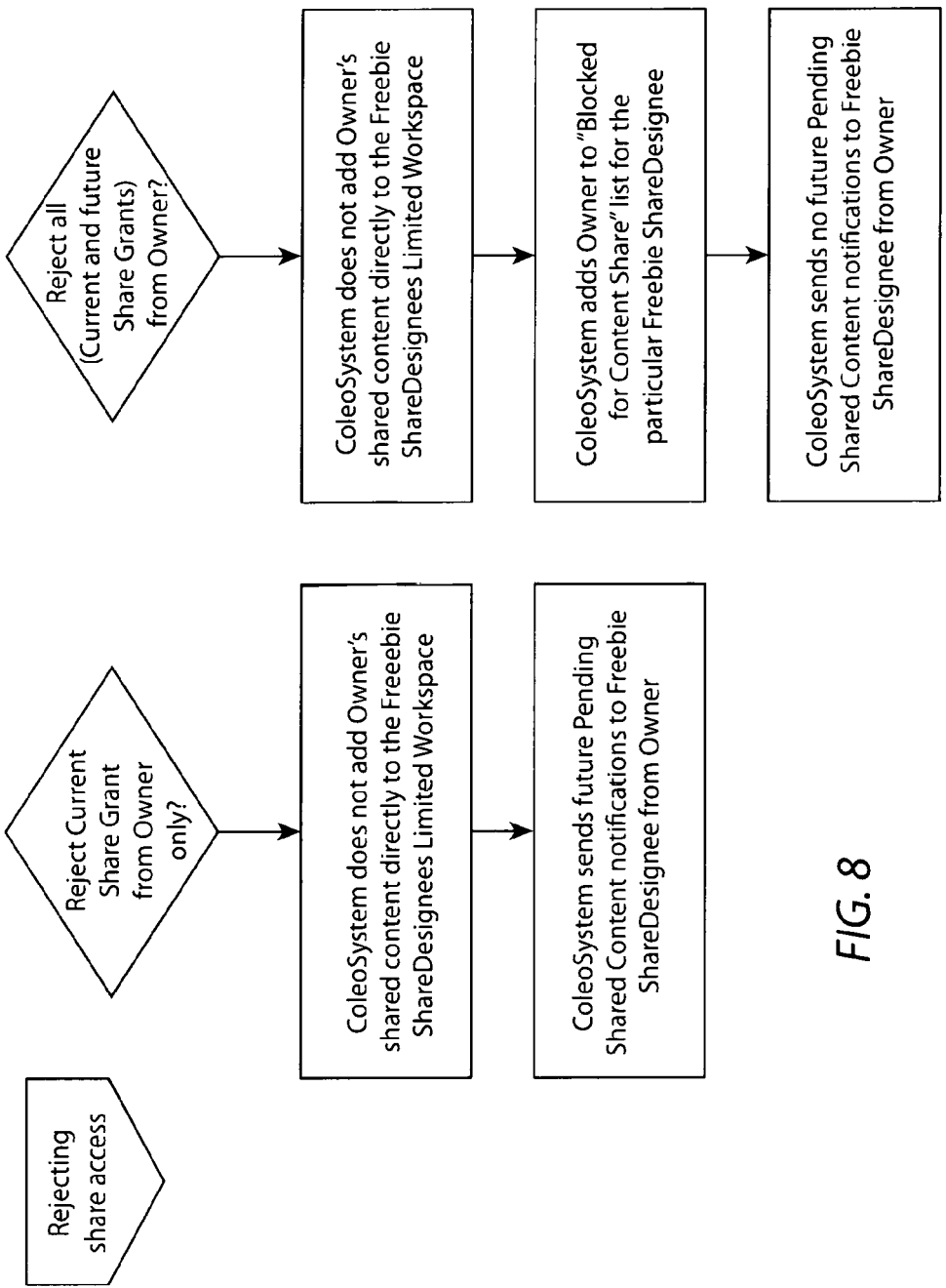

FIG. 4 shows the user interface for the grant access screen (right-hand area) and FIGS. 5-8 show the flowchart for operations as defined in the Smart Sharing/Grant Access Block 202, in accordance with one example In accordance with one example, the a "Grant Access" input is received from the owner and the following checks and actions are performed.
1. Fetch all Visual Folders and display the tree.
    A request is sent to the API to locate all Visual Folders that exist in the system for the current owner.
    A response is sent back containing the list of Visual Folders.
    In the left area, display the tree of Visual Folders and content thumbnails/documents underneath the tree.
2. Fetch all existing users and display the tree
    A request is sent to the API to locate all IDs in the following Collections:
    UserCollection
    MyContactUserCollection
    FreemiumUserCollection
    FavoritesUserCollection
    GroupsUserCollection
    In the right hand area, display in the following order:
       An input field to type in email address(es) of new freemium user(s) who are not part of owner's connected workspaces.
       A sortable, alphabetical list of returned favorite Users
       A sortable, alphabetical list of returned Freemium Users
       A sortable, searchable, alphabetical list of returned Favorites Users
       A sortable, searchable, alphabetical list of returned Groups
       A sortable, searchable, alphabetical list of returned My Contacts In one example, to select content to which access is granted, the owner can select one or more visual content (any Mini- and/or Macro-object) or hierarchical Visual Folder in the owner's workspace or any of the owner's connected workspaces. All of the above-mentioned content may be selected individually or collectively.

In an example, to grant access to selected content, the owner can grant "view" and "can edit" permissions to one or more users. When the owner grants access to a user(s), the following actions are performed.

The functionality of the Smart Security Block 204 determines how security is handled. Unlike prior art cloud file sharing applications, where privacy levels can be set at the folder or file level only, in accordance with a non-limiting example of the present invention the Smart Security Block 204:
1. Allows owners to apply security to Macro- and Mini-objects. This is important because often only some information within documents requires confidential treatment, but because owners are forced to mark entire documents confidential, true sharing and collaboration of the non-confidential information within the document is impaired.
2. Applies smart security inheritance rules, and the user is given new protections for content which is marked confidential.
3. Notifies the owner when confidential information is re-shared and provides the owner a way to revoke access from anyone/everyone who has access to the content via a re-share.

In one example, a user may choose to set the privacy level of Macro-objects, Mini-objects, and Visual Folders. The user may choose from four settings: Public, Private, and Confidential, and Non-Searchable. If the user sets privacy on a Macro-object, the following process is performed:
1. Fetch the selected content from the main area or from the Smart Search Block 208.
2. A request is sent to the API, containing the IDs of the selected items
3. If multiple portions of content are selected:
    Load the names of the selected items in right-hand area, and below show blank radio buttons for "Private", "Public", "Confidential", and "Non-searchable" privacy levels, and a blank checkbox for the "Make non-editable" setting.
4. If one item is selected:
    Load the right-hand area with name of the item at the top, and below show blank radio buttons for "Private", "Public", "Confidential", and "Non-searchable" privacy levels, and the checkbox for "Make non-editable" setting (marked or unmarked, depending on what has been set for this item previously read from the returned basic information).
    If the non-editable forever flag is set to true, then the checkbox will be inactive and gray.
5. In accordance with one non-limiting example, when the owner marks a user with some permission, the following actions are performed:
    A request is sent to the API containing the ID of the selected Visual Folder/Macro-object/Mini-object, the ID of the user for whom permissions are to be added, and the permission level (read or co-edit), and also the parentID of the selected item (the parentID is needed if a Macro- or Mini-object is selected to ascertain in which Visual Folder the selected object is located).
    Search for the ID of the selected Visual Folder/Macro-object/Mini-object in the Visual Folders/Macro-Object/Mini-object Collection, with respect to the action, to determine what type of item is selected.
    1. If a Visual Folder level is selected:
        Check if the Visual Folder ID exists in the Visual Folder tree permissions Collection.
        If the ID does not exist in the Collection, add the ID to the database; otherwise if the ID exists, fetch that object.
        Update the user permission of the object, so the UserID sent in the request is added to UserID property of user permissions, and the permission level property is updated with the permission level.
Save the changes to the database.
2. If a Mini-object is selected:
Check if the Mini-objectID sent in the request exists in the Mini-object permission collection.
If the Mini-objectID does not exist in the Collection, add the ID to the database; otherwise if the ID exists, fetch that object.
Update the Visual Folder ID property so it will be set to the value of the parentID of the Mini-object.
Update the user permission property to contain the UserID sent in the request, and set the permission level based on the permission level sent in the request.
Save the changes to database.
3. If a Macro-object is selected:
Check if the Macro-objectID sent in the request exists in the Macro-object permission Collection.
If the Macro-objectID doesn't exist in the collection, add it to the database; otherwise, if it exists, get that object.
Update the visual topic Id property so it is set to the value of the parentID of the presentation.
Update the user permission property to contain the UserID sent in the request, set the permission level based on the permission level sent in the request, and set the inherited permission flag to false.
Save the changes to the database.

In one example, in the case content is confidential, the owner of a Macro-object containing confidential Mini-objects may grant access to the Macro-object to one or more users. The following describes how access may be granted:
1. A request is sent to the owner containing the ID(s) of the selected Macro-object(s).
2. Second Action: Find the Macro-object with ID sent in the request in the Macro-object Type Collection.
3. Third Action: Check the "Privacy Level" property to determine if the Mini-object(s) are Confidential.
4. Fourth Action: Stop the iteration of Mini-object(s) and return a response confirming that the Macro-object targeted for access contains a confidential Mini-object(s).
5. Fifth Action: Allow the owner to decide to authorize access to confidential Mini-objects within the Macro-object being shared.
   a) If yes, grant access to the entire Macro-object.
   b) If no, redact confidential Mini-objects from the Macro-object prior to granting access.

In another example, a user may grant access to a Macro-object that contains confidential Mini-objects owned by another user:
1. A request is sent containing the ID(s) of the selected Macro-object(s).
2. Find the Macro-object having the ID sent in the request in the Macro-object Type Collection.
3. Fetch the Mini-object(s) in the Macro-object.
4. Check the "Privacy Level" property to determine if the Mini-object(s) are confidential. Stop the iteration of the Mini-object(s) and return a response confirming that the Macro-object targeted for access contains a confidential Mini-objects(s) which is not owned by the user.
5. Allow the user to decide to proceed and authorize access to confidential Mini-objects that are owned by other users within the Macro-object being shared.
   a) If yes, authorize access to the entire Macro-object, including confidential Mini-objects owned by other users.
   b) Send notification(s) to the owner(s) of confidential Mini-objects notifying them that users have been indirectly granted access to the owner's confidential Mini-objects.
      Provide the name of the user who has been granted access indirectly to the owner's confidential Mini-objects.
      Provide a thumbnail corresponding to each item of confidential content to which access has been granted.
      Provide a remove access button for each confidential Mini-object, one for the user who indirectly granted access and another for the user who indirectly received access.
   c) If no, remove confidential Mini-objects from the Macro-object prior to authorizing access.

Users receive a sharing confirmation dialog regarding confidential Visual Folders or Macro- or Mini-objects when they do one of the following:
1. Grant access to a non-confidential Visual Folder(s) which contains a confidential sub-folder(s) and/or Macro- and/or Mini-object(s).
2. Grant access to a non-confidential Macro-object(s) which contains a confidential Mini-object(s).
3. Grant access to one or more other users' (>=1 user's) confidential Mini-objects(s).
4. Grant access to a combination selected from another user's confidential Mini-objects plus non-confidential Macro-objects(s) which contain confidential Mini-objects(s).

Figure 9:
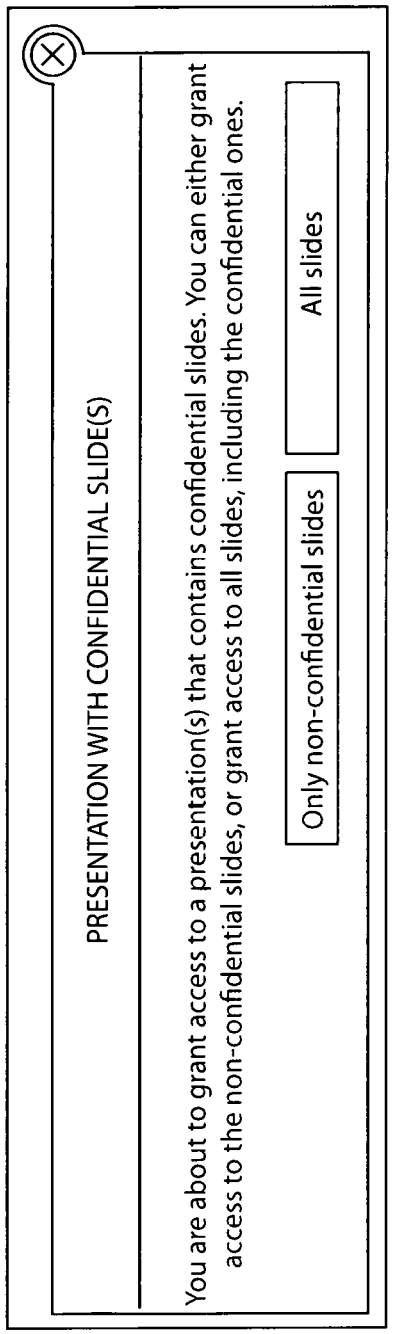
Figure 10:
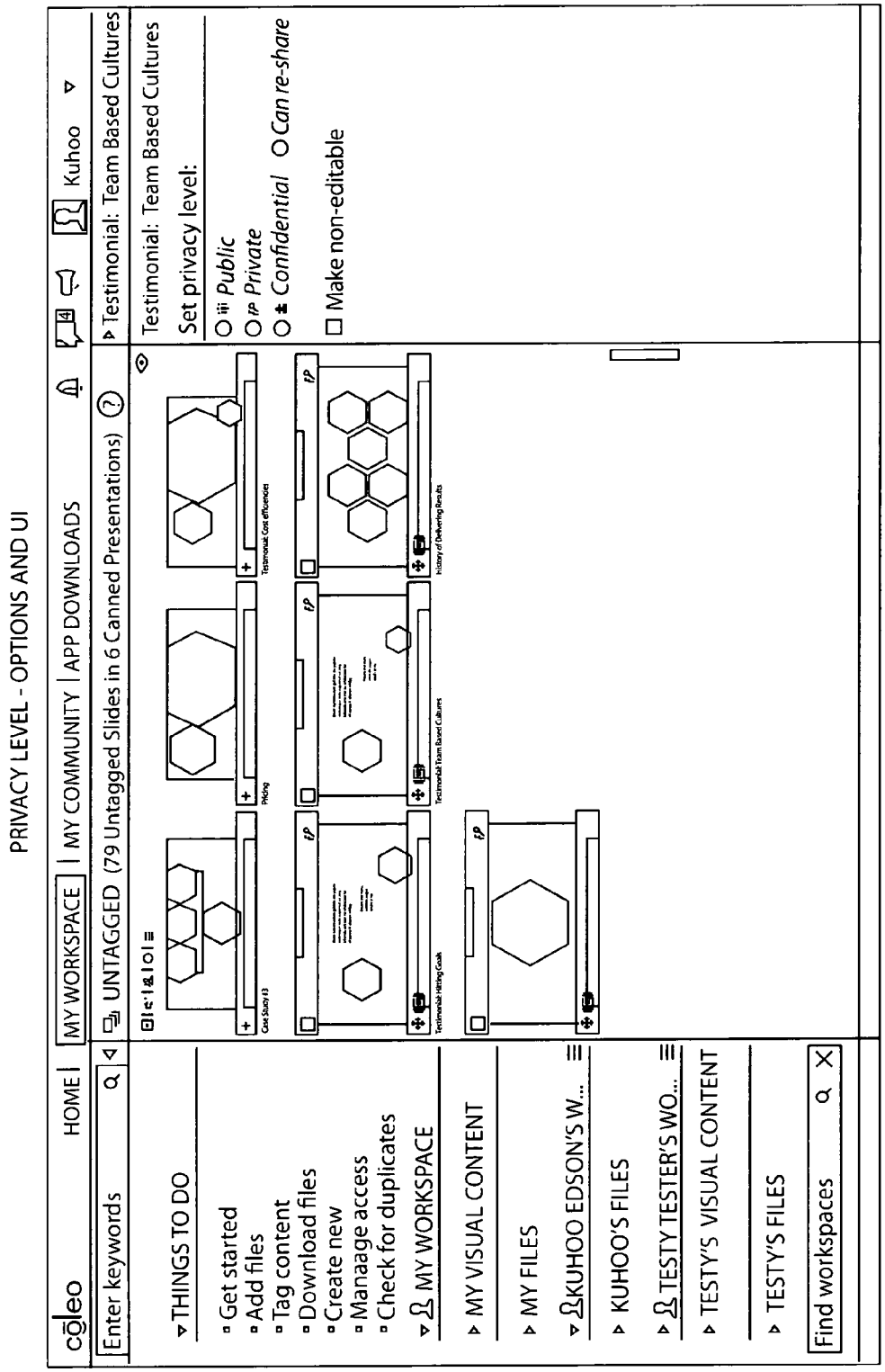

FIG. 9 illustrates an example notification a user receives when granting access to a Macro-object (e.g., a presentation) with a confidential Mini-object(s) (e.g., a slide). FIG. 10 illustrates a user interface for managing security utilizing the Smart Security Block 204, in accordance with one example.

The Make Content Non-editable Block 206 determines how an owner may prevent a user(s) from editing portions of a Macro- or Mini-object to which that user(s) has been granted access. This capability is not available with any prior art applications, especially for Mini-objects and for Mini- and Macro-objects that reside in a distributed cloud workspace. One example in accordance with the present invention enables an owner to mark portions of his/her Macro-objects as uneditable by other users, even if the uneditable objects are downloaded and all links to original content are broken by the downloader.

In one example, owners of content are enabled to choose if their own Mini-objects within their Macro-objects may be edited by other users. The owner of a Mini-object(s) is not affected; the object continues to behave like an editable object for the owner. However, for all other users with access to the Mini-objects, this setting will affect the download functionality on the cloud based application and the local application corresponding to the original application that created the Mini-object. For the purposes of this description, the application for PowerPoint® will be used as an example.

In order to set content as editable/non-editable, a user needs to select some content and navigate to a "Set Privacy Level" option of the Smart Security Block 204.

In one example, the user selects one or more Mini-objects from the main area and marks the checkbox for the "Make Non-editable" setting. The following process is then performed:
1. Fetch a list with ID(s) of selected Mini-object(s).
2. Pass the list and information for checkbox state (in this case, marked).
3. A request is sent to the API, containing the list of ID(s) for selected Mini-objects, and enum for the checkbox's state.
4. Retrieve the Mini-objects from the database according to the selected ID(s).
5. Check to determine if any selected Mini-object does not belong to a the logged-in user.
6. For each Mini-object:
   a) If the logged-in user is not the owner of the Mini-object, take no action and notify the logged-in user they he/she does not own the Mini-object and therefore cannot set the Mini-object as non-editable.
   b) If the Mini-object is owned by the logged-in user, mark the Mini-object non-editable and update the mini-object in the database.
7. Add a "non-editable" icon on each of the Mini-object(s) marked non-editable so users know they cannot edit that Mini-object.
8. Each Mini-object that is marked non-editable can be unmarked at any time by the owner of the Mini-object.

Steps 1-8 apply to Macro-objects, as well.

The Smart Search Block 208 enables users to find and access content across multiple distributed cloud-based user accounts and across an enterprise. Current prior art applications, when performing the search function, hunt for keywords across all document types, including file names and sometimes the file metadata/properties, and return to the user a list of all the documents that match the search criteria. The user has no idea who is the owner of the documents, and the search is limited to documents that are shared with the user. This results in a lost opportunity, especially within enterprises, where employees create and recreate the same content over and over again because they are unaware that the content already exists. In accordance with an example of the present invention, the search function is augmented in two ways:
1. The search includes content that is not shared with the user in the search except content that is marked confidential or non-searchable by owners of said content.
2. The search lists all search results in the context of the workspace owner so that the user knows who owns the content.
3. All content satisfying the search criteria is displayed visually so the user performing the search can immediately determine all content that satisfies the search criteria, unlike prior art applications which display one matched content at a time.
4. Searches are performed across distributed cloud workspaces that have not previously connected to the user's workspace (i.e., workspaces to which access has not previously been granted to any content) and affords the user performing the search the opportunity to request access to content that matched the search criteria.
5. The search results include finding similar content utilizing the Find Similar Block 212 as will be described below.

In one example, a user can search for and find content within his/her own workspace folder(s) including Macro- and Mini-objects, within workspaces that are connected to his/her workspace, and, in the case of enterprise accounts, across all workspaces within the enterprise whether or not they are connected to the user's workspace. The results can potentially include content to which the user does not have access. To ensure confidentiality, the portions of content in the owner's workspace that are potential matches cannot be accessed by the user performing the search or any identifying information such as a thumbnail or title. Once search results are returned, if the user has not been granted access to the content matching the search results, the user can request that the owner of the matched content grant him/her access directly from the search results. In one example, the user May:
1. Search by entering one or more keywords in the search field. Preferably, Boolean search is also enabled.
2. The user can also choose options from the Advanced Search flyout. These options include "Type", "Words show up in", and "In workspaces".
   "Type" corresponds to Macro-objects types such as presentations, PDF document, spreadsheets, etc.
   "Words show up in" corresponds to words contained in the title, main content, notes, Macro-object properties or metadata, Macro-object name, etc.
   "In workspaces" includes:
      "Selected Visual Folder only", which restricts the search to only the selected Visual Folder.
      "My Workspace"", which restricts the search to only the user's own workspace.
      "My Connected Workspaces"", which restricts the search to only the workspaces shared with and accepted by user; in other words, the workspaces displayed to the user in his/her left-hand area.
         a) Includes any workspaces set by the user to "Hidden".
         b) Includes any groups of which user is a member, including those set by user to "Hidden".
         c) Across My Enterprise, which is a feature available to enterprise accounts, restricts the search to all users on that enterprise account, even those that have not previously connected their workspaces to the user performing the search through sharing.

Figure 11:
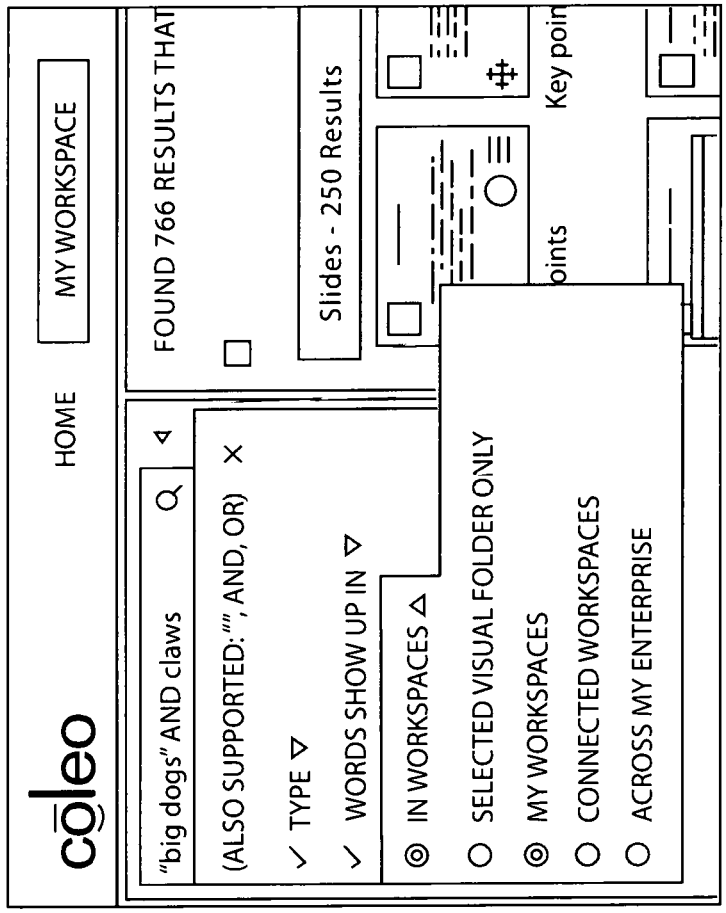

FIG. 11 illustrates a portion of the user interface for defining where the search should be conducted utilizing the Smart Search Block 208 in accordance with one example.

The Display Search Results Block 210 determines how search results are displayed and how users request access to results to which they do not have access. Prior art cloud file sharing applications do not present search results in the context of the owner of the content searched/matching search criteria, nor do they search content not shared with the user. Consequently, prior art cloud file sharing applications do not enable users to request access to content belonging to owners who have not previously shared their content with the user. In contrast, one non-limiting example in accordance with the present invention presents the search results in the context of the connected workspace where the search criteria was met and in the case of content match in workspaces not connected to the user's workspace, provides a mechanism for the user to request access from the unconnected workspace. Accordingly, in accordance with the example:
1. A request is sent to the API to retrieve Mini-objects which match the search criteria for the specific user.
2. Matched Mini-objects are fetched from the database, including the information for the workspace associated to the Mini-objects and the Macro-objectID where they originate.
3. The Mini-objects are grouped by the workspace name, and then by the parent Macro-objectID.

4. A tree object is created according to the following:
   a) List<Workspace>
   b) List<Macro-object>
   c) List<Mini-objects> for each Macro-object.

In one example, the user may opt to search in "Connected Workspaces" or "Across My Enterprise", and the search function locates matches for which user does not have access. For each workspace with search results for which the user does not have access, a single blank "Potential match(s)—request access" thumbnail may be displayed. The title text may be a descriptive text such as "This workspace has potential match(s)—request access." When a user selects "Request Access" to content he/she currently has no access, the following actions take place:

1. A request for access notification is sent to the owner of the content, which includes the following:
   a) "[First Last] searched the keyword combination "[SearchCriteria]".
   b) A list of all the content that matches the search criteria in the owner's workspace with a thumbnail and the ability to grant access or reject access request on an item-by-item basis.
2. For each item of content, the notification includes:
   a) Match Thumbnail, which is the thumbnail for that item of content so that the owner can determine exactly what the user wants to access.
   b) Match Title, which is the title of that item of content.
      Grant Read—If selected, the requestor (i.e., the user who requested access) will be granted read access to the item of content. The workspace of the owner is connected to the workspace of the user and displayed as described earlier in conjunction with the description of the Connected Workspaces Block 200.
      Grant Read+Co-edit—If selected, requestor will be granted Read+Co-edit access to the item of content. The workspace of the owner is connected to the workspace of the user and displayed as described earlier in conjunction with the description of the Connected Workspaces Block 200.
      Reject Request—if selected, requestor will not be granted access to the piece of content.
      Selecting any of the above icons removes that piece of content from the notification. When owner has made a decision on the last piece of content in the notification, the notification will be removed.

Figure 11A:
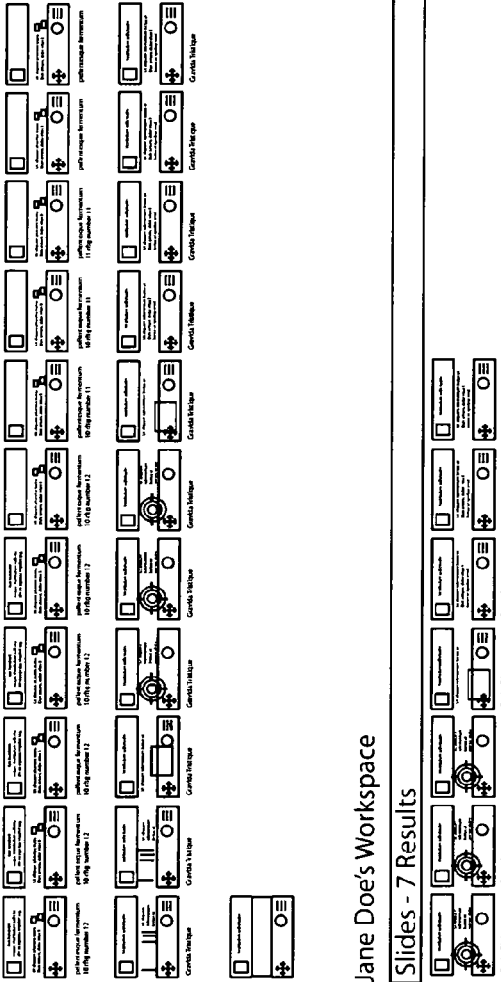

FIG. 11a illustrates an example of how search results are displayed in the context of the connected workspace where the matches were found utilizing the Display Search Results Block 210 described earlier.

The Find Similar Block 212 provides users the ability to search across their connected workspaces or their enterprise to find content similar (e.g., determined by a percentage range specified by the user) to their own content, including searching for an image within other content. The user who performs the search may then take multiple actions, for example, delete everywhere or replace within their own workspace. This capability provides invaluable services, especially to enterprises, where one application may be to find and remove the use of certain images from within all Macro-objects across the distributed cloud for legal purposes. Prior art applications do not provide this capability.

In one example, a user may search for content similar to his/her own and can then use the search results to compare, use, and/or replace his/her own content with similar content. As in the case of the operation of the Smart Search Block 208, search results returned by the find similar operation can potentially include content to which the user performing the search does not have access to the content. Moreover, once identified as a match or potential match, the user performing the search may request access to matched content from the owner directly using the Find Similar Block 208. To ensure confidentiality, the user is not informed how many items of content are stored in the owner's workspace that are potential matches nor any other identifying information such as a thumbnail, title, or any other marking that may visually identify the matched content. The user who performs the search may set a threshold (e.g., 90-100%), such that the content will be considered similar only if the content has a percentage match greater than or equal to the threshold set in find similar options for the selected content. That is:

1. When finding similar content, the user performing the search will be given options on how/where to look for the searched content. The user performing the search will also be given the option to ignore templates graphics or header/footer information in other file types when looking for similar content.
2. In one non-limiting example, the threshold tab includes a slider-bar, enabling user to modify his/her find similar threshold. The tolerance range may be set from 90-100% by using the slider utilizing whole numbers. 100% requires an exact (i.e., 100%) match. A lower value requires a match of at least the set percentage (e.g., if the threshold is set at 90%, Mini-objects/images with a match of 91%, 95%, or 100% would all return as similar, but 89% would not).
3. The initial default is set to "100%". If the user performing the search sets a find similar threshold value in his/her preferences, that value will be displayed. If the user performing the search modifies the value and then marks the checkbox to set the find similar threshold as the user's preference, the default threshold will be updated in My Preferences accordingly.
4. "Search in" option—The user may select which workspaces/Visual Folders he/she wishes to include in his/her "Find Similar" search. All users may search within their own workspaces and any Connected Workspace. Enterprise users may also search across all users' workspaces on that enterprise account similar to the search performed by the Smart Search Block 208 described earlier.
5. When the find similar function is successfully initiated, a notification will be is displayed inform the user that find similar search is in progress. When find similar search has completed, a notification will be displayed to inform the user that the find similar search has completed and where to view the search results.
6. Find Similar will search within all Macro-objects for each selected user in the "Search in" tab.
7. Content that is deemed similar according to the parameters set in a "Find Similar popup" is placed in "Similar Content", with the following exceptions (results not returned):
   a) If a Visual Folder is marked "non-searchable", content within the folder is excluded from the search results.
      If set in the owner's workspace, The owner will be informed of the search results, as the matched content is the owner's own content.
      If set in a group, all members of that group will be informed of the search results.
      Note: Even if a user has access to a another user's content, Visual Folder, or parent Visual Folder, the user still will NOT be informed of the search results in search and find similar operations if the Visual Folder is marked as "non-searchable".

b) If a Macro-object is marked "non-searchable", Mini-objects within the Macro-object are excluded from the search results. The same rules apply as in the case that a Visual Folder is marked "non-searchable".

c) If certain Mini-objects within a Macro-object are marked "non-searchable", the find similar function skip over Mini-objects marked non-searchable while searching inside a Macro-object.

Figure 12:
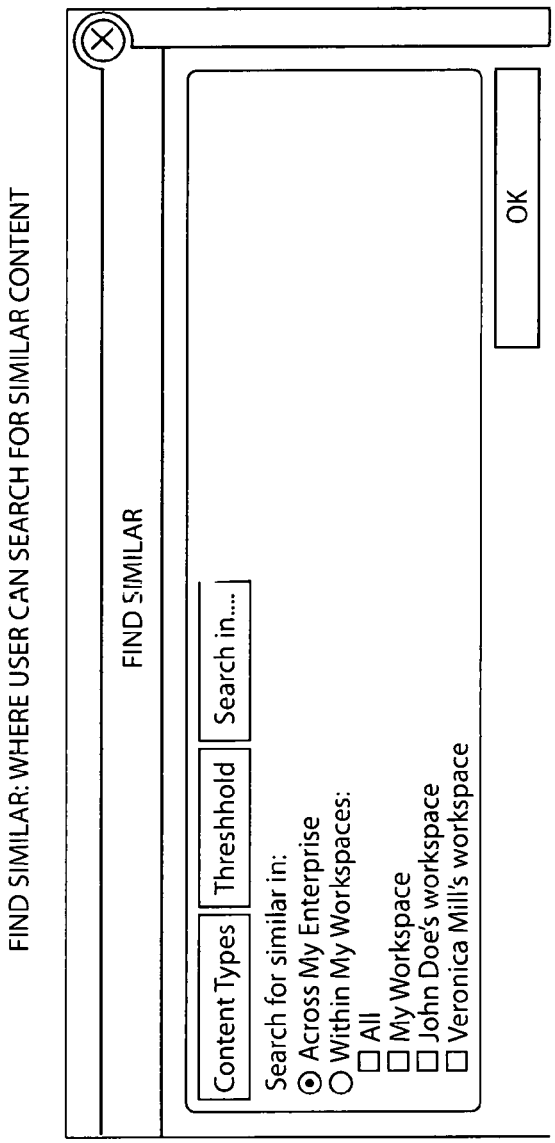
Figure 13:
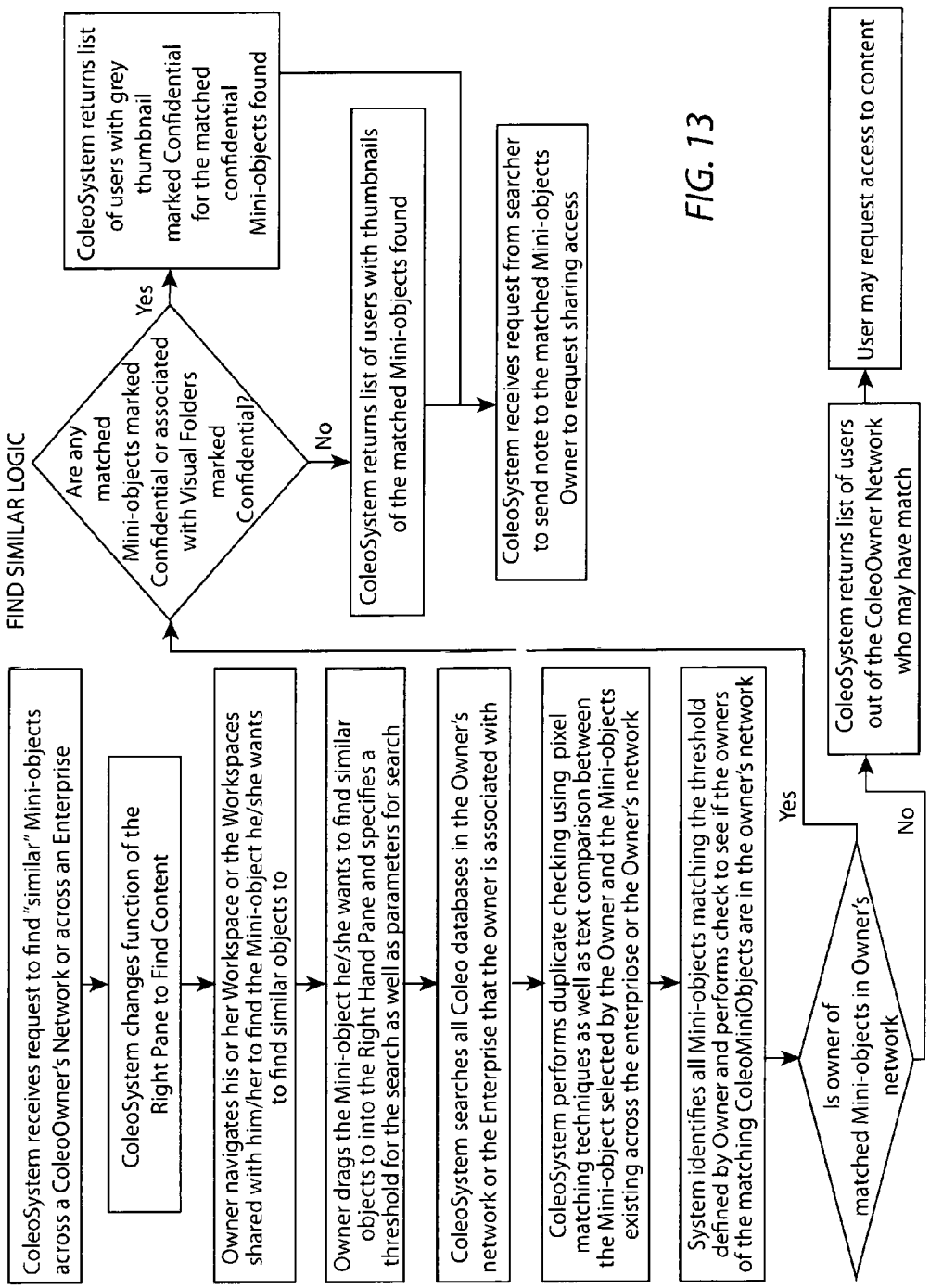

FIG. 12 illustrates portion of the user interface for specifying where to hunt for similar objects. FIG. 13 shows the flowcharts of operations performed when carrying out the functions performed by Find Similar Block 212 in accordance with one example.

In one non-limiting example, the user may find an image within the content. That is, the user may search for a particular image, as a Micro-object, within Macro-objects, to replace, delete, or modify. Furthermore, the user may opt to select "Find Similar" for an image within a Mini-object, even if the image has been altered by having been cropped, skewed, or partially hidden (e.g., within the 90% maximum threshold). If the user opts to exclude template/header/footer/etc., Find Similar will search through the remaining content.

The Find Similar Block 212 also enables users to replace their own content, in their own workspaces or everywhere the content has been used, with content located via the Smart Search Block 208 or Find Similar Block 212. This functionality is very useful, especially for enterprises, where employees can find a better representation of content they have created and can simply adopt another employee's version while giving attribution credit to that employee via a "Maintain Provenance" functionality defined in the Smart Copy Block 216. Prior art applications do not provide this capability.

In one example, the user may choose to replace his/her own content with a matched search result comprising content not owned by him/her. Note, however, that the content type must match in order for a "Replace with Matched" function to operate. For example, if the user performing a search desires to replace a PowerPoint® Mini-object he/she owns with content that is owned by another user, the content belonging to the other user must also be a PowerPoint® Mini-object.

1. "Replace with Matched"—Single-select.
    a) For the selected thumbnail, the original content (i.e., content that was searched for using the "Find Similar" function) will be replaced with the matched content.
    b) Once the searched content is replaced with the similar or 100% matched content, the user who performed the search is given the same options as if he/she were replacing the searched content with another item of content owned by him/her via the Smart Replace Block 218.
2. "Compare Match"—Single-select and only if user has access to the matched content (e.g., thumbnail) selected. The "Compare Match" function will open a preview screen with the both the searched and matched content shown, so the user may see a side-by-side comparison.
    a) A similar Mini-object/image is shown on left-hand side, with the title "Similar" above the content.
    b) Areas where there is a mismatch (i.e., in the case of a search performed using a threshold of 90-99%), a yellow highlight will be overlaid on the mismatched areas of the matched thumbnail so that the user can immediately observe areas that do not match.
    c) An X % matched Mini-object/image is shown on right-hand side, with the title "Matched" above the content.
3. "Request Access"—If the user has not been previously granted access to the matched content, the user can multi-select thumbnails from multiple owners to request access to the potential matches.
4. "Delete Everywhere"—Multi-select. The "Delete Everywhere" function deletes selected searched (searched for) content everywhere that particular content exists. This function is very useful when an enterprise wants to control content and decides to locate and remove obsolete or incorrect content without relying on employees to do delete the content themselves. With this function, users do not need to know where an item of content is used (e.g., the content can be within thousands of documents). This function will locate and remove from all accounts where the content exists. The functionality of this block is the same utilizing the Smart Delete Block 226 as will be described below.

The Smart Version Management Block 214 maintains all versions of Macro- and Mini-objects as changed by users who have been enabled to edit the Macro- and Mini-objects through permissions. Further, this functionality enables the owner of the content to rollback to any previous version, back to and including the original version, of the Mini-object(s) that have been modified. This functionality also enables owners of the Mini-object(s) that have been modified to perform replace functions as defined in the Smart Replace Block 218 or Smart Delete Block 226, with any rolled-back version as will be described below. Prior art applications do not enable version control and version control management (e.g., replace/delete everywhere) at the Mini-object level and do not enable rollback capabilities.

Figure 14:
Figure 15:
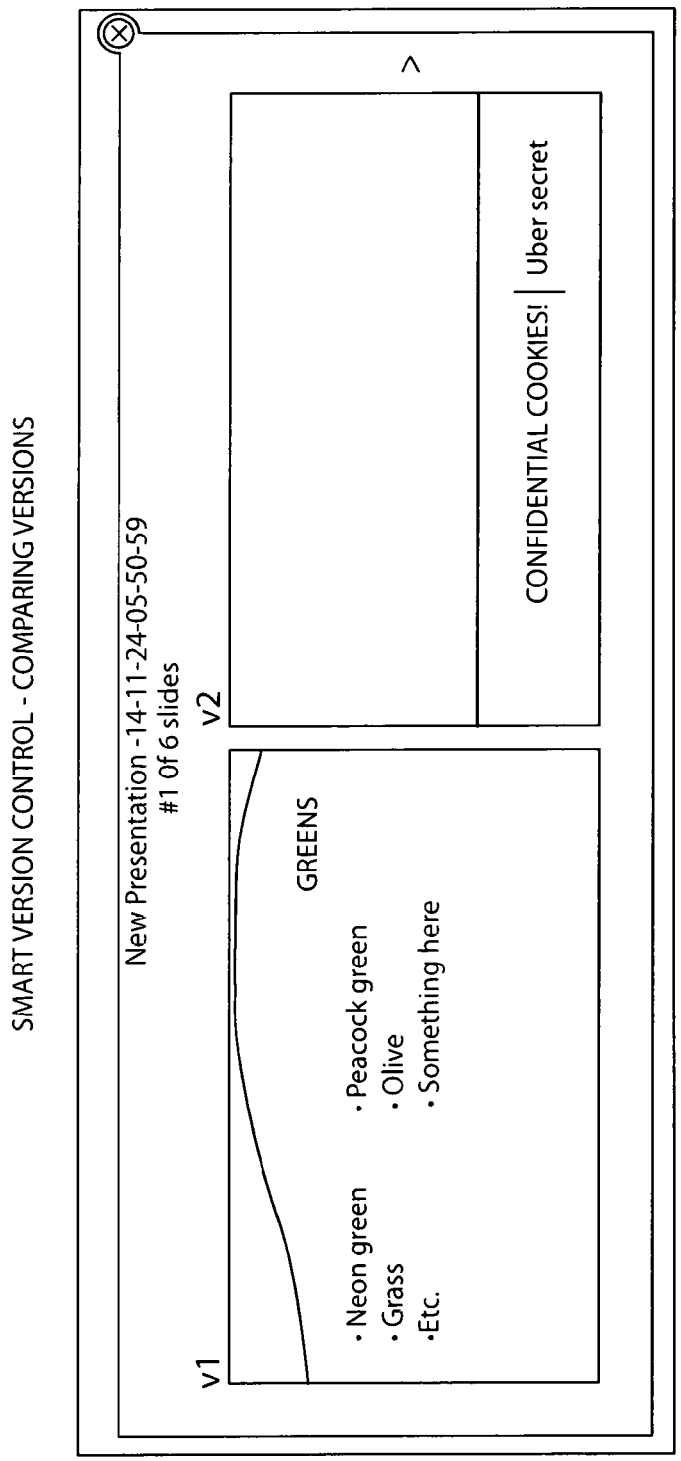

FIG. 14, illustrates how the history of a Mini-object (a slide in this example) is shown in the object metadata. FIG. 15 illustrates what a user observes when comparing versions of same Mini-object (a slide in this example) in accordance with one example.

In one non-limiting example, users who have co-edit permissions for Mini-objects owned by other users may modify the Mini-object. Consequently, a new version of the content can be created when the following occurs:

1. For Mini-objects a new version is created when the Mini-object is:
    a) Newly created (v1), e.g., or a "Copy" of a Replaced/Deleted Mini-object in Smart Copy/Create New Block 216, a "Create New" in the Coleo for PowerPoint® Block 220, or "Save to Cleo Cloud" utilizing the Coleo for PowerPoint® Block 220.
    b) Modified in the Coleo for PowerPoint® and saved as "Replace Existing Version—My Workspace" or "Replace Existing Version—Everywhere" utilizing the Smart Replace Block 218.
    c) Rolled back to a previous version.
2. For Macro-objects a new version is created when the Macro-object is:
    a) Newly created (v1).
    b) Modified in Coleo for PowerPoint® and saved to Coleo as "Replace Existing Version—My Workspace" or Replace Existing Version—Everywhere" utilizing the Smart Replace Block 218.
    c) Edited in the Coleo Cloud using the "Save to Coleo Cloud" function as defined in the Coleo for PowerPoint® Block 220
    d) Rolled back to a previous version.
3. A new version is not created when Mini-objects are:
    a) Mini-objects which are replaced within the Coleo Cloud via "Replace—My Workspace/Everywhere" utilizing the smart replace Block 218.

b) Mini-objects are deleted within the Coleo Cloud via "Delete—My Workspace/Everywhere" utilizing the Smart Delete Block 226.

c) Macro-objects are modified utilizing the Coleo for PowerPoint® Block 220 and only the Mini-object order was changed (i.e., no modifications to the Mini-object itself).

4. Location (i.e., where to view)—Versioning is displayed in right-hand metadata, under the "Basic Information" section. Any user who may view the metadata for that content may also view the versioning. Included within a title of "History", a table with the following is displayed for each row. Note that due to space constraints, this may span more than one row:

a) Version—the version number. The format is "v1", "v2", ... "v[n]", where the number (n) is incremented by 1 for each new version. Rows are ordered in this format with the newest version at the top.

b) Modified by—The [First Last] name of the user who modified the content.

c) Comments—any comments added by user. In one example, only versions created in Coleo for Power-Point® can include the option to add comments.

d) Date—when the content was modified; format: MM/DD/YYYY hh:mm.

e) Compare icon—opens with a format like the format utilized for preview, but with a side-by-side comparison. In one example, the old version is on the left, and the current version is on the right.

Old version—show version number directly above image, such as "v2".

Current version—show version number directly above image, such as "v7".

Mini-objects do not have forward/backward arrows.

Macro-objects have forward/backward arrows to aid in navigation. If one of the Macro-objects has more Mini-objects than the other (e.g., count of pages), when the end of the shorter Macro-object is reached, the shorter Macro-object image will instead display "end of document" for the remainder of the Mini-objects in the longer Macro-object.

f) Rollback icon—If selected, a check will be performed as to whether or not users have access to any of the affected Mini-objects, and a smart confirmation dialog opens (with shared portions italicized):

In the case of Mini-objects: If there is at least one user with access to the [Mini-object Type(s)] and has used them in his/her own Macro-objects, the owner receives a notification and has the option to rollback only in owner's workspace or every workspace of every user that has the current version of the Mini-object in use within their own Macro-objects.

a My Workspace—Mini-object rollback actions proceed for "My Workspace" utilizing the Smart Replace Block [218].

b Everywhere—Mini-object rollback actions proceed for "Everywhere" as defined in the Smart Replace Block 218.

In case of a Macro-object: If there is at least one user with access to [Mini-object Type(s)] within the [Macro-object Type] and the user has used them in his/her own Macro-objects, the owner receives a notification and has the option to rollback only in the owner's workspace or every workspace of every user who has the current version of the Mini-object in use within their own Macro-objects.

In one non-limiting example, when the owner of a Mini-object confirms rollback, the Smart Version Management Block 214 creates a new version, using the selected previous version. This is done to ensure versions in between are not created and changes made by others to content are not lost. For example, the owner has v1-7 and chooses to roll back to v2. In this case, v8 is created, which is a duplicate of v2, thus preserving v3-7. When the rollback function is initiated, the Smart Version Management Block 214:

1. Creates a new version of the Mini-object, copying the selected version.
2. Inserts a comment such as "Rollback to v[x]", where x is the version selected.
3. Updates the "modified by" field to the owner of Mini-object.
4. Records the date and time of the rollback action.
5. Enables the owner to make the rollback effective in the owner's workspace only or everywhere that the Mini-object is located.
6. Initiates a check for all NEWEST VERSION Macro-objects containing that Mini-object:

a) Replace Existing Version—Everywhere→automatically updates all (i.e., owner's and others') Macro-objects to the new version, using the new Mini-object version. A "Replace—Everywhere" notification is sent, according to the rules previously defined for "Replace—Everywhere" utilizing the Smart Replace Block 218.

Replace Existing Version—My Workspace→the owner's Macro-objects are updated to the new version, using the new Mini-object version. Other users having access to that Mini-object are sent a "Replace—My Workspace" notification, according to the rules previously defined for "Replace—My workspace" utilizing the Smart Replace Block 218.

User chooses "Copy"→The previously defined function for "Copy" is initiated. The copied Mini-object is created as v1, according to the rules defined for "Copy" utilizing the Smart Copy Block 216. The user's Macro-object(s) is updated to the new version using the new Mini-object. When the user chooses "Replace" or fails to take action, functions previously defined utilizing the Smart Replace Block 218 are initiated. Consequently, the user's Macro-object(s) are updated to the new version using the new Mini-object version.

In one example, when the owner confirms rollback of Macro-objects, the Smart Version Management Block 214 creates a new version, using the selected previous version. This is done to ensure versions in between are not created, and changes made by others to content are not lost. For example, the owner has v1-7 and chooses to roll back to v2. In this case, v8 is created, which is a duplicate of v2, thus preserving v3-7. When the rollback function is initiated the Smart Version Management Block 214:

1. In the case of rolling back Macro-objects to previous versions, requires an owner to select "Replace Existing Version" options for Mini-objects within the Macro-objects when he/she confirms rollback. The Mini-object rollback actions will be based upon the owner's selection.
2. When rollback is to a previous version, creates a new version, copying the selected version.
3. The Smart Version Management Block 214 inserts a comment such as "Rollback to v[x]." where x is the version selected.

4. Updates the "modified by" field to the owner of the Macro-object.
5. Records the date and time of the rollback action.
6. Checks Mini-objects within the Macro-object to determine if they were removed from the Macro-object sometime after the selected version. (Note: not the same as the Mini-object itself being deleted.)—General action: Add the Mini-object back to the Macro-object, using the correct version at the time of the version of that Macro-object.
   a) Removed Mini-object: Is not owned by the owner of the Macro-object:
      No version change—Add the Mini-object back to the Macro-object, pointing to where the Mini-object exists in the workspace of the owner (of the Mini-object, not the Macro-object) in the database.
      Version change—Create as a new Mini-object in owner's (i.e., owner of macro-object) workspace, v1. Add the mini-object back to the Macro-object, pointing to this new Mini-object. This only affects the Macro-object which is being rolled back.
   b) Removed Mini-object is owned by user
      No version change—add the Mini-object back to the Macro-object, pointing to where the Macro-object is located in owner's workspace in the database.
      Version change—"rollback" to the correct version, according to the rules defined previously for rollback actions for Mini-object(s) utilizing the Smart Version Management Block 214. Add the Mini-object back to Macro-object, pointing to the newly created version (i.e., the rolled-back version.)
   c) Added to a Macro-object sometime after selected version—Remove the Mini-object from the Macro-object.
   d) Mini-object referenced from another Macro-object—Remove the Mini-object from the Macro-object.
   e) Mini-object belongs to the Macro-object (i.e., a parent Macro-object in which the Mini-object was initially created)—Remove the Mini-object from the Macro-object.
   f) Modified in the Macro-object sometime after selected version—Use correct version of the Mini-object.
      If the Mini-object is not owned by the user—Create a new Mini-object in the workspace of the owner of the Macro-object, v1. The Macro-object points to the new Mini-object. This only affects the Macro-object being rolled back.
      If the user id the owner of the Mini-object—Roll back to the correct version, according to the rules as defined previously for rollback actions utilizing the Smart Version Management Block 214 for rollback actions for Mini-objects. The Macro-object points to the newly created version of the Mini-object.
   g) Reordered in the Macro-object—Reorder the Mini-objects to the correct position in the Macro-object.
   h) Deleted Mini-objects (i.e., "Delete—My Workspace/Everywhere")—The Mini-object is deleted, according to rules as defined for deleting Mini-objects utilizing the Smart Delete Block 226.

In another example, when a new version of a Mini-object is created, not due to rollback, the Smart Version Management Block 214 performs the following functions:
1. Creates a new version of the Mini-object.
2. Adds a Comment "Updates to macro-object [macro-objectName]", where "macro-objectName" is the name of the Macro-object associated to the new version of the Mini-object.
3. Updates the "modified by" field to the owner of Macro-object.
4. Records the date and time of the action.
5. Enables the owner to make the action effective in the owner's workspace only or everywhere access to the Mini-object is authorized.
6. Initiates a check for all newest versions of the Macro-objects containing that Mini-object.
   a) Replace Existing Version—Everywhere→automatically updates all (owner's and other users') Macro-objects to the new version using the new Mini-object version. A "Replace—Everywhere" notification is sent, according to the rules previously defined for "Replace—Everywhere" utilizing the Smart Replace Block 218.
   b) Replace Existing Version—My Workspace→The owner's Macro-objects are updated to the new version using the new Mini-object version. Other users who have previously been authorized to access the previous version of the Mini-object are sent a "Replace—My Workspace" notification, according to the rules previously defined for "Replace—My workspace" utilizing the Smart Replace Block 218.
      User chooses "Copy"→The previously defined function for "Copy" is initiated. The copied Mini-object is created as v1, according to the rules defined for "Copy" utilizing the Smart Copy Block 216. The user's Macro-object(s) are updated to a new version incorporating the new Mini-object.
      User chooses "Replace" (or fails to take action)→According to the rules defined for "Replace" utilizing the Smart Replace Block 218], the user's Macro-objects are updated to a new version using the new version of the Mini-object.

In a further example, when a new version of a Macro-object is created, not due to rollback, the Smart Version Management Block 214 performs the following functions:
1. Adds a Comment—"[as entered by the user (Coleo for PowerPoint®)/specified (edit in Coleo Cloud)]".
2. Updates the "modified by" field to the owner of Macro-object.
3. Records the date and time of the action.
4. Enables owner to make the action effective in the owner's workspace only or everywhere access to the Macro-object is authorized.
5. Initiates a check to determine whether the Mini-objects comprising the Macro-object are
   a) Brand new Mini-objects/Create New—a new version of the Macro-object is created as v1, according to rules defined previously to create new Mini-objects utilizing the Smart Copy/Create New Block 216.
   b) Modified existing Mini-object (owned by the user or to which the user has co-edit access)—a new version of the Macro-object is created by the "Replace Existing Version" function, according to rules previously defined utilizing the Smart Replace Block 218.

In a non-limiting example, a user may delete his/her own Mini-objects and Macro-objects from either his/her workspace or everywhere, including other users' workspaces that are authorized to have access to those Mini-objects. After the owner has selected Macro or Mini-objects for deletion, the owner can chose to delete Mini-objects and Macro-objects from "My Workspace" or from "Everywhere", according to rules previously defined for the delete function utilizing the Smart Delete Block 226, which:
1. Will not create a new version.
2. Will not update modified date, author, or comments.

3. Reorders the Mini-object deleted from the associated Macro-object and any succeeding Mini-objects in the Macro-object to reflect the new order. For example, the Macro-object has Mini-objects A, B, C, and D in positions 1, 2, 3, and 4, respectively. If the Mini-object B is deleted, Mini-objects C and D will be moved from positions 3 and 4 to positions 2 and 3, respectively.
4. If the user previews the Macro-object or rolls back to the former version, the deleted Mini-object will not be included.

In one non-limiting example, the Smart Copy/Create New Block 216 enables users to copy content owned by others to their own workspace. Unlike prior art applications, however, the Smart Copy/Create New Block 216 maintains the provenance of the Mini-objects including attribution to the original creator of the content, which incentivizes users to share their content and have their content used by other users. Also, this enables accountability to allow original creators of content to be identified.

Figure 16:
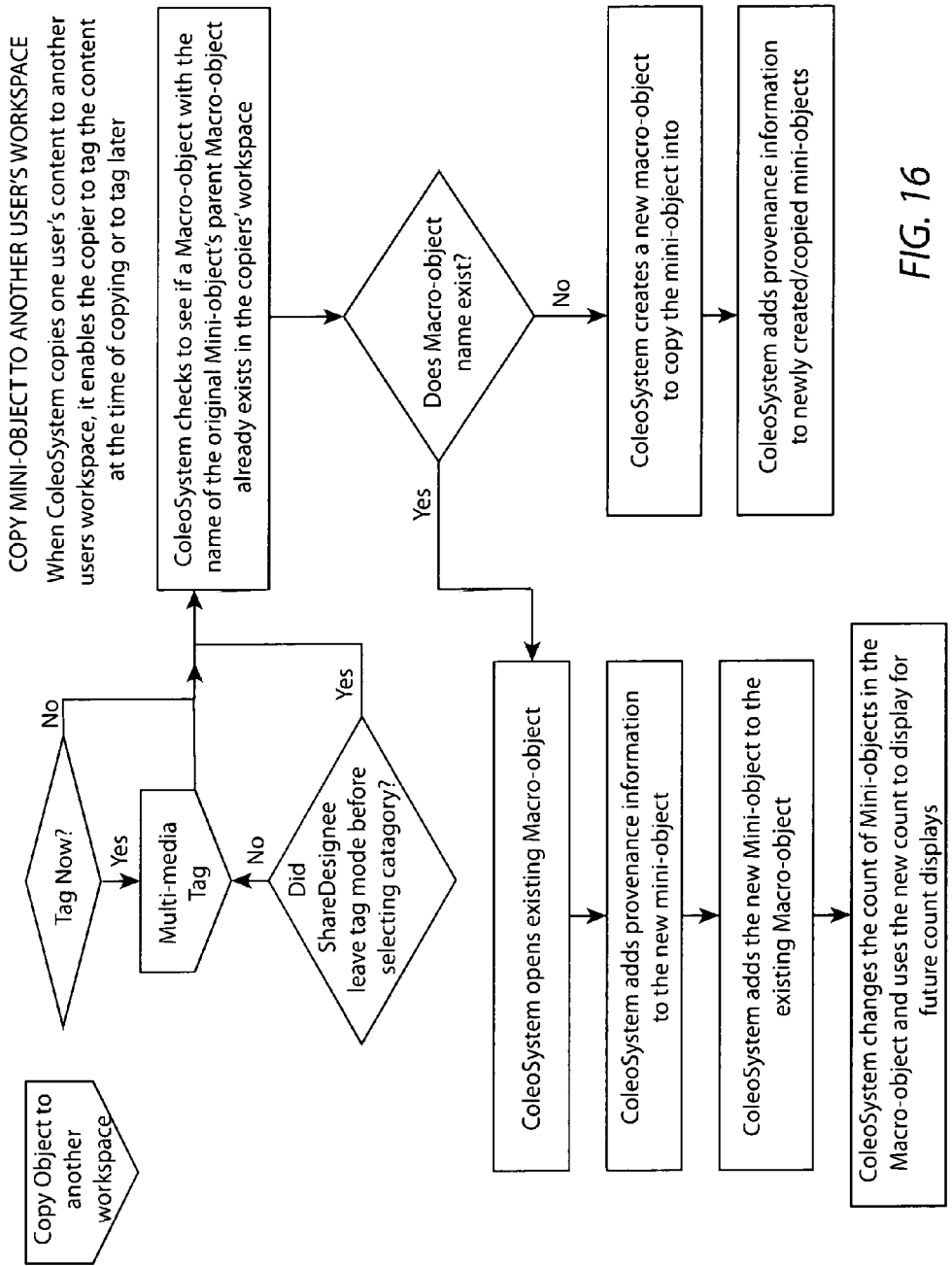

FIGS. 16 and 17 show flowcharts of operations performed by the Smart Copy/Create New Block 216 to create new content in accordance with one non-limiting example. When a Mini-object or Macro-object is created through modification of an existing Mini-object, the following actions are performed by the "Create New" function of the Smart Copy/Create New Block 216:

1. Comments and ratings are not copied over to new Mini-object.
2. The privacy level is not copied over to the new Mini-object.
3. The "Non-Editable" setting is copied over to the new Mini-object (only the owner may edit a non-editable Mini-object).
4. An "Inheritance" is added to provide provenance—new, shown in "Basic Information", below the "Owner".
    a) Inheritance: [originalOwnerName]—first and last name of the owner from whom the Mini-object was copied. If the Mini-object is brand new and has never existed on the Coleo Cloud previously (e.g., "Upload Content", a non-Coleo Mini-object is added to a Macro-object) this is first and last name of user that uploaded the content.
    b) Multiple inheritances—Inheritance: [originalOwnerName]→[secondOwnerName]→ . . . →[nOwnerName] are the first and last names of the owners from whom the Mini-object was copied. The identified owners include the current owner. For example, Person1's Mini-object is copied to Person2's workspace, then to Person3's workspace, then to Person4's workspace. "Inheritance: Person1→Person2→Person3→Person4".

The Smart Replace Block 218 enables owners of Mini-objects to replace (i.e., swap out) their Mini-objects for other Mini-objects of the same type (e.g., slide with slide, worksheet with worksheet, etc.). Furthermore, the Smart Replace Block 218 enables the owner of the content to propagate the replacement Mini-object(s) across all workspaces and within all Macro-objects that included the original Mini-object(s). Prior art applications do not enable users to replace Mini-object(s) with other Mini-objects.

In one example, users may replace their own existing Mini-objects with other already existing (i.e., uploaded and parsed) Mini-objects of their own or Mini-objects shared with them by other users. Mini-objects may be replaced either only for their workspace, or everywhere, including other users' workspaces that are authorized to access those Mini-objects. The replacement function operates as follows:

1. After the owner has selected one or more Mini-objects for replacement, the right-hand area will open with two columns. The right-hand column will load the selected thumbnails (e.g., to-be-replaced Mini-objects.) The left-hand column will load with an equivalent number of blank thumbnails with text such as "Drag & drop replacement [mini-object type] here!".
2. The owner may load Mini-objects in the main area by navigating any of the trees under "My Workspace" or from search results that return Mini-objects from other connected workspaces. The owner may select a single Mini-object (e.g., a replacement Mini-object) and drag-and-drop it over to the blank thumbnail to the left of the Mini-object he/she desires to replace. If the owner selects more than one Mini-object, only the newest selected Mini-object will be moved into the blank thumbnail position.
3. If a user selects a replacement Mini-object that is a duplicate of the to-be-replaced Mini-object, the user is notified that no action will be taken, and the owner will be notified.
4. To indicate that the user has completed replacing Mini-objects ("Replacement" mode) and desires to exit to normal browsing mode, he/she may select "I'm Done" near the top of the right-hand area. Once "I'm Done" is selected by the user, a confirmation dialog will open and the user will be allowed to make the changes in his/her own workspace or across all the workspaces that have Macro-objects containing the Mini-object(s) being replaced.

Figure 18:
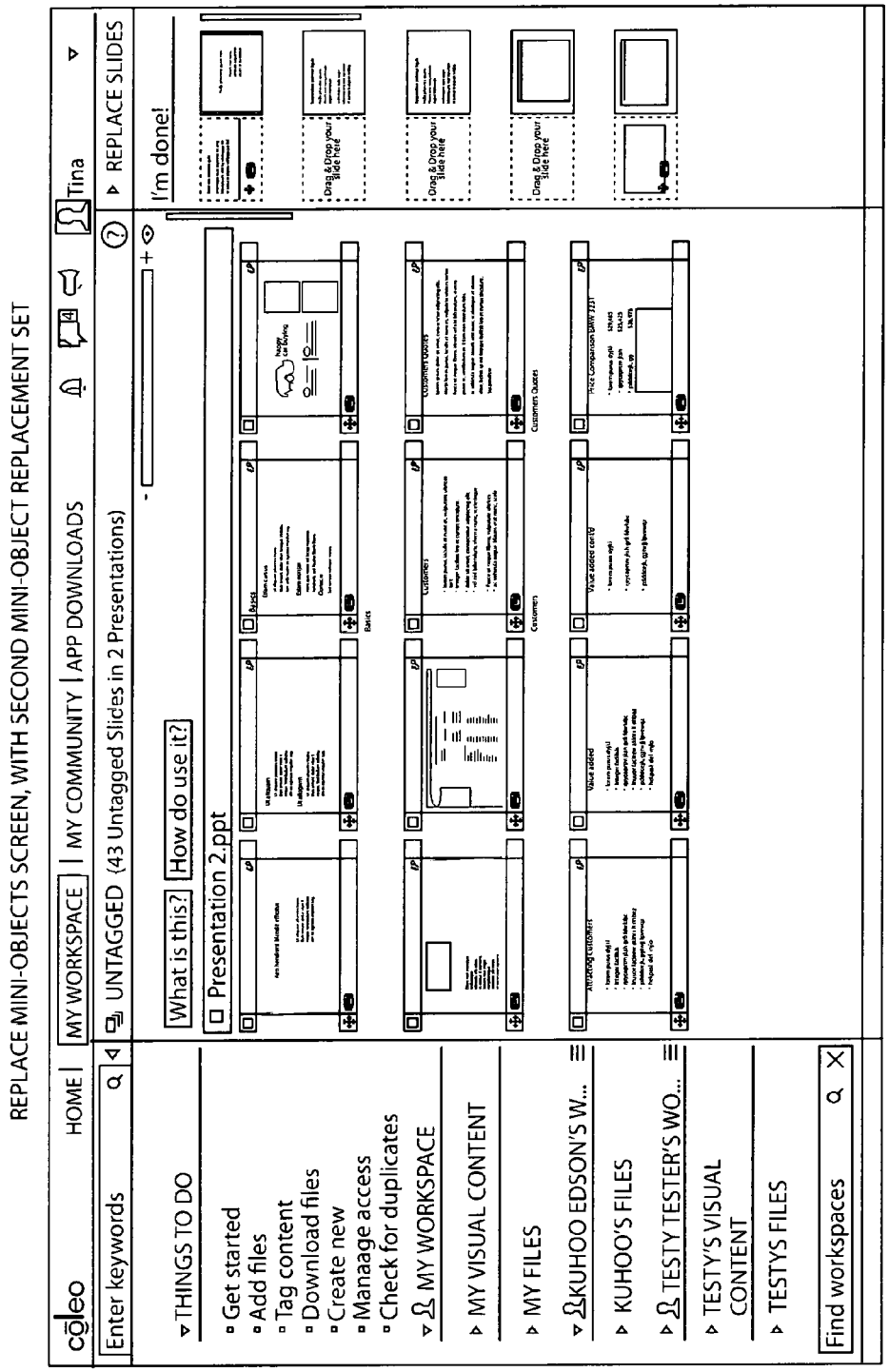
Figure 19:
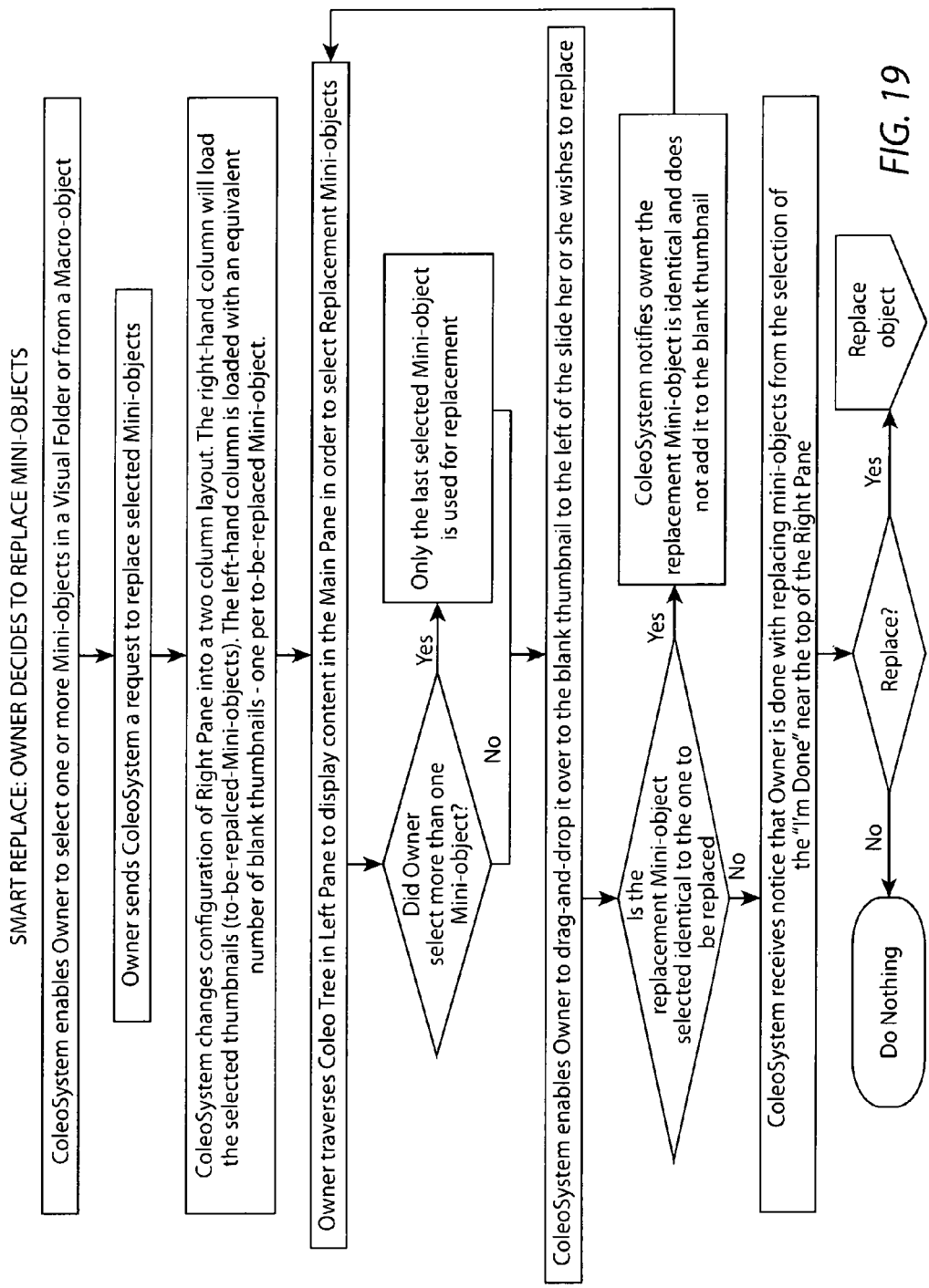
Figure 20:
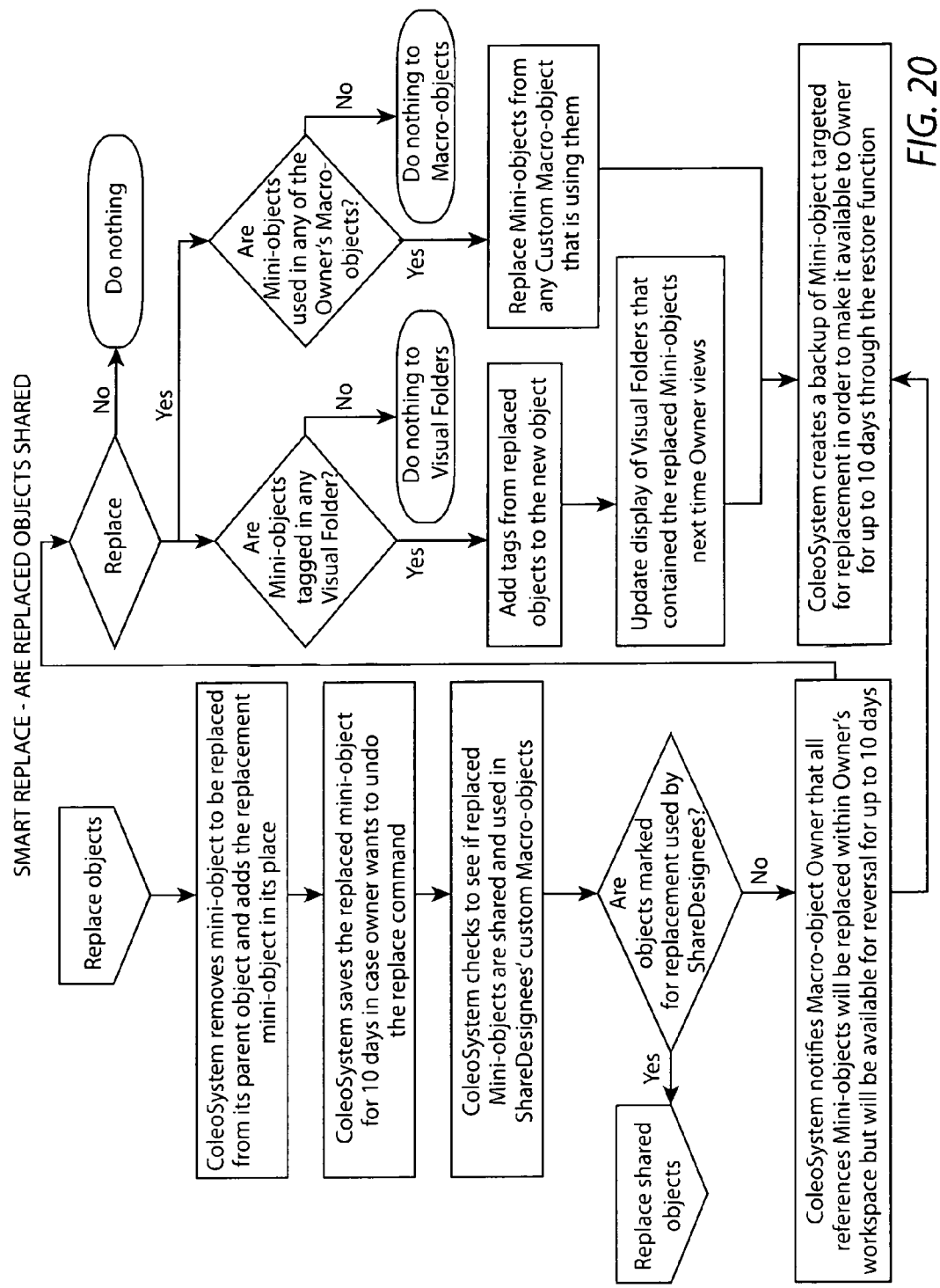
Figure 21:
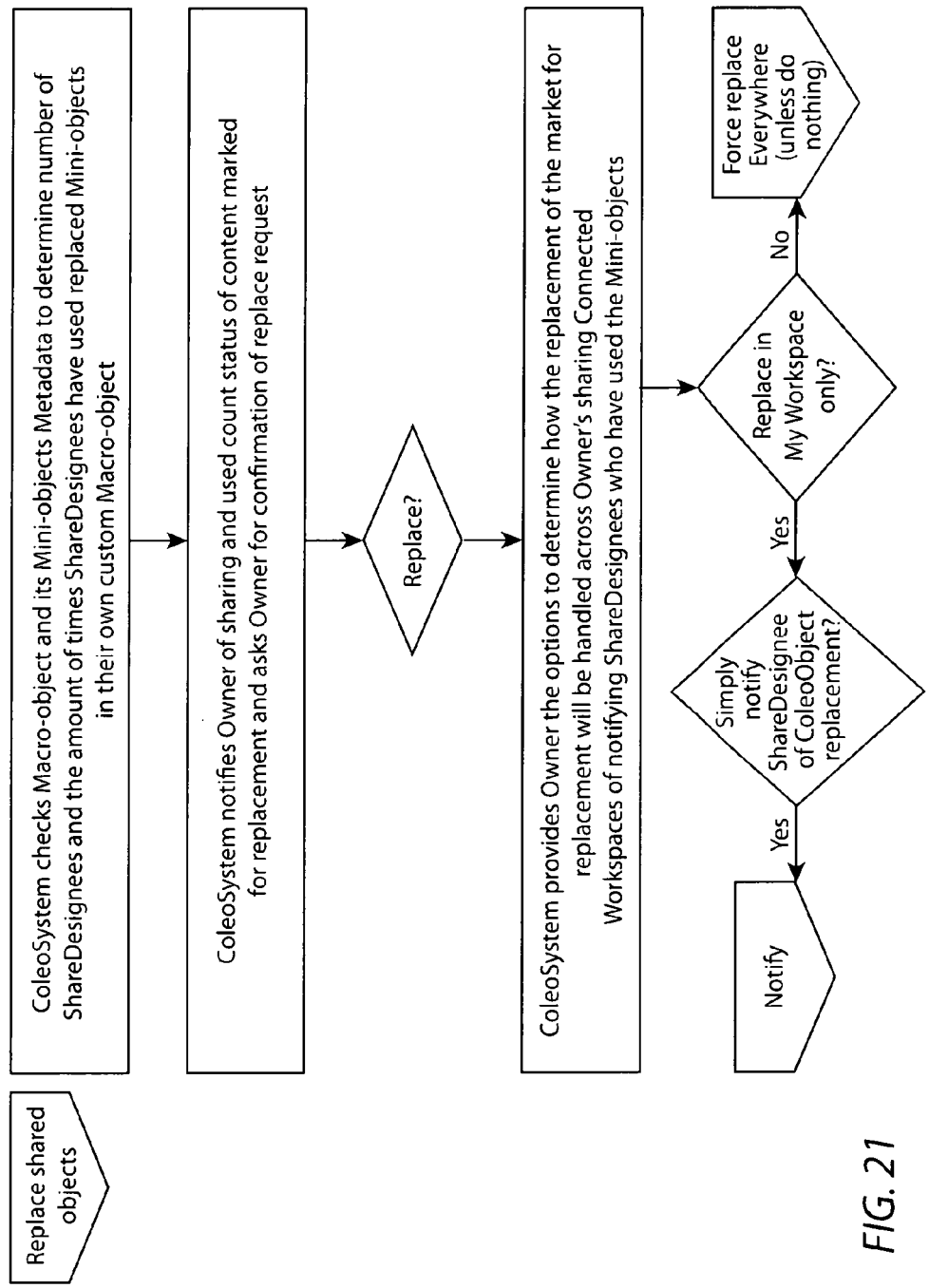
Figure 22:
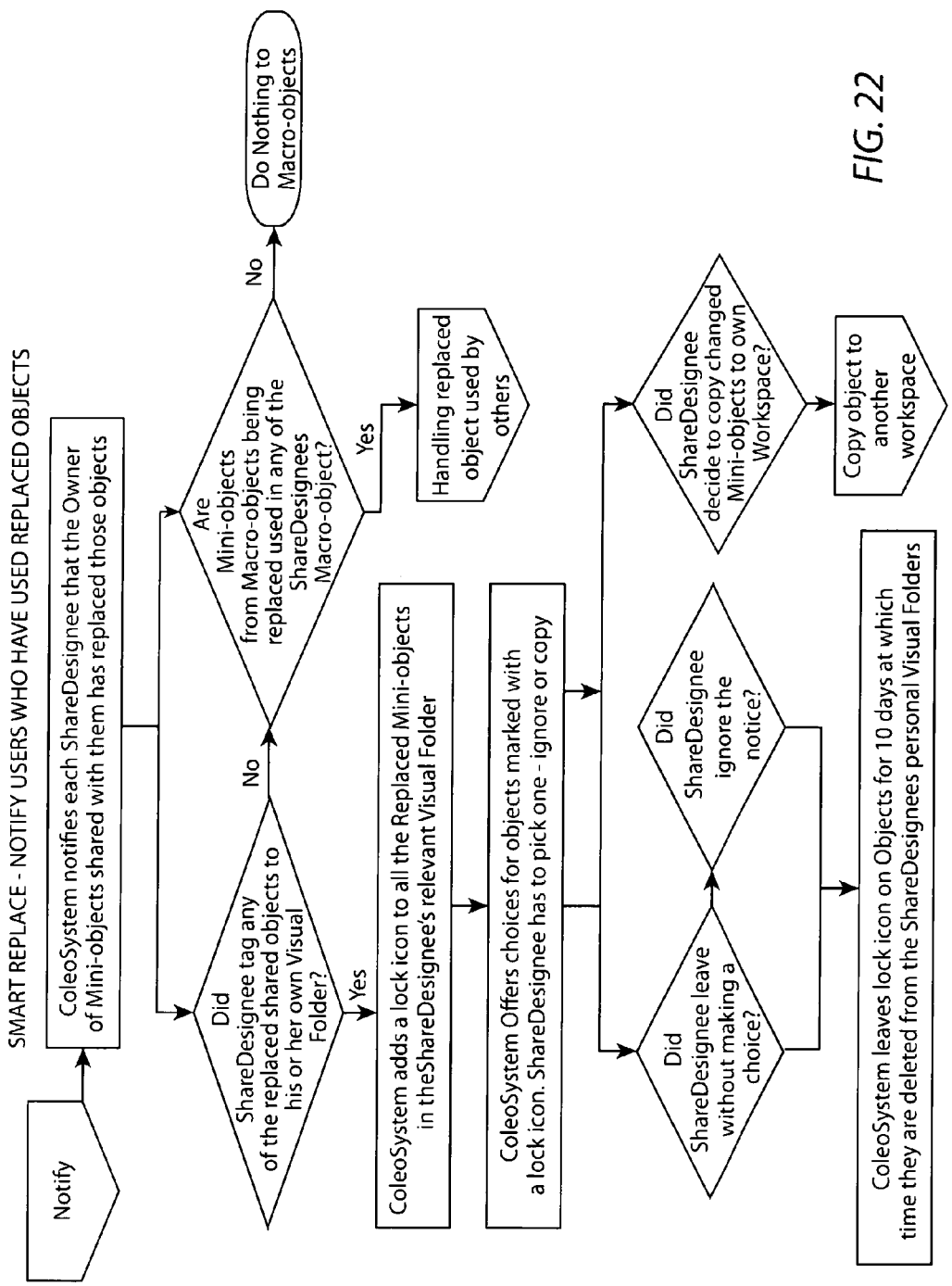
Figure 23:
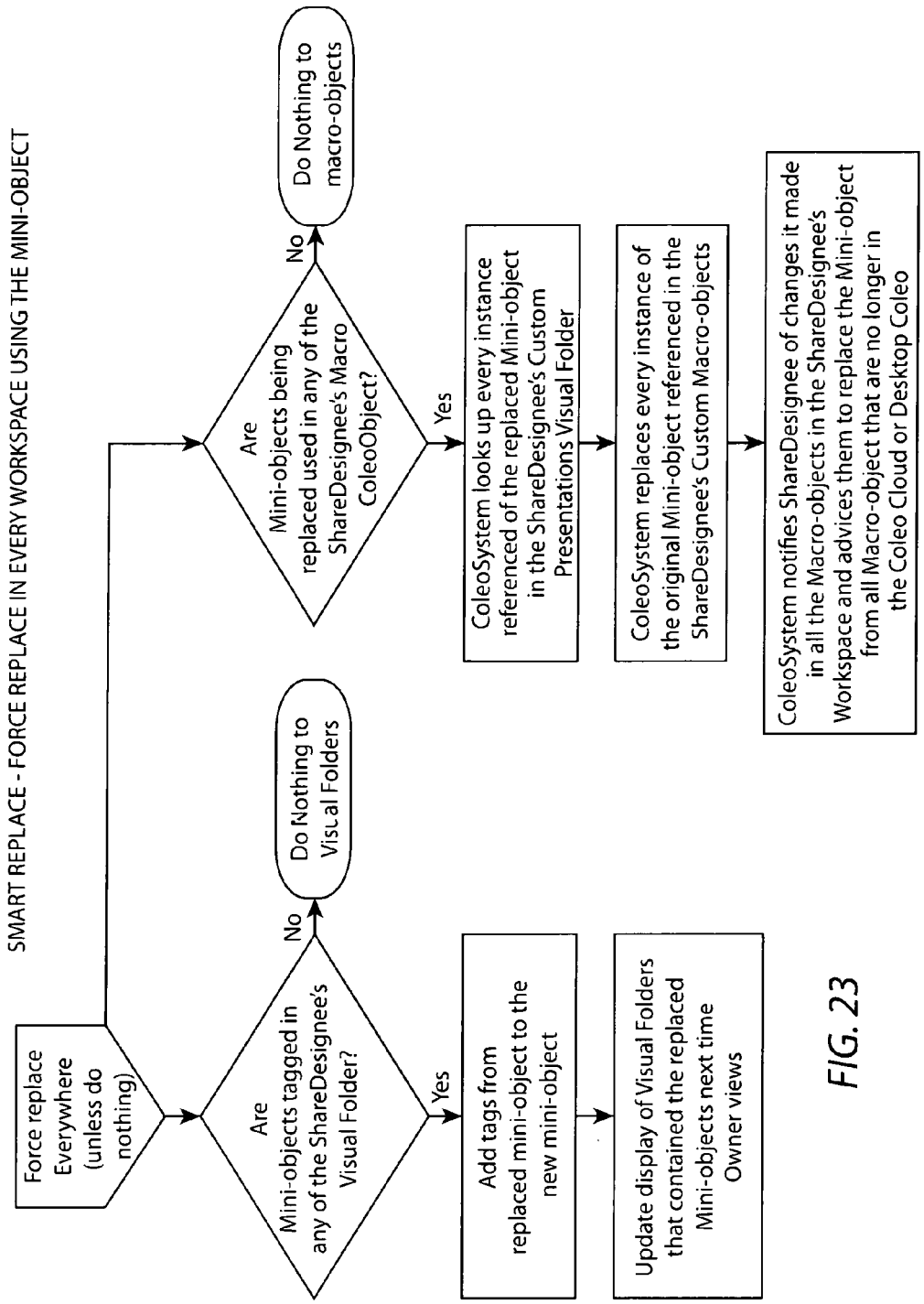
Figure 24:
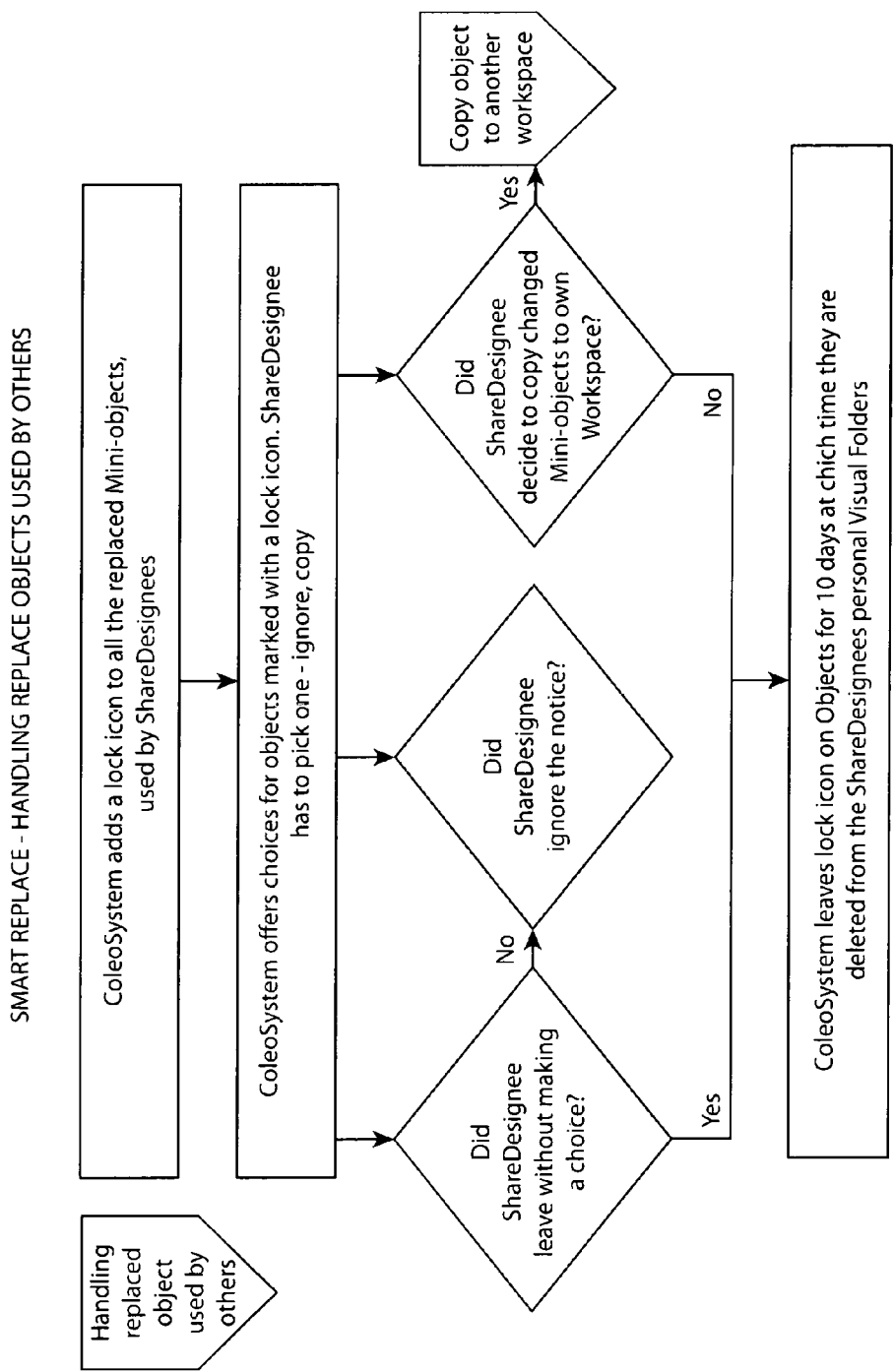

FIGS. 18, 25, and 26 illustrate the user interface for replacement of a Mini-object, notification to users when an owner replaces a Mini-object (a slide in this example) in their own workspace, and notification to other users of an owner's decision to replace a Mini-object everywhere (in this example a slide), respectively. FIGS. 16, 17, and 19-24 show the flowcharts of operations to replace Mini-objects and enable users to copy replaced Mini-objects to their own workspaces in accordance with another example.

In one example, the owner may decide to "Replace in My Workspace". Anywhere from which the original content was visible will now show the replaced content (e.g., slides) for both the owner and any users who had authorization for access to the content within the owner's workspace. Considered in more detail:

1. A request is sent to the API containing the list of pairs with replacement (i.e., new) Mini-object IDs and to-be-replaced (i.e., old) Mini-object IDs. For each pair of Mini-objects (e.g., slides) the following is performed:
2. If the replacement Mini-object ID has a value:
    a. Find the Mini-object that needs to be replaced from the Mini-object Collection using its ID.
    b. Find the replacement Mini-object from Mini-object Collection using its ID.
    c. Find all tags from the owner's workspace, which have been applied to the old Mini-object.
    d. For every tag, replace the old Mini-object with the replacement Mini-object.
    e. Find all Macro-objects located in the owner's workspace where the Mini-object to be replaced is used.
    f. For every located Macro-object, replace the old Mini-object with the replacement Mini-object, update the Macro-object, and store the updated Macro-object in the database.
    g. Update the tag collection in the database.

In another example, the owner may decide to replace everywhere. Consequently, the following actions are performed:

1. A request will be sent to the API containing a list of pairs with replacement (i.e., new) Mini-object IDs and to-be-replaced (i.e., old) Mini-object IDs. For each pair of Mini-objects the following is performed:
2. If the replacement Mini-object ID has a value, Repeat steps a-f from step 2 above. Then,
   a. Determine if other users have been granted access to the Mini-object and used in any Macro-objects by any other user.
   b. Replace the old Mini-object in those Macro-objects.
   c. Find all Visual Folders in which the Mini-object has been categorized and to which other users have been granted access.
   d. If the old Mini-object has been tagged with tags, for every tagged old Mini-object to which other users have access, replace the old Mini-object with the replacement Mini-object.
   e. Remove all tags from the old Mini-object.
   f. Update the tag collection in the database.
   g. Note: If the replacement Mini-object ID is empty (i.e., the user did not add a replacement Mini-object in the left-hand column), no action will be taken and the to-be-replaced Mini-object will not be replaced with "Replacing within My Workspace."

In one example, when the owner replaces a Mini-object in his/her own workspace only, all users of that Mini-object are notified and given the option to adopt the change made by the owner by also replacing the Mini-object in their own workspaces or copy the original Mini-object to their own workspaces and become the owner of the original Mini-object. Users will have thumbnails of both the original and the replaced Mini-objects for comparison purposes. In one non-limiting example, users have 10 days to make the decision, at which time, if no decision been made, their Mini-object will be replaced by the new replacement Mini-object everywhere they used the original Mini-object. Considered in more detail:

1. If the user ignores the notification (i.e., takes no action), the old Mini-object is replaced in the user's Macro-objects on the date specified in the notification.
2. If the user chooses to replace the Mini-object (i.e., update the Mini-object), the Smart Replace Block 218 replaces the Mini-object in all of the user's Macro-objects where the old Mini-object is used.
3. If the user chooses to "Copy Original" ("Provenance" rules as defined in the Smart Copy Block 216 apply):
   a) A new Macro-object will be created with the Mini-object and saved in the user's "My Files" folder.
   b) A metatag of original owner=previous owner of the Mini-object being copied will be added.
   c) The current owner of the Mini-object will be changed to the user who is copying the original Mini-object to their workspace.

In another example, when the owner forces a replacement of any Mini-object across all workspaces that used that Mini-object within new or existing Macro-objects, the users whose Macro-objects have been modified will receive a notification "[Name] replaced one or more mini-objects and requested they be replaced everywhere they are used. As a result, these mini-object(s) were replaced in all your custom macro-objects."

Figure 25:
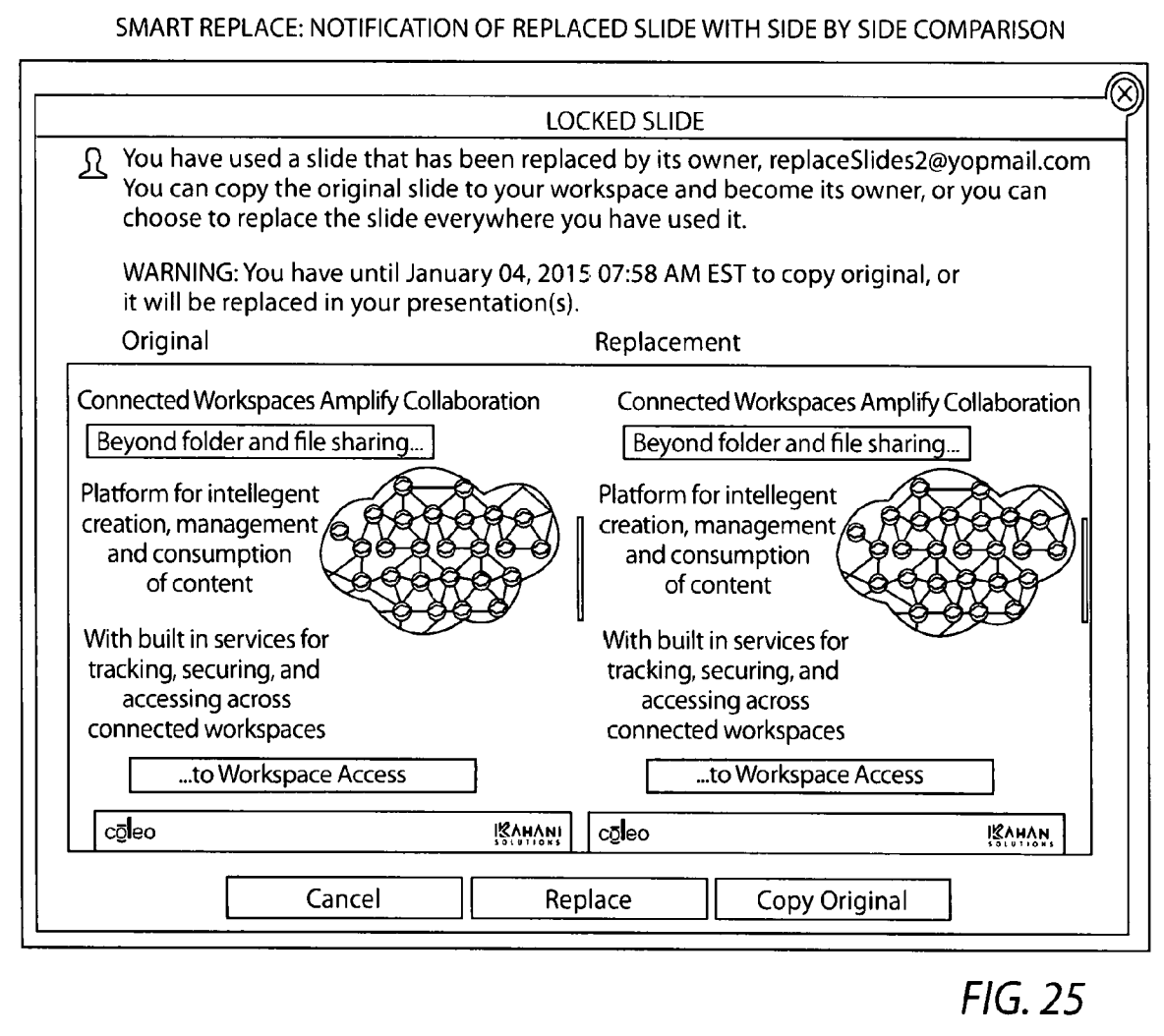

FIG. 25 illustrates notification of a replaced slide with side-by-side comparison.

The Coleo for PowerPoint® Block 220 enables users to access and use their connected workspaces from the Coleo Cloud or from their desktops directly from within PowerPoint®. Users can access Mini-objects (e.g., slides, images, video, and audio) to which they have been granted access within PowerPoint® to create new Macro-objects or modify existing Macro- and Mini-objects. This functionality is not available with any prior art applications, especially for providing access to shared content across distributed cloud databases directly within PowerPoint®.

Figure 27:
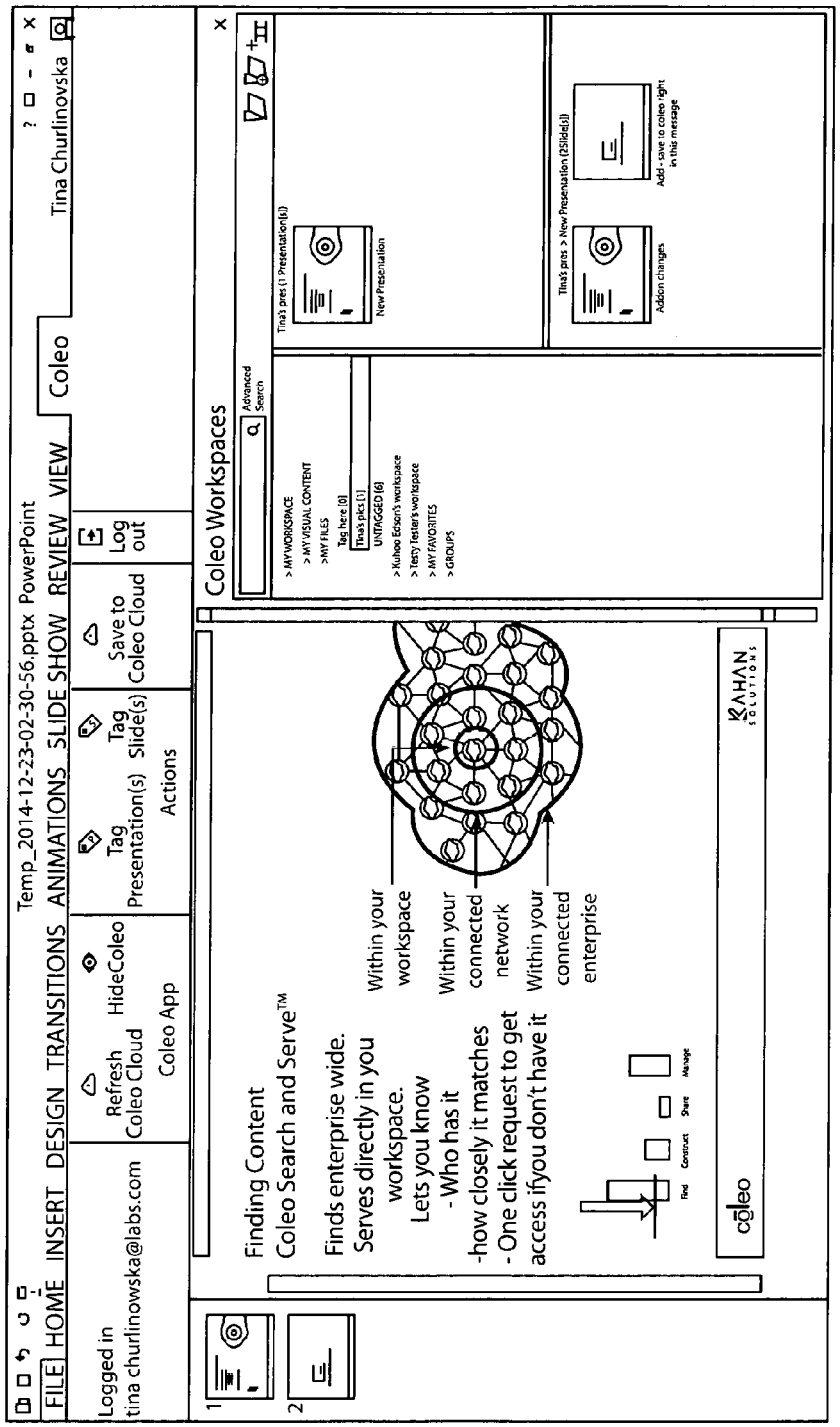
Figure 28:
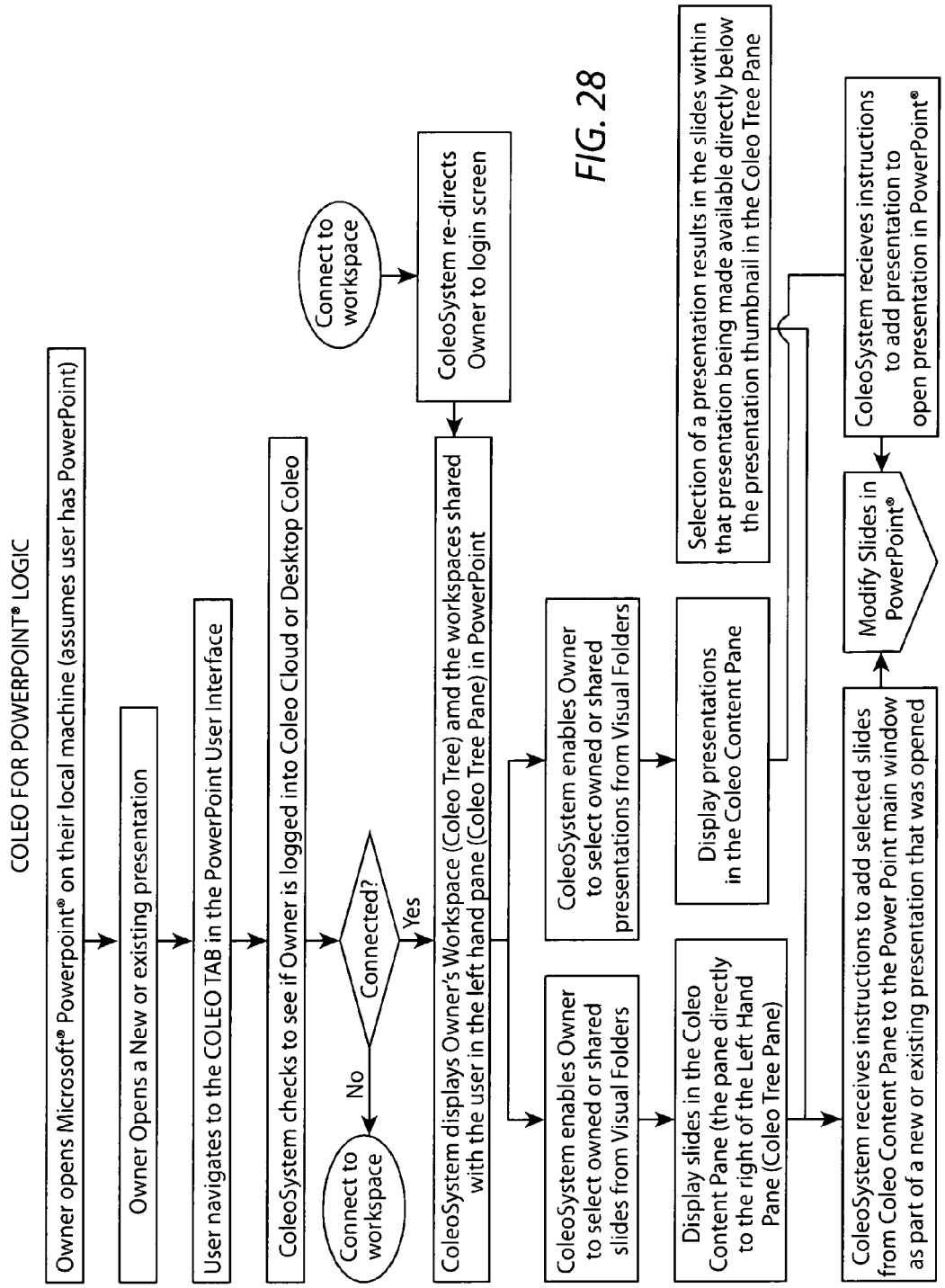
Figure 29:
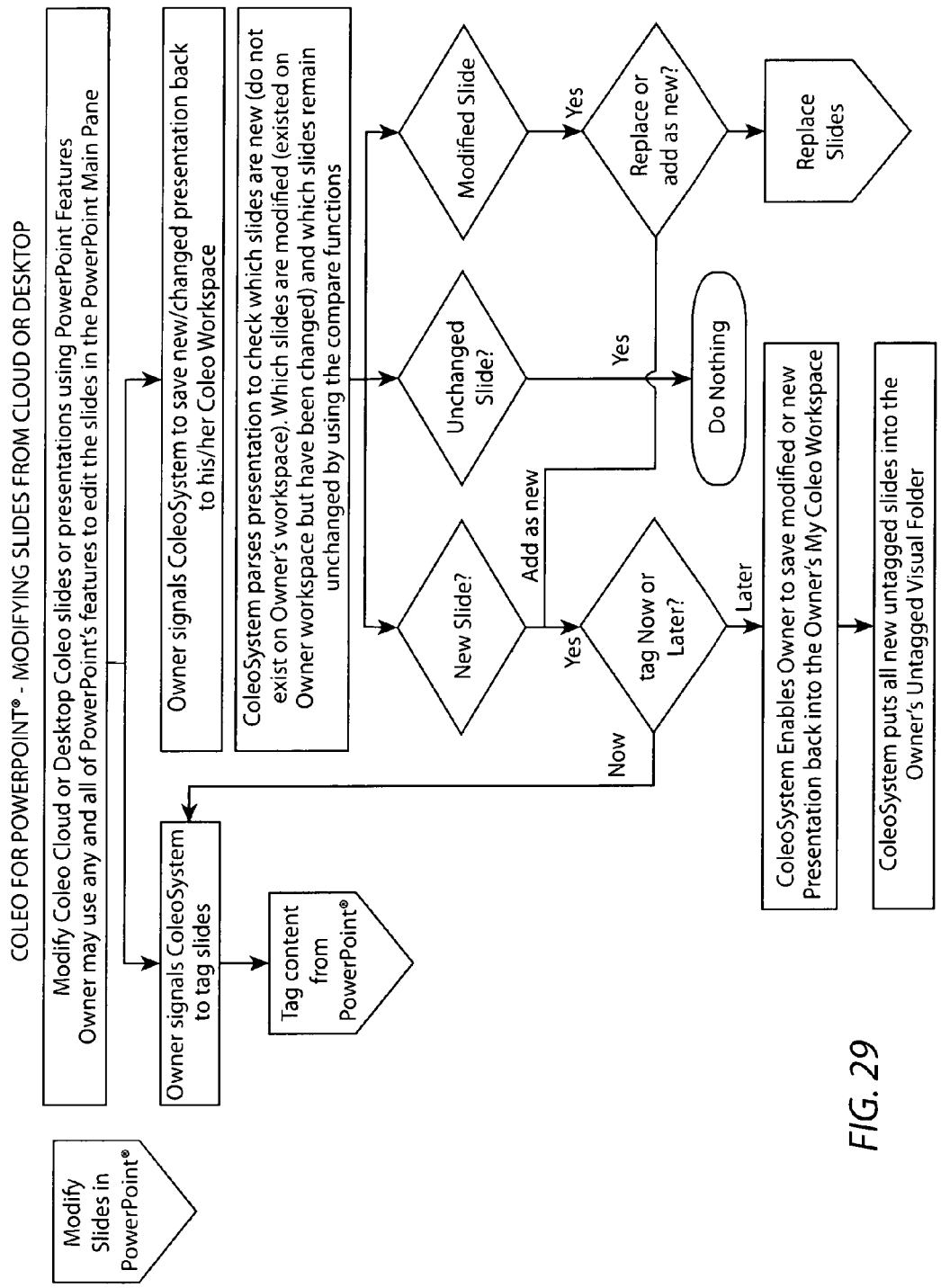
Figures 16, 30:
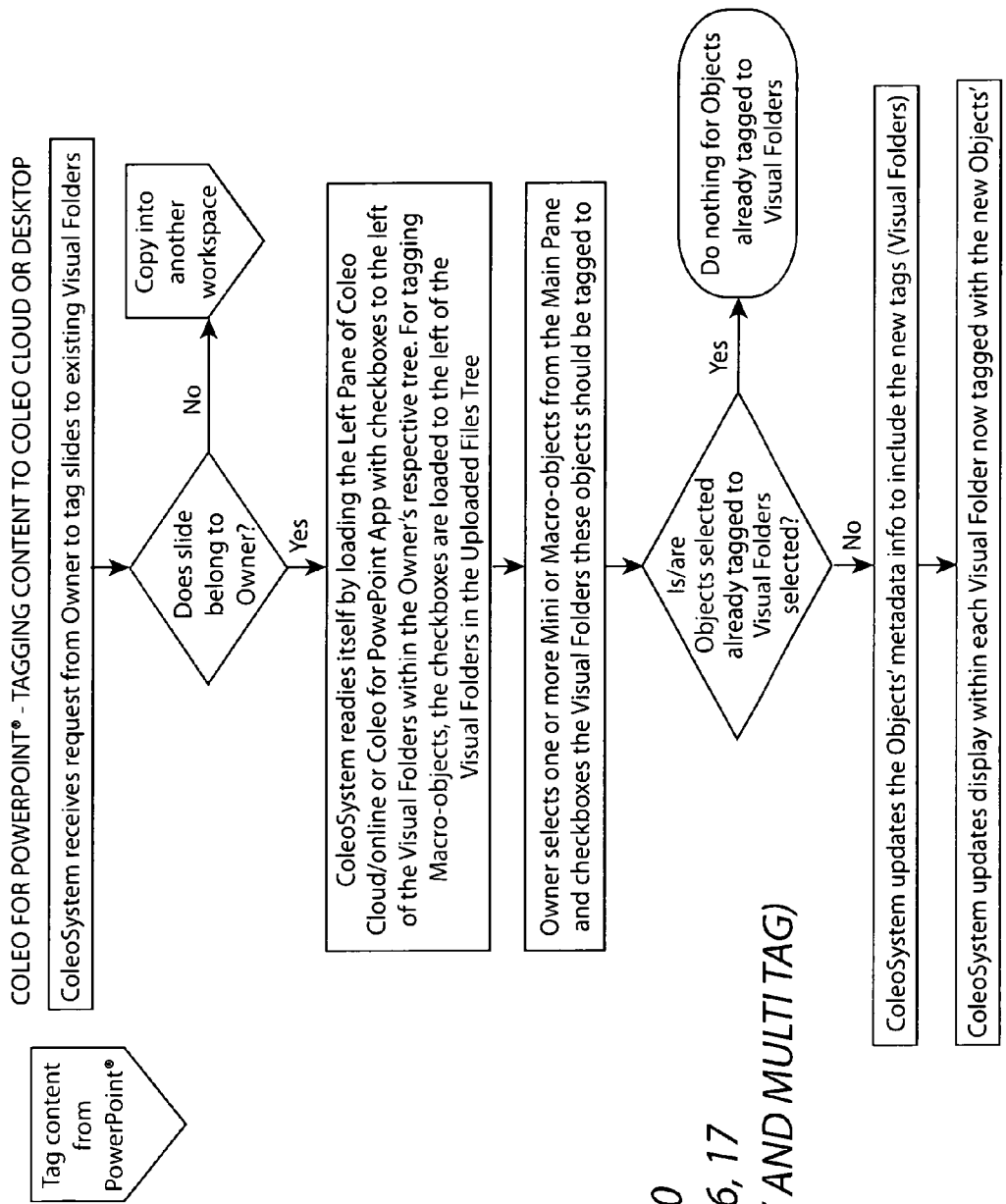

In one example, the user chooses to connect to Coleo Connected Workspaces from within PowerPoint®. FIG. 27 shows the user interface for the application from within PowerPoint®. FIGS. 28-30 illustrate the flowchart operations performed by the Coleo for PowerPoint® Block 220 in accordance with one non-limiting example.

1. The Coleo for PowerPoint® Block 220 loads the user's workspace, including shared workspaces, directly into Microsoft® PowerPoint®.
2. The user has access to the following capabilities added to the PowerPoint® Menu
   a) Logged in as: [emailAddress]
   b) Refresh Desktop Coleo
   c) Show Coleo/Hide Coleo (i.e., toggles)
   d) Coleo Font Crawler as defined in the Coleo for PowerPoint® Block 220
   e) Tag Slide(s)/Presentation
   f) Save to Desktop Coleo
   g) Switch to Coleo Cloud
3. The User has access to the following capabilities loaded into the right-hand menu area in PowerPoint®
   a) Workspaces—My Workspace/Shared Workspaces/Groups (of which user is a member)
   b) Content—to the right of Workspaces
      Presentation loaded—a section below will be displayed, which will load slides of a selected presentation.
      The user may navigate his/her trees and Visual Folders similar to utilizing the Manage Workspaces Block 234 by expanding the appropriate tree and Visual Folders, and then selecting the Visual Folder name to load that Visual Folder's content to the section directly to the right.
      The User may add/modify/delete Visual Folders in his/her workspace similar to utilizing the Manage Workspaces Block 234.
      Content will load in the section to the right of the workspaces section. If a presentation is loaded, the user may single-select the presentation thumbnail, and in the section below, the name of the presentation and slides in that presentation will load.
   c) Search for content to utilize that content. The user may request access to content to which the user does not already have access. This functionality operates the same as the search functionality previously defined utilizing the Smart Search and Find Similar Blocks 208 and 212 described earlier.
   d) The user may utilize a slider to adjust thumbnail sizes for Macro- and Mini-objects.

In one example, the user may select and open slides and presentations from his/her Connected Workspaces in PowerPoint® using the Coleo for PowerPoint® Block 220.

1. "My Files" includes file types other than PowerPoint®. As such, document type icons are displayed on thumbnails. The following file types may be viewed by a user:
   a) Audio
   b) Video
   c) Images
   d) Presentations
   e) Slides 2. Once content is loaded in the main area, the user may select one or more content thumbnails and perform the following actions:
   a) Single-select—loads slide thumbnails of a presentation.
      Presentation thumbnails only.
      Single-select only.
      The slide(s) within the selected thumbnail(s) will load in the main area of the section utilized by the Coleo for PowerPoint® Block 220 in the bottom portion.
   b) Double-select—opens selected content.
      Presentations and slides only.
      Multi-select.
      Each selected item of content will open in its own new PowerPoint® window as a presentation.
   c) The user may drag-and-drop content to a Visual Folder in left-hand area of the section. The content is tagged.
      Any type of content.
      Both slides and presentations can be tagged to My Visual Content's Visual Folders and Groups>[Group Name]'s Visual Content's Visual Folders (groups of which user is a member). If a presentation is tagged, the slides within the selected presentation are tagged.
      Presentations and media can be tagged to My Files' Visual Folders and Groups>[Group Name]'s Files' Visual Folders as will be described below.
   d) The user may drag-and-drop to an open PowerPoint® presentation (i.e., in the same window) to add to the open presentation.
      Slide(s)—The user adds the slide(s) to the open presentation after the currently selected slide.
      Media—The user adds the media to the open presentation in the currently selected slide.

In one non-limiting example, the information being processed by the Coleo for PowerPoint® Block 220 is cached, with the exception of checking to determine if the thumbnail of the slide has been changed. When the user selects "Refresh Coleo Cloud", the Coleo for PowerPoint® Block 220 refreshes the information, reflecting any updates that have occurred since the last refresh. The refreshed information includes changes such as access granted/revoked and new/modified content.

In one example, users may directly tag their slides and presentations directly from PowerPoint®. Users can tag presentations and slides in three ways:
1. Drag-and-drop from main the PowerPoint® window over a Visual Folder. To tag slides, the user can grab single/multiple slides from PowerPoint® and drop them onto a Visual Folder into the application section. The Visual Folder will change its appearance to designate the action:
   a) Valid folder—If the slides being placed over the Visual Folder can be tagged there, then the Visual Folder will emphasize to designate that the slides can be dropped.
   b) Invalid folder—If the slides being placed over the Visual Folder cannot be tagged there, then an appropriate windows-style icon will appear to designate the restricted permission.
2. Drag-and-drop from application main area over a Visual Folder. To tag slides, presentations, and/or media within the application, the user may grab single or multiple items of content from the main area of the application and drop them on a Visual Folder in the left-hand area of the application. This includes tagging other users' content to the user's own Visual Folders.
   a) Valid folder—If the content being placed over the Visual Folder can be tagged there, then the Visual Folder will emphasize to designate that the content can be dropped.
   b) Invalid folder—If the content being placed over the Visual Folder cannot be tagged there, then an appropriate windows-style icon will appear to designate the restricted permission.

In one non-limiting example, the user saves a presentation from PowerPoint® directly to the Coleo Cloud. The following rules apply:
1. Existing presentation with no modifications—a dialog is displayed "You haven't made any modifications to this presentation so there is no need to save at this time. [Ok]"
2. Images: If the user modifies an existing image that was added to a slide, the modification is not considered a modification to the image, but rather the slide.
3. Slide: If another user's slides were used but not modified, the presentation will point to the existing slides in the other user's workspace in the database, rather than create new slides in the owner's workspace. This enables any changes the original owners of the slides make to be propagated. If another user's slides were used and modified, and the user using these slides had Co-edit permissions, options on how to save the changes will be presented to the user.
   a) ( ) Create New—My Workspace
   b) ( ) Create New—Owner's workspace
   c) ( ) Replace Existing Version—[My Workspace and/or Owner's workspace] only
   d) ( ) Replace Existing Version—Everywhere
4. Presentation
   a) If a presentation is modified, the user will have appropriate choices to create new or replace the presentation, depending upon whether the user is the owner, has Co-edit access, or lacks a Check Duplicates tab.

In another example, when the user is connected in either online (Coleo Cloud) or offline (Desktop Coleo) mode, he/she may switch to the other mode.
1. Switch Coleo Cloud→Desktop Coleo (online→offline) mode
   a) Once the user is successfully connected in the online mode, selecting "Switch to Desktop Coleo" will initiate a check to determine if Desktop Coleo is installed.
   b) If Desktop Coleo is not installed, the user will be notified and requested to install the desktop application and directed to a link from which the user can download the desktop application. Until installed, the user will remain in the online mode.
   c) If Desktop Coleo is installed, then:
      If a single presentation is open, and the user made modifications to the content or uploaded new content, the user is notified that he/she has unsaved changes and if he/she switches modes, all changes will be lost.
         a) If "Save and switch"—A "Save to Coleo Cloud" dialog will load. Upon a successful save, the mode will be switched (the same checks for switching apply as when "Switch" is selected).
         b) If "Switch"—Upon select, the pop up message closes, and no changes are saved. If Desktop Coleo is not running, it will be started up with the last credentials saved into the local database. If there are not any credentials saved, a "Sign in to Coleo Cloud" screen will load.
c) Only if Desktop Coleo is successfully started up will the mode be switched, with the Desktop Coleo ribbon and Coleo for PowerPoint® application section loaded. In the meanwhile, the user will remain in the online mode, and the processing wheel will indicate that the user is waiting.
d) If a single presentation is open and the user did not make any changes, Coleo Cloud mode will be exited and switched to Desktop Coleo mode only if the Desktop Coleo mode is successfully started up (i.e., same as in the previous case described above).
e) If multiple presentations are open, the user will be asked to close all presentations before switching.

2. Switch from Desktop Coleo→Coleo Cloud (offline→online)
a) If the user switches from Desktop Coleo (i.e., offline) to Coleo Cloud (i.e., online), checks will be performed in the following order:
b) The user has an active internet connection.
If the user does not have an active internet connection, the user will receive a message informing him/her of the need to connect to the internet.
If a single presentation is open, and the user made modifications to the content or uploaded new content, the user can:
a) "Save and switch"—A "Save to Desktop Coleo" dialog will load. Upon a successful save, the mode will be switched (the same checks for switching apply as when "Switch" is selected).
b) "Switch"—the pop up message closes, and no changes are saved. Proceed to check if credentials are saved.
When the user is successfully connected, the mode will be switched. In the meanwhile, the user will remain in the offline mode, and the processing wheel will indicate that user will have to wait.
If a single presentation is open and the user did not make any changes, the Desktop Coleo mode will be exited and switched to the Coleo Cloud mode only if valid credentials are entered (i.e., same as in the previous case described above).
If multiple presentations are open, the user will be asked to close all presentations before switching.

In one example, the user can search for his/her own or shared slides directly from within PowerPoint® while the Coleo for PowerPoint® Block 220 is in operation. The search is performed in the same manner as the search function describer earlier utilizing the Smart Search Block 208.

In this example, the user views the results from the search function within PowerPoint®.

1. Search results are displayed in the top portion of the main area of the application. As is the case in Coleo Cloud, the number of search results will be displayed where the breadcrumbs normally appear.
2. If a search result is a presentation, the user can double-select to open the slides for that presentation in the bottom portion of the main area. This is the standard action for the user to open slides in a presentation within the application.

In another example, the user selects content from the search results to add to slides or the presentation which is open in PowerPoint®. It is possible that a combination of content may be returned in the search results comprising two or more slides, images, audio, and video. If the user selects multiple content and then takes action (e.g., double selects or drags-and-drops):

1. Double-select opens the slides or presentations. If media files are double-selected, the user is notified that these file types cannot be opened within PowerPoint® and that the user can only add media elements to existing slides in a presentation.
2. In the case of drag-and-drop:
If the user selects only media, the media is added to the currently selected slide open in the main PowerPoint® window.
If the user selects only a slide(s), the slide(s) is added to the currently open presentation, inserted after the currently selected slide open in the main PowerPoint® window.
If the user selects a combination of media and a slide(s), drag-and-drop can be utilized to add them to the presentation as described directly above.
If the user selects some combination of media/slide(s) and presentation(s), drag- and drop can be utilized to add them to the open presentation as described above.
If the user selects only presentation(s), all slides from the presentation will be added to the open presentation.

In one non-limiting example, when the user creates a new presentation or modifies an existing presentation, he/she has the option to save the presentation to the Coleo Cloud by selecting the "Save to Coleo Cloud" function. A smart check is performed to determine if the user made any modifications to a presentation.

1. If an existing presentation has no modifications, a dialog is displayed "You haven't made any modifications to this presentation so there is no need to save at this time. [Ok]"
2. Images: If the user has modified an existing image that was added to a slide, it is not considered a modification to the image, but rather a modification to the slide.
3. If another user's slide was used and not modified, the presentation will point to the existing slide in the database, rather than create the slide as user's own slide in a presentation.
4. If another user's slide was used and modified, the user will be presented with options, if they have co-edit access. The action for the slide will depend upon the option chosen by the user as will be described below.
a) If a user used any existing slides owned by the user or to which the user has co-edit access in the presentation and modified them, the Coleo for PowerPoint® Block 220 needs to determine from the user how to handle them.
b) Slide Dialog:
( ) Create New—My Workspace
( ) Create New—Owner's workspace
( ) Replace Existing Version—[My Workspace and/or Owner's workspace] only
( ) Replace Existing Version—Everywhere
c) Slide Notes:
"Create New—My Workspace"
a) Only displayed if "My Workspace" (presentation) was selected.
b) Default, if displayed.
c) Modified slides (owner's and to which the user has co-edit access) will be created within the user's workspace.
"Create New—Owner's workspace"
a) Only displayed if "Owner's workspace" (presentation) was selected.

b) Default, if displayed.
c) Modified slides (owner's and to which the user has co-edit access) will be created within workspace of the owner of the presentation.

"Replace Existing Version—[My Workspace and/or Owner's workspace]"
  a) "Smart" check—based upon whether or not the user has any slides in the presentation to which he/she has co-edit permissions+whether or not the user has any of his/her own slides in the presentation, which will cause either "My Workspace", "My Workspace and Owner's workspace", or "Owner's workspace" to be displayed.
  b) Creates a new version of the slide, replacing the current version in "My Workspace". "My Workspace" refers to the overall action which a user with the slide in his/her presentation will have the option to copy or replace.
  c) Applies to both the user's own slides and slides owned by others to which the user has co-edit access.

"Replace Existing Version—Everywhere"
  a) Creates a new version of the slide, replacing the current version "everywhere".
  b) The Applies to both user's own slides and slides of other user to which user has co-edit access.

5. If the user does not have co-edit access, a new slide is created in the user's presentation (i.e., the user is now owner of the new slide.)
6. If the user's own slide was used and modified, the options vary depending upon whether or not user is editing his/her own presentation or a presentation owned by another user to which the user has co-edit access. See the description of the "Slide dialog" and "Slide notes" above for details.
7. Reordering—If slides are reordered within a presentation, then the user can Save the reordered presentation to the Coleo Cloud.
8. If a presentation is modified, the user will be given appropriate choices to create a new presentation or replace presentation with the modified presentation, depending upon whether the user is the owner, has co-edit access, or lacks co-edit access.
  a) Presentation Dialog:
  b) Enter your presentation name and where the presentation will be saved.
    ( ) My Workspace
      a) Name: [textbox] *(required)
      b) [ ] Replace existing presentation in My Files if the name already exists.
    ( ) Owner's workspace
      a) Name: [ textbox] *(required)
      b) [ ] Replace the existing presentation in the owner's My Files if the name already exists.
    Comments: [textbox]
  c) Notes Presentation:
    "My Workspace"—default.
    "Owner's workspace"—only shown if the user has co-edit access to that other user's presentation.
    "Name: [textbox]"—by default use the name of the presentation. The user can modify the name.
      a) Required for selected option (e.g., if "My Workspace" is selected, the Name field underneath is required.)
    "Replace . . . "—creates a new version of the presentation, replacing the existing version (if a presentation exists with that name). If no presentation of that name exists, a new presentation created in the selected workspace—My Workspace or Owner's workspace.
    "Comments"—not required. Supports up to 255 characters which are displayed in History info in metadata for that version of the created presentation.

The Coleo for PowerPoint® Block 220 comprises a font crawler function which enables a user to modify fonts in the entire presentation. Prior art applications such as Microsoft® PowerPoint® allow users to change fonts across the whole document but in a very limited fashion. One, the user must type in the font to change from, which forces the user to know every font that exists in the presentation. Second, only one font type can be swapped at a time. Third, the user is not enabled to change the font size across the whole document. Fourth, the user is not enabled to specify where to make the changes, for example, in the title or just the content or just the header/footer.

Figure 31:
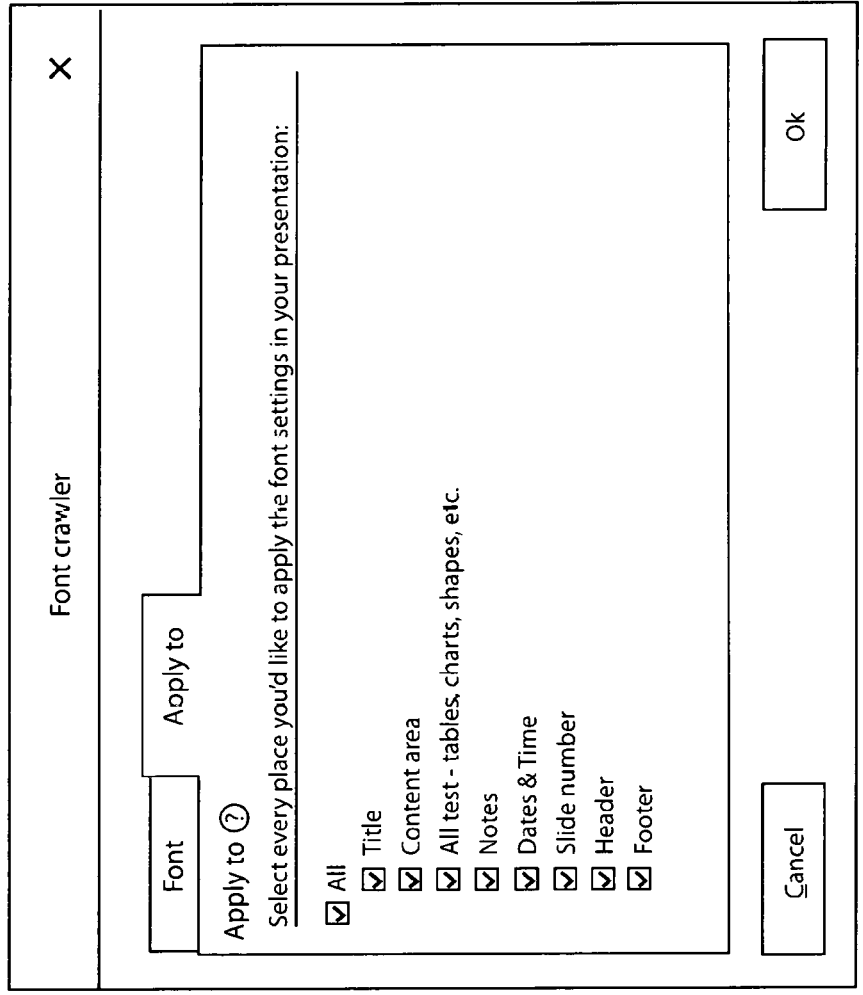
Figure 32:
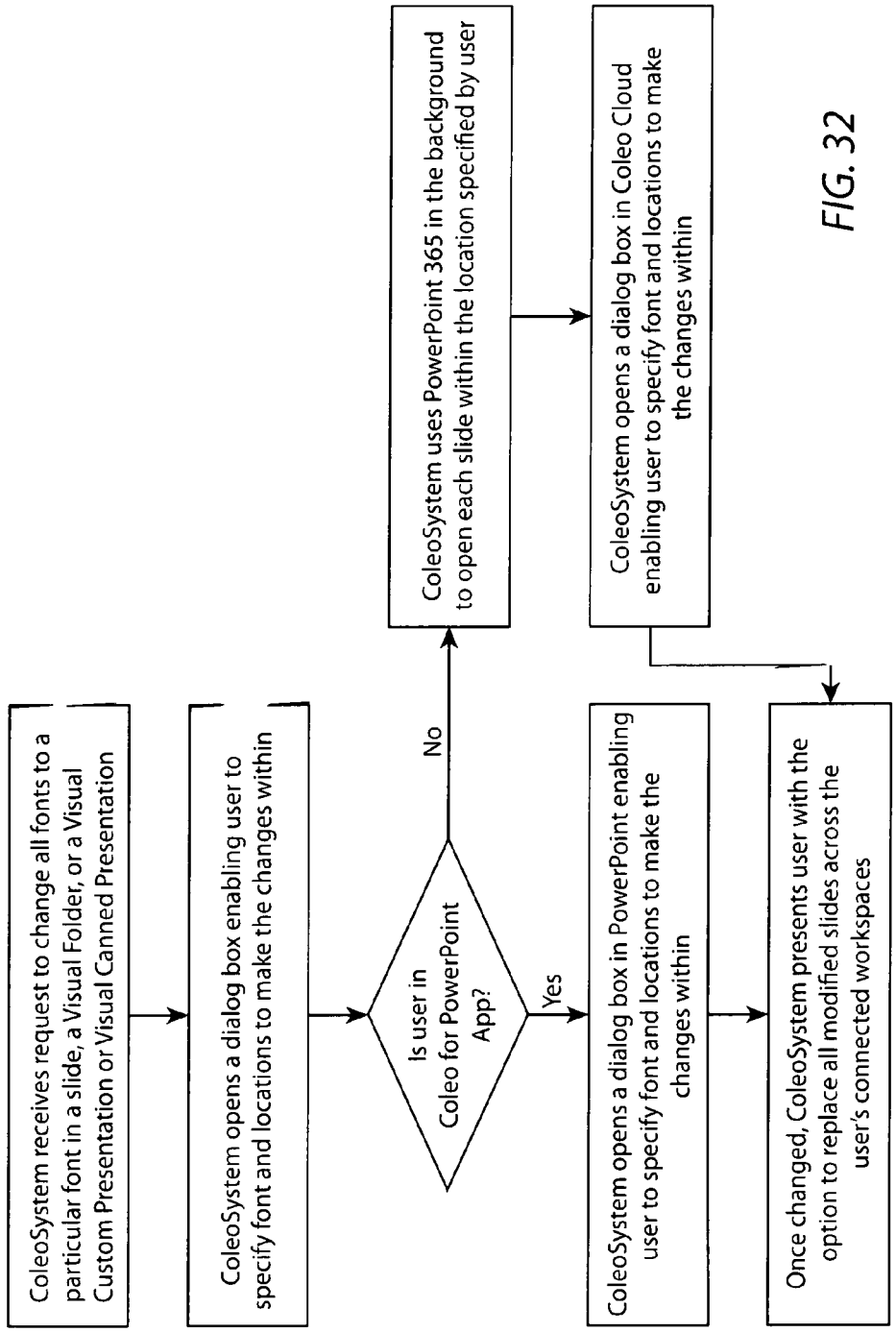
Figure 35:
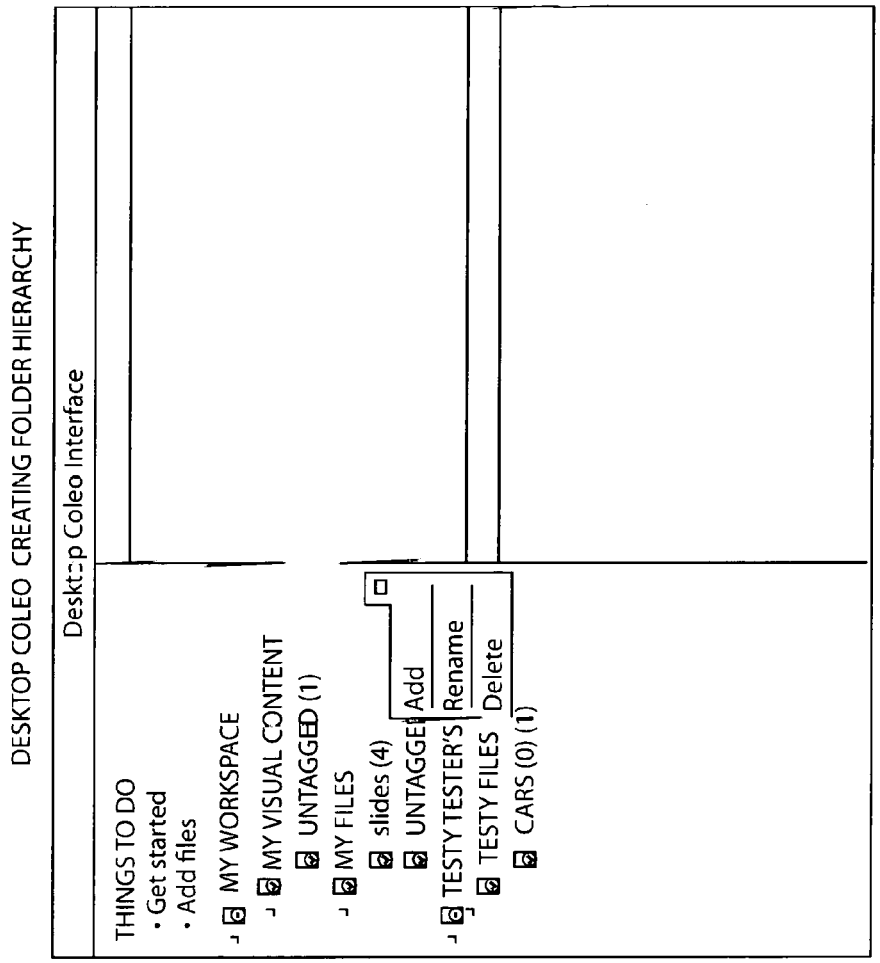
Figure 36:
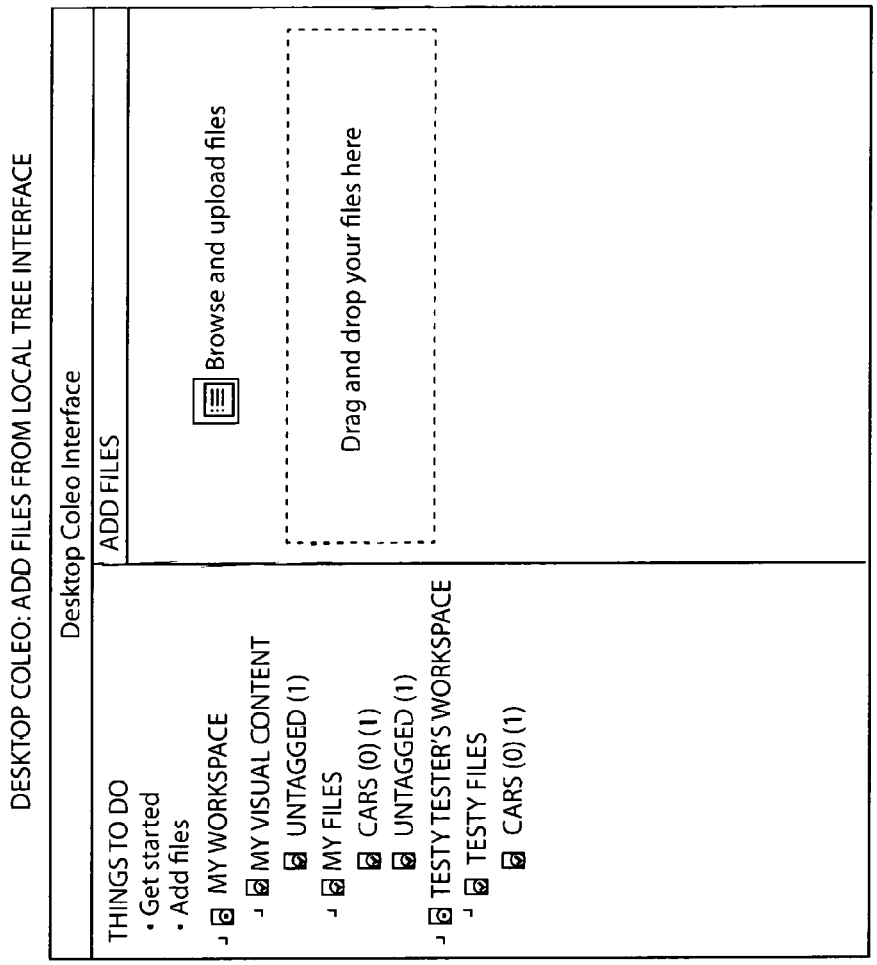
Figure 37:
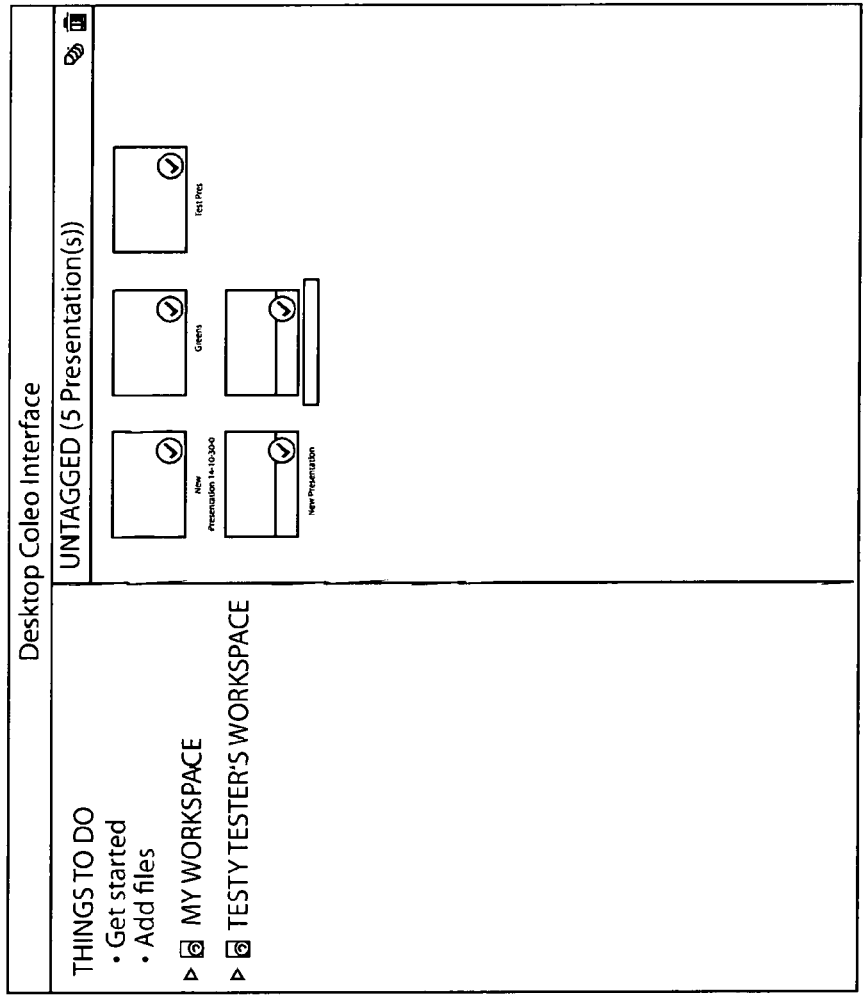

In one example, the user may select "Font Crawler" in the ribbon bar to modify fonts in his/her open presentation. The user can select the portions of the presentation he/she wants modified, with various font options available from the standard Font dialog. There is no restriction on how many times a user may run "Font Crawler" on a presentation. This is because the user may want to set one "place" (e.g., Title, Notes, or any other option in the Apply to tab) with different font settings than another "place" in the presentation, or he/she may want to modify his/her previous font updates. FIG. 31 shows a portion of the user interface for defining where the fonts should be changed. FIG. 32 shows the flowchart operations performed when changing fonts in accordance with one example. When "Font Crawler" is selected, a pop up will open, with tabs for each "decision" the owner may make, each with default selections preset. These tabs are:
  1. The font tab: This tab enables the user to select the font he/she wants to apply to the presentation.
  2. The Apply to tab: This tab enables the user to select every "place" within the presentation where he/she wants to apply the new font settings. The user can chose, one, many, or all.
    a) Title
    b) Content area—selected by default.
    c) All text—Tables, Charts, Shapes, etc.
    d) Notes
    e) Date & Time
    f) Slide number
    g) Header
    h) Footer The Desktop Coleo Block 222 controls the way owned and shared content is synchronized to the owner's local machine. Prior art cloud file sharing applications have the following limitations:
  1. Only synchronize Macro-objects and have no concept of Mini-objects.
  2. Do not provide any mechanism to identify the owner of shared content once the content is synchronized to the user's local machine.
  3. Does not allow users to mark content for sharing in an offline mode.
  4. Allows users to only select which folders to synchronize, does not distinguish between shared and owned content, and does not distinguish between owners of various shared content.

In contrast, the Desktop Coleo Block 222 synchronizes Macro- and Mini-objects, clearly organizes content by the owner's workspace, allows users to determine if they want to synchronize their content, content that is shared with them per content owner, or synchronize a combination thereof, and enables users to grant access to local content which synchronizes and executes once the user is connected to the internet. The Desktop Coleo Block 222 enables users to synchronize to/from their computers and Coleo Cloud, specifically:

5. Their Workspace
6. Other users' connected workspaces.
7. Groups of which they are a member.
8. Coleo contacts with whom to share.

Figure 33:
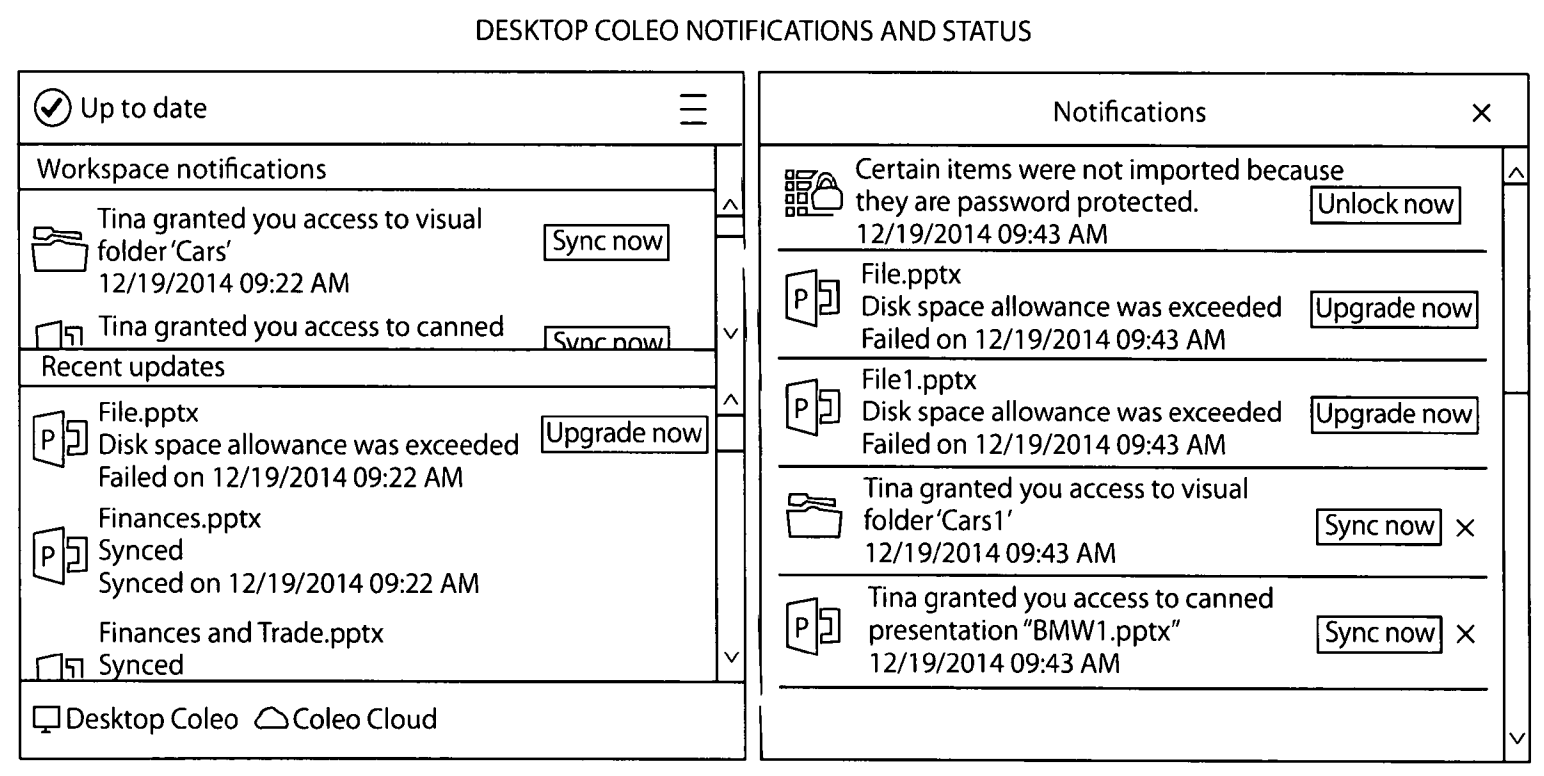

FIG. 33 shows the notifications and status interface. FIGS. 34-37 show various aspects of the user interface for Desktop Coleo in accordance with one example.

The interface provided by the Desktop Coleo Block 222 will contain the last synchronized workspace-tree structure from the Coleo Cloud based on what the user selected utilizing the functionality defined in setting preferences in the what to sync section of the Desktop Coleo Block 222.

1. The user can perform the following actions utilizing the interface:
   a) Add files from File Explorer to Desktop Coleo (via drag-and-drop/browse)
   b) Tag content
   c) Add/Manage folders
   d) Preview content
   e) Open content in an appropriate application
   f) Delete content
2. The interface consists of two sections.
   a) Left hand area
      Things to do
         a) Get started—summarizes what the user can perform with Desktop Coleo
         b) Add files—opens the add files dialog
         c) Grant access—enables the grant access function in the right pane
      Workspaces/Groups (enterprise only)
         a) My Workspace
         b) Shared Workspaces/Groups
   b) Right hand area (similar to utilizing the Coleo for PowerPoint® functionality)
      Content—to the right of Things to do and Workspaces.

In one example, the user may navigate his/her and shared trees and Visual Folders by expanding the appropriate tree and Visual Folders, and then selecting the Visual Folder name to load that Visual Folder's content to the section directly to the right. Note that the user can expand trees not only by selecting the expand/collapse arrow (same arrow as on the Coleo Cloud), but also selecting the tree name will result in the same action. For example if the user selects on the "My Files" tree, if it was collapsed, selecting on the name will expand it and vice versa.

1. Content will load in the section to the right of the Workspaces section. If Macro-object Type=presentation is loaded, the user may select the presentation thumbnail, and in the section below, the name of the folder, presentation, and slides in that presentation will load.
2. Visual Folder>More Options
   a) Mouse hovering over a Visual Folder belonging to user's own workspace (left-hand area) will display a "More Options" menu (with the exception of reserved folders). Selecting the menu will list options which will differ based on:
   b) If it is a folder created by the user, then the options are:
      Add sub-folder
      Rename
      Delete
   c) If it is a tree then the option is:
      Add sub-folder
      Note that selecting "Add sub-folder" or "Rename" will have the same look and feel as Coleo Cloud
3. Content area>Icons: Whenever the user selects either single/multiple Macro-objects from the Content area or single/multiple Mini-objects from the Macro-object being currently loaded, to the right of the name of the folder being currently opened, the following icons will be displayed:
   a) Remove from folder
   Delete
   Double selecting on a Macro- or Mini-object thumbnail will open in the appropriate parent application.
      Macro-object—one content thumbnail may be selected.
      Mini-object—one or more of the content thumbnails of the same type may be selected. The application will create a single file from the selected Mini-object and open using the parent application as long as the user has an active license for the application.
4. Move/drag-and-drop content
   a) The user will be able to move (i.e., reorder) folders by drag-and-drop. All restrictions which apply to reordering folders in Coleo Cloud also apply in Desktop Coleo.

In one example, the user desires to add files to Desktop Coleo from his/her local machine.

1. Selecting "Things to do>Add files" will enable the user to add files into Desktop Coleo either by drag-and-drop or via browsing his/her computer, the same as the Coleo Cloud. The interface to add files will load in the right-hand area.
2. As soon as any content is being added either via drag-and-drop or browsing, the pop up will immediately load with the following being displayed:
   a) Tag content—now/later
      "Now"—radio button; marked by default.
         a) When marked, the area below will expand to display the entire tree.
         b) If the user selects both the My visual Content and My Files folder, then:
            All Mini-objects contained in the Macro-object(s) being uploaded will be tagged into the selected Visual Folder(s).
            The Macro-objects(s) will be tagged in the selected My Files folder.
      "Later"—radio button; when marked, if the tree structure is loaded, the tree structure will not be displayed anymore and the area will collapse.
3. "Keep my folder structure" creates an identical folder structure under "My Files" into which the files are added.

Figure 39:
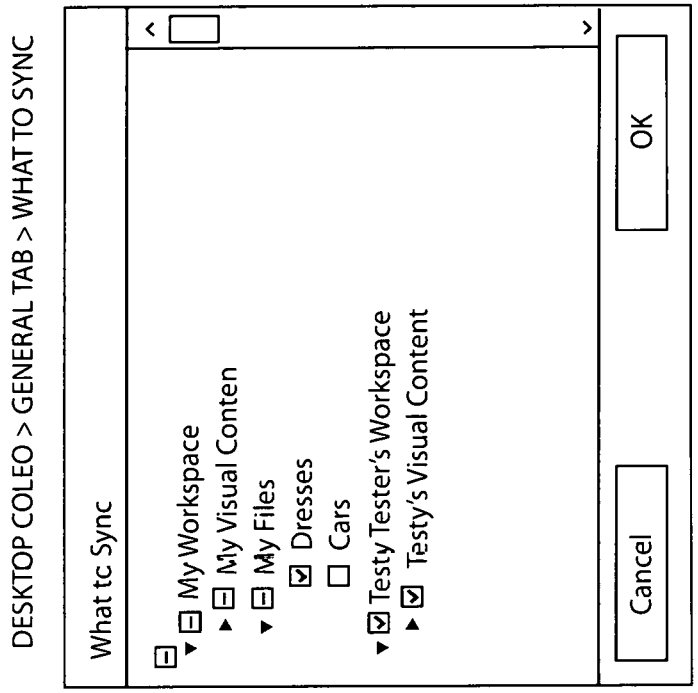

FIGS. 38 and 39 show the user interface for defining preferences in Desktop Coleo in accordance with one example.

In one example, when the user desires to select what to synchronize by selecting the sync option, a new window is opened utilizing the Desktop Coleo Block 222. The window shows a list of all workspaces (i.e., owned and shared) along with the tree structure within each workspace. The user is allowed to select which workspaces and which Visual Folders within the workspaces should be synchronized.

1. If any preferences under "What to Sync" are modified while content is actively being synchronized, any files in process of being synced will retain their old preferences. Any files yet to be synchronized will have the new preferences applied.

2. If the user adds a new folder utilizing the Desktop Coleo interface, then that new folder will be automatically marked under "What to sync" as soon as the user synchronizes the content with the Coleo Cloud. Also, if the user first marked to synchronize a certain folder and then decided to unmark it, the folder will be deleted within Desktop Coleo interface.

In one example, the user sets preferences for how he/she wants the Desktop Coleo Block 222 to handle synchronization of content to the Coleo Cloud. File Syncing preferences are accessed via the Main Desktop Coleo window>=>Preferences>File Syncing tab, where user specifies how to handle file syncing for checking duplicates (new content), privacy level (new content), and deleted content. The window includes are the following sections:

1. Check Duplicates—The user can select whether to check for duplicates immediately or later. This applies to both new and modified content that is successfully synchronized.
   a) Later—default; if marked, duplicates checking is not initiated upon successful sync.
   b) Now—if marked, duplicates checking is initiated when new or modified content synchronization is completed.
2. Privacy Level—If the user has new content in Desktop Coleo, the selected privacy level will apply when successfully synchronized. Note that this does not apply to existing content whether modified or not. It also does not apply to newly created Visual Folders.
   a) Public—if marked, new content which is synchronized will have a privacy level set as Public.
   b) Private—default; if marked, new content which is synchronized will have a privacy level set as Private.
   c) Confidential—default; if marked, new content which is synchronized will have a privacy level set as Confidential.
3. Deleted Content—If the user has deleted any content, the Desktop Coleo Block 222 determines how to handle the content when synchronizing. In the Coleo Cloud, the user has the option to set his/her Delete preferences; this preference in the Coleo Cloud is overruled by determinations made in Desktop Coleo when syncing.
   a) Delete My Workspace—default; If the user has set his/her File Syncing preferences for deleted content to "Delete—My Workspace", then any deleted content will be deleted within the user's own workspace only. The existing function for "Delete—My Workspace" defined in the Smart Delete Block 226 applies.
      Mini-objects—when synchronized, the Mini-objects within the user's workspace are deleted; user selection "Delete—My Workspace" triggers the "Delete—My Workspace" notification to other users with the deleted Mini-object in the current version of their Macro-object(s).
      Macro-objects—when synchronized up, the Macro-objects are deleted.
   b) Delete Everywhere—If the user has set his/her File Syncing preferences for deleted content to "Delete—Everywhere", then any deleted content will be deleted everywhere. The existing function for "Delete—Everywhere" defined in the Smart Delete Block 226] applies.
      Mini-objects—when synchronized, the Mini-object is deleted everywhere; user selection of "Delete—Everywhere" triggers the "Delete—Everywhere" notification to other users with the deleted Mini-objects in the current version of their Macro-object(s).
      Macro-objects—when synchronized up, the Macro-objects are deleted.

In a non-limiting example, if any preferences in the "File Syncing" tab are modified while content is actively being synchronized, any files in the process of being synced will retain their old preferences. Any files yet to be synchronized will have the new preferences applied.

Figure 40:
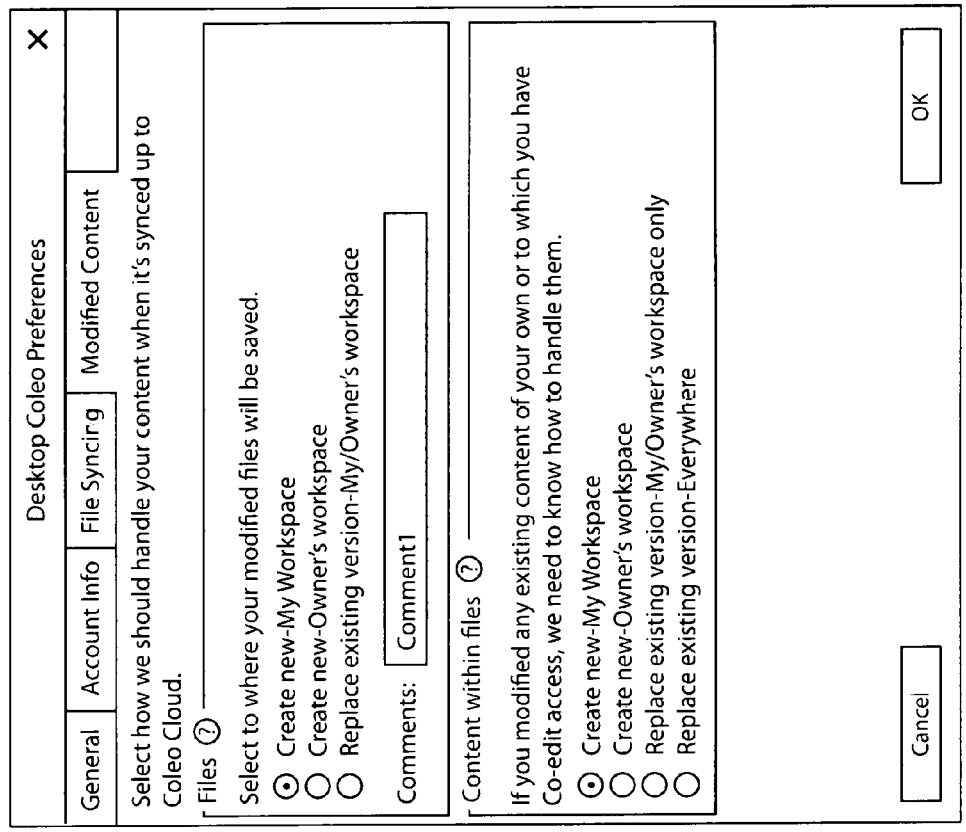
Figure 41:
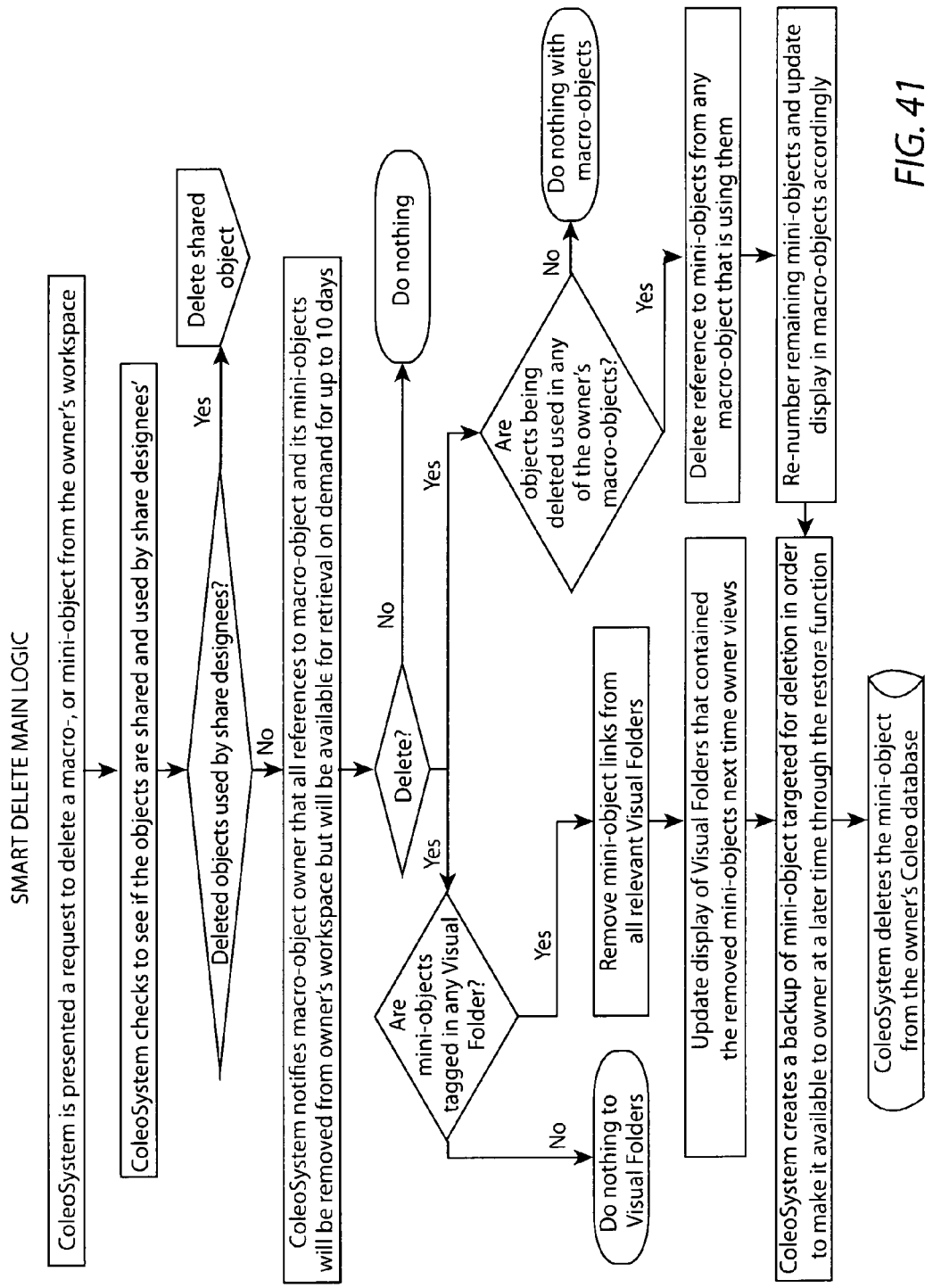
Figure 42:
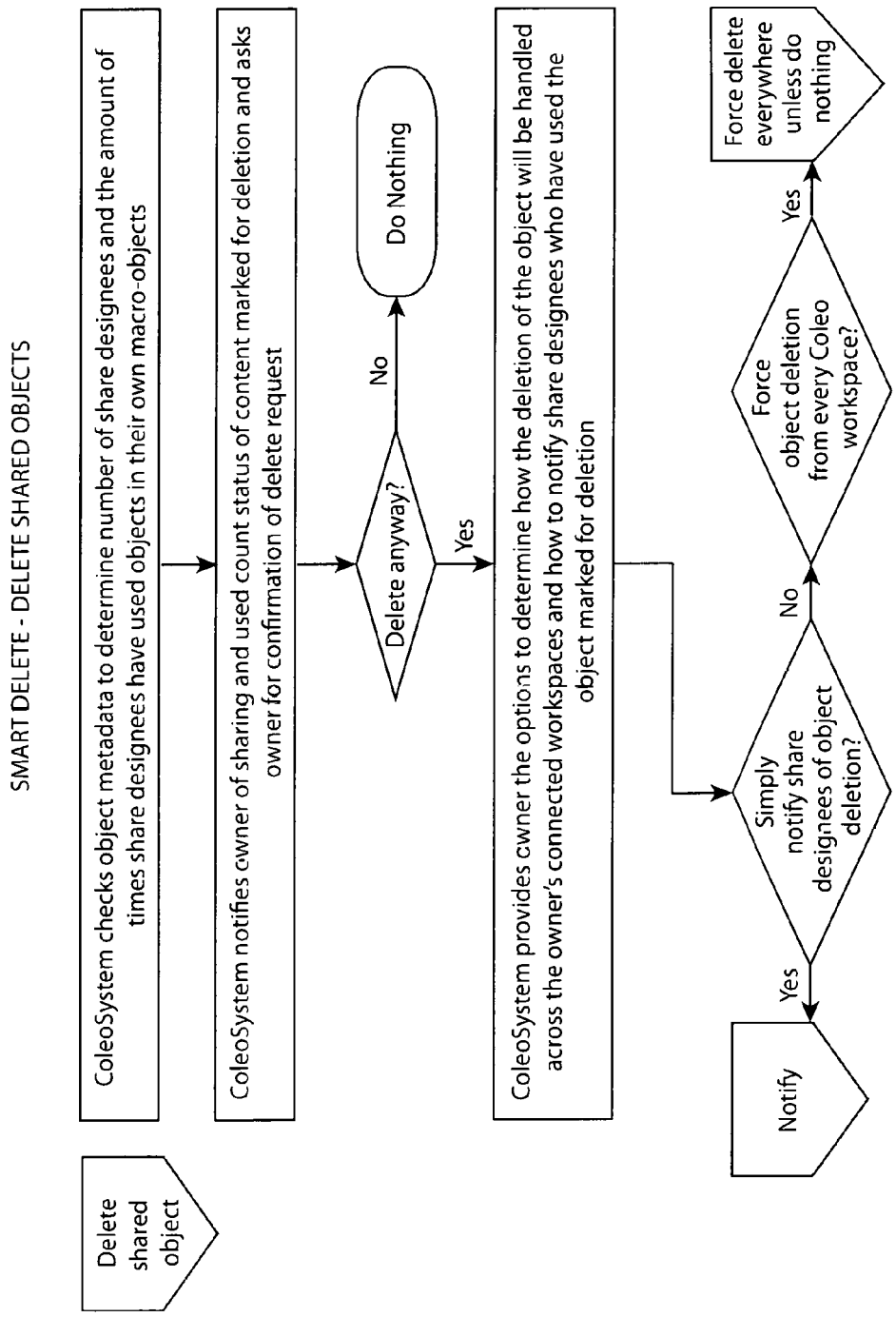
Figure 43:
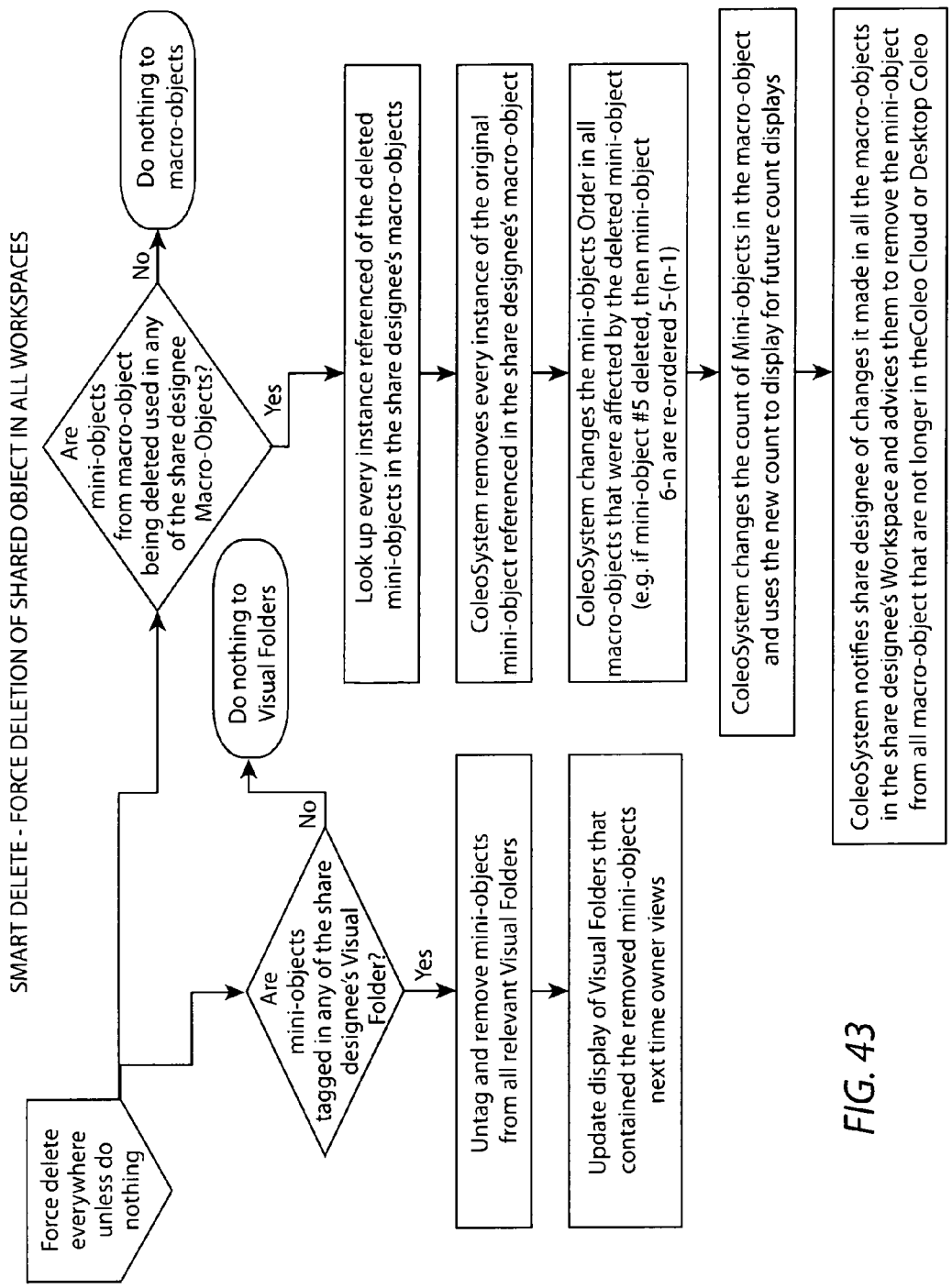
Figure 44:
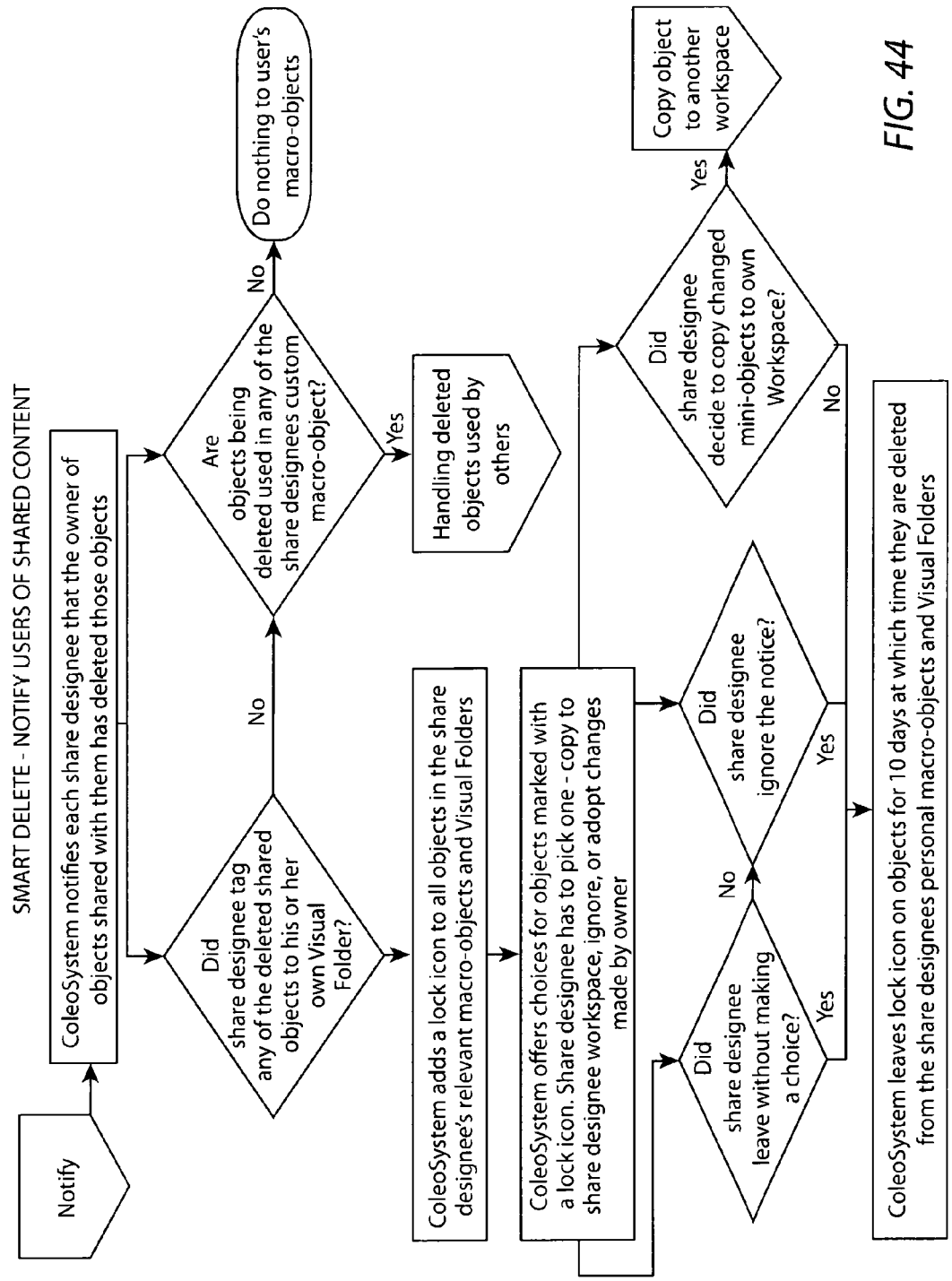
Figure 45:
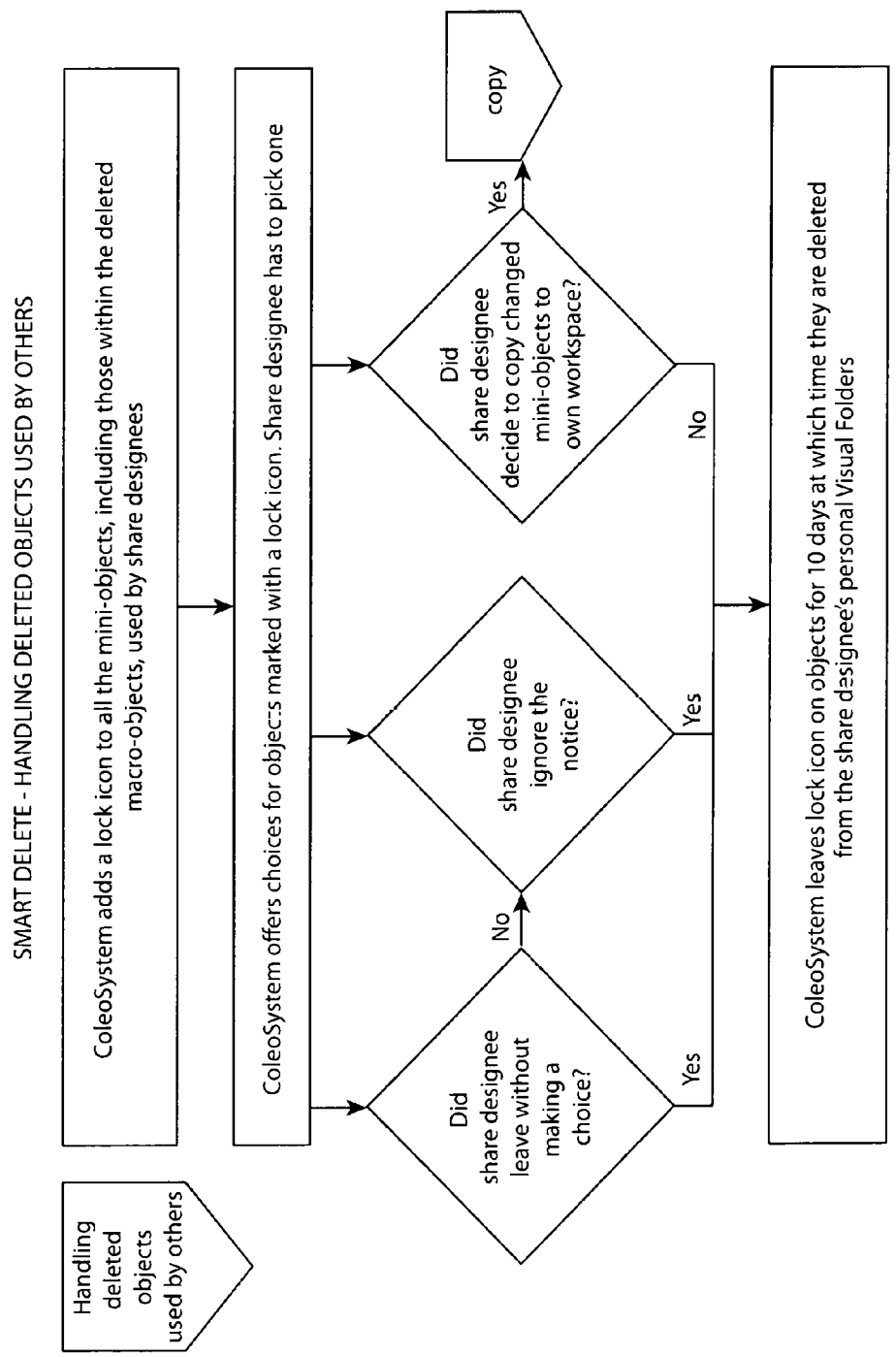

FIG. 40 shows the user interface for setting preferences respecting how modified content is handled upon synchronization in accordance with an example.

In another example, the user directs the Desktop Coleo Block 222 synchronization functions how to handle content that the user has modified while in the offline mode. The user needs to specify directions for Macro- and Mini-objects. These directions are used when Desktop Coleo contains content which also exists in the Coleo Cloud. In this example, the content in Desktop Coleo was modified since that content was last synchronized. Even if the content in the Coleo Cloud has a record of deletion or was modified after it was modified in Desktop Coleo, the modifications need to be synchronized to the Coleo Cloud using the File Syncing preferences for modified content. Note: If an existing Mini-object is incorporated in several Macro-objects, but on synchronization is created as new, those Macro-objects will still point to the original Mini-object, not the newly created one.

1. Modified Content—Create New—My Workspace: Any modified content will be created as new within the user's own workspace. This includes content that the user has modified which was owned by other users. When the user selects "Create New—My Workspace", the existing functions for "Create New—My Workspace" as defined in the Coleo for PowerPoint® Block 220—for Save to Coleo Cloud apply, and the modified Mini-objects for slides and Macro-objects for presentations are substituted.
2. Modified Content—Create New—Owner's Workspace: If the user has set is/her File Syncing preferences for modified content to "Create New—Owner's workspace", then for any modified content in another user's workspace a check will be performed:
   a) Does the user still have Read+co-edit access to that modified content in the Coleo Cloud?
      If yes→Create new in the owner's workspace.
      If no→Create new in user's own workspace. When the user selects "Create New—Owner's Workspace" the existing functions for "Create New—Owner's Workspace" defined in the Coleo for PowerPoint® Block 220 for Save to Coleo Cloud apply, and modified Mini-objects for slides and Macro-objects for presentations are substituted.
   b) For any modified content within the user's own workspace (i.e., the user is the owner), the modified content is created as new content in the user's own workspace.
3. Modified Content—Replace Existing Version—My/Owner's Workspace: If the user has set his/her File Syncing preferences for modified content to "Replace Existing Version—My/Owner's Workspace", then for any modified content in another user's workspace a check will be performed:
   a) Does the User still have Read+co-edit access to that modified content and there is no record of deletion in the Coleo Cloud?
      If yes→Replace the existing version in the owner's workspace.

If no→Create new in the user's own workspace.
  a) When the user selects "Create New—My Workspace", the existing functions as defined for online Coleo for PowerPoint® Block 220, for Save to the Coleo Cloud, apply (e.g., Inheritance).
  For any modified content within user's own workspace (i.e., the user is the owner)→replace the existing version in user's own workspace.
  When the user selects "Replace Existing Version—My/Owner's Workspace", the existing functions as defined in the Coleo for PowerPoint® Block 220 for Save to the Coleo Cloud apply, and modified Mini-objects for slides and Macro-objects for presentations are substituted.

4. Modified Content—Replace Existing Version—Everywhere: If the user has set his/her File Syncing preferences for modified content to "Replace Existing Version—Everywhere", then for any modified content in another user's workspace a check will be performed:
  a) Does the user still have Read+co-edit access to that modified content and there is no record of deletion in the Coleo Cloud?
    If yes→Replace the existing version everywhere.
    If no→Create new in the user's own workspace.
      a) When the user selects "Create New—My Workspace", the existing functions as defined for online Coleo for PowerPoint® Block 220 for Save to the Coleo Cloud apply (e.g., Inheritance.)
      For any modified content within the user's own workspace (i.e., the user is the owner)→replace the existing version everywhere.
      When the user selects "Replace Existing Version—Everywhere", the existing functions as defined in the Coleo for PowerPoint® Block 220 for Save to the Coleo Cloud apply, and modified Mini-objects for slides and Macro-objects for presentations are substituted.

Figure 26:
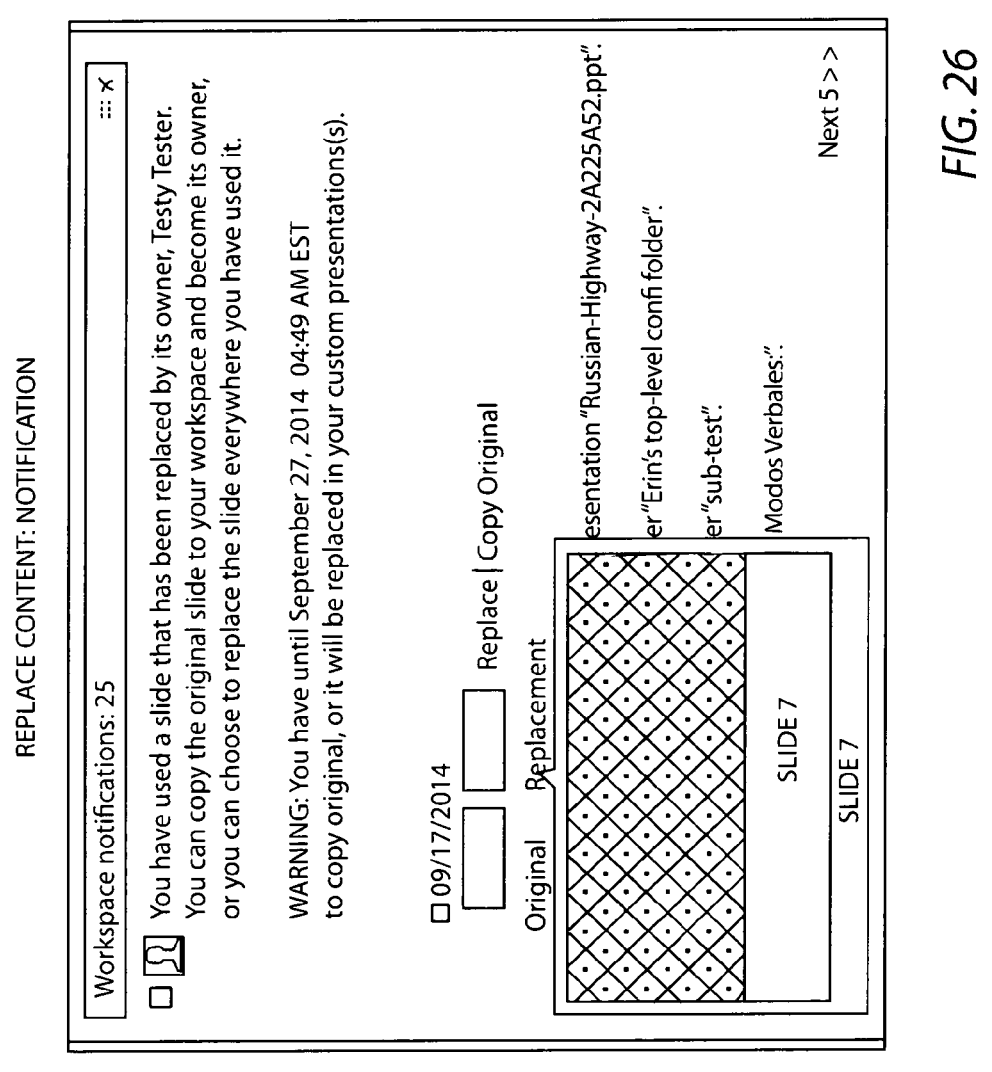

FIG. 26 illustrates the replacement content notification sent to users when the owner replaces content in accordance with one example.

In another example, where the user tags or untags content by placing the content directly into Visual Folders or utilizing the Coleo for PowerPoint® Block 220 where slides and presentations are concerned, the synchronization will check for any tagging and untagging to Visual Folders. Macro- and Mini-objects can be tagged to multiple folders without creating multiple copies in contrast to currently implemented in prior art applications. If Macro- or mini-objects have no tags, they are placed in Untagged.

1. Tagged in Desktop Coleo: Desktop Coleo has content that may be tagged to a Visual Folder since the last synchronization. The Coleo Cloud has that content with no record of deletion, and:
  a) No tagging to that Visual Folder.
  b) Record of untagging from that Visual Folder before the record of tagging in Desktop Coleo.
  c) If any of the above apply→the content is tagged to the corresponding Visual Folder in the Coleo Cloud.
    As an example, the user tags Mini-object A to a Cars Visual Folder in Desktop Coleo. Mini-object A is not tagged to Cars, nor was it untagged from Cars, in the Coleo Cloud. The mini-object will be tagged to Cars in the Coleo Cloud upon synchronization.

2. Untagged in Desktop Coleo: Desktop Coleo has content that was untagged from a Visual Folder since the last synchronization. The Coleo Cloud has that content with no record of deletion, and:
  a) Has tagging to that Visual Folder before the record of untagging in Desktop Coleo.
  b) No record of untagging from that Visual Folder.
  c) If both of the above apply→the content is untagged from that Visual Folder in the Coleo Cloud.
    As an example, the user untags mini-object A from a Cars Visual Folder in Desktop Coleo. Mini-object A is still tagged to Cars in the Coleo Cloud. Mini-object A will be untagged from Cars in the Coleo Cloud upon synchronization.

3. Tagged in the Coleo Cloud: The Coleo Cloud has content that was tagged to a Visual Folder since the last synchronization. Desktop Coleo has that content with no record of deletion, and:
  a) No tagging to that Visual Folder.
  b) Record of untagging from that Visual Folder before record of tagging in the Coleo Cloud.
  c) If any of the above apply→the content is tagged to that Visual Folder in Desktop Coleo.
    As an example, the user tags mini-object A to a Cars Visual Folder in the Coleo Cloud. Mini-object A is not tagged to Cars, nor was it untagged from Cars in Desktop Coleo. Mini-object A will be tagged to Cars in Desktop Coleo upon synchronization.

4. Untagged in the Coleo Cloud: The Coleo Cloud has content that was untagged from a Visual Folder since the last synchronization. Desktop Coleo has that content with no record of deletion, and:
  a) Has tagging to that Visual Folder before record of untagging in the Coleo Cloud.
  b) No record of untagging from that Visual Folder.
  c) If both of the above apply→the content is untagged from that Visual Folder in Desktop Coleo.
    As an example, the user untags mini-object A from a Cars Visual Folder in the Coleo Cloud. Mini-object A is tagged to Cars in Desktop Coleo. Mini-object A is now untagged from Cars in Desktop Coleo upon synchronization.

In one example, the Synchronization Block 224 instantiates immediately after Desktop Coleo is running and synchronization is set to activate. Synchronization will perform the following tasks:

1. Check that the user is still active (e.g., not cancelled or deleted).
2. Check the UTC time.
3. Compare folders structure.
4. Synchronize Visual Folders (i.e., create or delete Visual Folders in the Coleo Cloud or local Visual Folder).
5. Compare the content (both Macro- and Mini-objects) in Desktop Coleo and the Coleo Cloud.
6. Synchronize the content (i.e., push, pull, or delete content in Desktop Coleo or the Coleo Cloud).
7. Check that the Coleo Cloud disk space allowance will not be exceeded.
8. Check that the user's local hard drive space, where Desktop Coleo is installed, will not be exceeded.
9. The order in which synchronizing is performed is:
  a) Check that the user is still active (e.g., not cancelled or deleted).
  b) Check the UTC time.
  c) Visual Folder structure—the various workspaces, trees, and Visual Folders.
  d) Content—Mini-objects, Macro-objects.

In one example, Mini-objects within My Visual Content belong to some parent Macro-object, and Macro-objects can contain Mini-objects that are from another Macro-object. As a result, a Macro-object(s) can be synchronized that is in a Visual Folder which the user chose not to synchronize. As a result, the entire Visual Folder structure for the user's own workspace and all shared workspaces will still be synchronized, but the Visual Folders and content will not be visible to the user in the Desktop Coleo interface nor in Desktop Coleo if the user has selected not to synchronize the content.

In an example, during synchronization, the entire Visual Folders structure is synchronized in the following order:

1. Sync up—All changes made in Desktop Coleo will sync up to the Coleo Cloud. Note that this applies only to the user's own workspace ("My Workspace"), as the user cannot make Visual Folder structure changes to another user's workspace. For enterprise users, this will also sync up changes to groups of which they are a member.
2. Sync down—All changes made in the Coleo Cloud will sync down to Desktop Coleo. This includes both My Workspace and shared workspaces, as well as groups in the case of enterprise users only.

The Smart Delete Block 226 enables users to delete their own Mini-objects from either only their workspaces, or everywhere, including other users' workspaces that are using those Mini-objects. Prior art applications do not allow users to delete Mini-objects from within Macro-objects owned by other users across distributed cloud workspaces. FIGS. 41-45 show the flowchart operations of the Smart Delete function in accordance with one example.

1. Deleting from "My Workspace" removes the Mini-objects(s) only for the user performing the deletion function. Any other user who is using the Mini-object in his/her own workspace will be given the option to copy the Mini-object and make it his/her own. Provenance will be maintained according to rules defined in the Smart Copy Block 216.
2. Deleting "Everywhere" removes the Mini-objects(s) from all the Connected Workspaces where the Mini-objects have been used. This option is useful to retract confidential or incorrect information. To delete "Everywhere":
    a) A request is sent to the server containing the Item type, Delete type, and the Item's ID.
    b) Get the item from the database, set it's Is Deleted flag to true, and update the database.
    c) Get all visual topics for the item's owner, and remove the item from every category in which the item has been categorized. This is applicable to all types of items.
    d) Update the item's owner's category structure in the database.
    e) If the item is a Mini-object, fetch all Macro-objects created by the item's owner and remove the Mini-object from them. Update the Mini-object order for every modified Macro-object.
    f) If the type of deleting is "from my workspace", insert the newly deleted item in the ToBeDeleted collection, which will later be used by the Smart Delete service. Then, return and display a message in the notification area reporting the success status (e.g., "item successfully deleted").
    g) If the type of deleting is "from everywhere", the item is immediately removed from every user's workspace the same way the item is removed from the owner's workspace. Return and display a message (i.e., in the notification area) reporting the success status (e.g., "item successfully deleted").
    h) A notification is sent for each slide deleted with a thumbnail for each Mini-object deleted and the ability to copy the Mini-object if the owner deleted that Mini-object only within his/her workspace. If the owner selected to delete everywhere, a notification is sent to each user of the Mini-object informing him/her that the Mini-object was removed from his/her workspace at the request of the owner.

The Smart View Block 228 enables users to view all uploaded Macro- and Mini-object content and have the ability to filter the uploaded content regardless of the folder in which the content resides. In addition to filtering by content type, users will also be able to view all content within a date range. Prior art applications only allow users to view all Macro-objects within one folder at a time and even then do not provide users with the ability to sort or filter the content by type.

Figure 46:
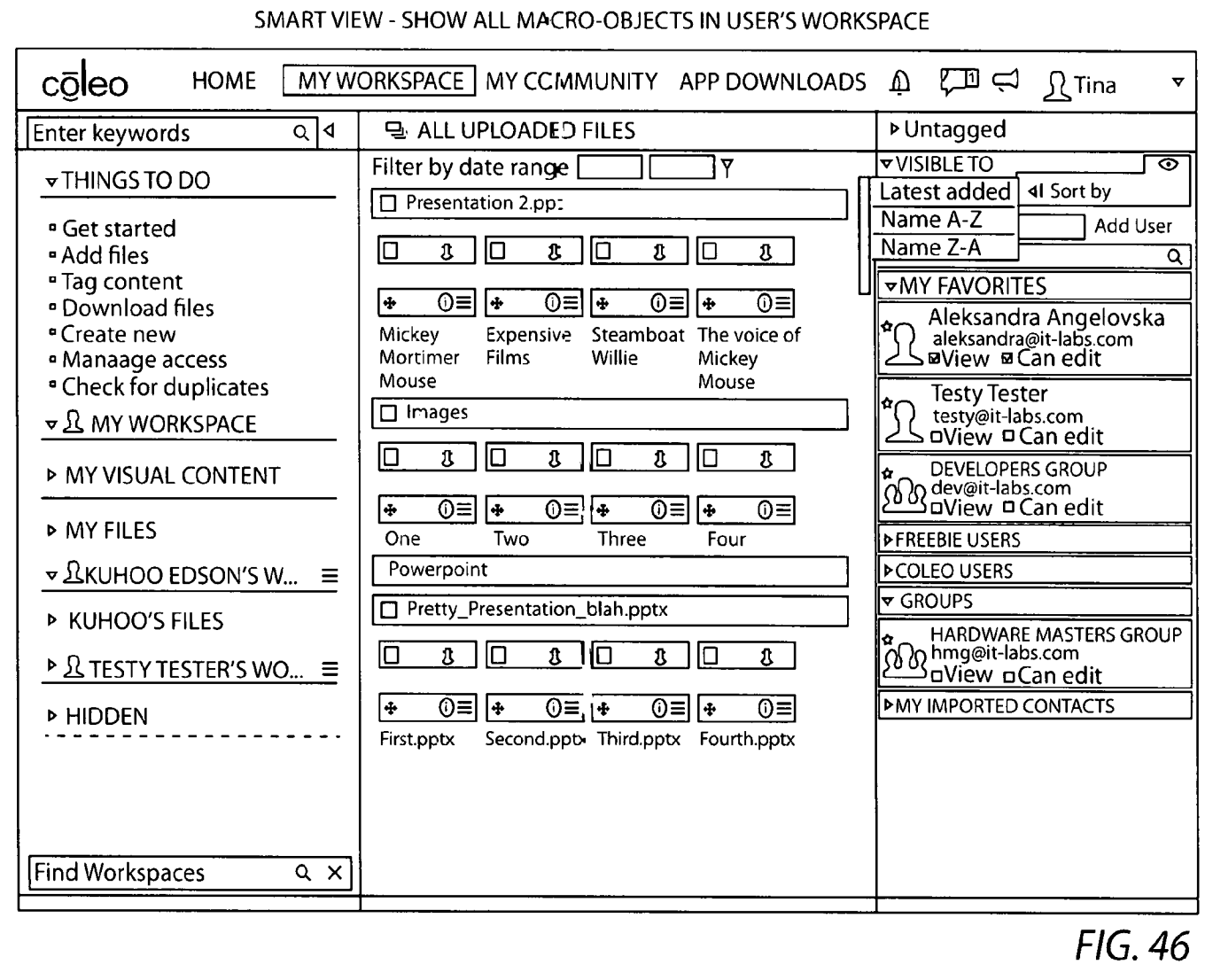

FIG. 46 illustrates one example of the view all functionality.

The Smart Categorization/Tagging Rules Block 230 enables content to be categorized automatically based on user defined rules as the content is being uploaded to the user's workspace. Prior art applications do not provide this capability.

In one example, a user may manage (e.g., add/edit/delete/run) rules by which content will be categorized automatically, by defining the rules. The following icons are displayed to the user for selection:

1. Checkbox—to select all/deselect all
2. Add rule
3. Edit rule
4. Delete rule(s)
5. Run rule(s)
6. If no rules have previously been selected, the first screen will appear with only the icons. If there are existing rules, the rules are displayed one per line. By default, the rules will be shown newest to oldest, but the rules may be sorted by standard sorting options available in main area. For each rule, there is a checkbox to the left, followed by the name of the rule and a status (i.e., Active or Inactive).
7. When a rule is selected, the user has the option to:
    a) Edit the rule
    b) Delete the rule(s)
    c) Run the rule(s)

In one example, the user decides to add a rule. The Add/Edit Rule will be loaded into the right-hand area. A name field at the top of the right-hand area will be displayed with a default name: "NewRule [Date]". The user may edit the Categorization rule name. The Smart Categorization/Tagging Rules Block 230 checks to ensure that the new name does not match an existing Categorization rule name or is blank. If a match occurs, a warning is displayed. Following the check for a matching name, the following actions are performed:

1. Step 1: The user selects the type content to which the categorization rules will be applied.
    a) New content during uploads
    b) Existing Macro-objects in the user's workspace
    c) Existing Mini-objects in the user's workspace.
2. Step 2: The user selects what the categorization will be based upon, e.g., by filename and/or by keywords in a title, text, notes, etc. If the user opts to categorize based upon keyword, he/she may specify if the keyword is within title, text, and/or notes, and by default all will be selected.

[ ] Name contains specific words.
[ ] Content contains specific words (anywhere).
[ ] Content contains specific words in title.
[ ] Content contains specific words in text.
[ ] Content contains specific words in notes
[ ] Content contains specific words in header/footer.
 The user can select on each instance of "specific words" to set words for that condition. After the user has set words, those words will be underlined, and the user can select to add/edit the words set.
 Example 1: —after words set
 Content type: Visual Slides
 with: "blue" or "color" or "black" in the title.
 Example 2—after words set:
 Content type: Uploaded Files—audio, images, and Excel.
 with: cars in the title.
  and "Audi" or "BMW" or "Mercedes" in the title and notes.
3. Step 3: The user is able to define rules for exceptions and will have the same options as in Step 2, above. If only images, audio, and/or video were selected, the option to exclude by keywords will be greyed out and may not be selected.
 Exceptions:
 [ ] Filename contains specific words.
 [ ] Content contains specific words (in the title, text, or notes).
 [ ] Content contains specific words in the title.
 [ ] Content contains specific words in the text.
 [ ] Content contains specific words in the notes.
 Example 1: —after words set
 Content type: Visual Slides
 with: "blue" or "color" or "black" in the title.
 Except if: "specific words" in the title.
 Example 2—after words set
 Content type: Uploaded Files—audio, images, and Excel.
 with: cars in the title.
  and "Audi" or "BMW" or "Mercedes" in the title and notes.
 Except if: "specific words" in the in text, title, or notes.
 As described in Step 2, above, the user may select "specific words" to define the words, and once set, may select the set words to modify them.
4. The user can select for which Visual Folders content will be categorized. Based upon what was selected in 1, above, the appropriate tree structure(s) will be displayed for the user's own workspace (My Workspace) and any groups of which user is a member.
 Categorize to
  My Workspace
   [tree name]
    [Visual Folder structure]
   [Groupname] Group
    [tree name]
     [Visual Folder structure]
 Upon selection of any Visual Folder, a Categorize Rule definition will be displayed as to what the user selected in addition to selections in Steps 1, 2, and 3. The order of selected Visual Folders will match that shown in Step 4, not the order in which the Visual Folder was added. If the user changes his/her selection, the selection will update here as well. Each Visual Folder marked will be displayed on a separate line. If the user unmarks a Visual Folder in Step 4, the Visual Folder will be removed from the definition.
 Example 1:
 Content type: Slides
 with: "blue" or "color" or "black" in the title.
 Except if: "teal" in the title.
 Categorize it to:
  My Workspace>Visual Slides>Colors
  My Workspace>Visual Slides>Paints>Blue Period
  Some Group>Visual Slides>Bright
 Example 2:
 Content type: Uploaded Files—audio, images, and Excel.
 with: cars in the title.
  and "Audi" or "BMW" or "Mercedes" in the title and notes.
 Except if: "specific words" in the in text, title, or notes.
 Categorize it to:
  Other Group>Uploaded Files>Cars>Manufacturers
  Some Group>Uploaded Files>Cars
5. Step 5—Options
 The user may turn the rule on/off and set the rule to run on existing content. If a rule is turned on, the rule will always be run on content being uploaded.
  If the rule is set to run on existing content, the rule will run once.
  Options
  "Finish rule"
  [ ] Run this rule on already uploaded content—checkbox.
  [ ] Make active (i.e., the rule will run on content being uploaded)—checkbox.

FIGS. 47-49 illustrate the user interfaces for viewing rules and adding rules for tagging while content is being uploaded or for content already existing in the owner's workspace in accordance with one example.

Figure 50:
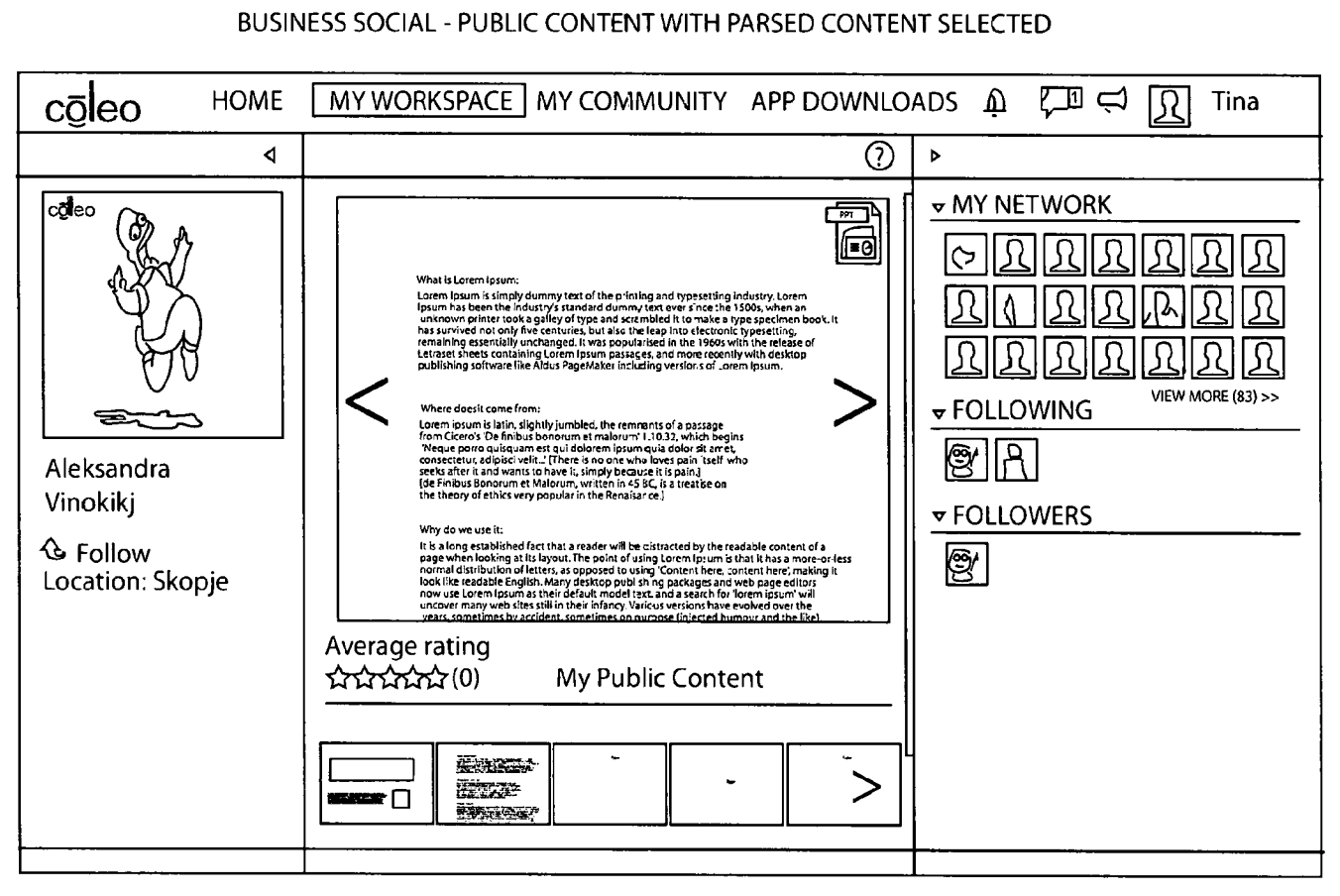

The Smart Business Social Graph Block 232 enables people who share content with each other to take advantage of their online business social communities to gain access to content to which they would not otherwise have access. The Smart Business Social Graph Block 232 enables users to see profiles of users in their connected workspaces and the connected workspaces of those other users. Users have visibility into the tree structure of each workspace and will have the ability to request access to any folder they can view. Users will be able to learn who is part of their connected workspaces as well as who is following them and who they are following with a comprehensive view of all social activity. Users will be able to view all public content belonging to other users from a single user interface. Also, users will be able to view pending access requests as well as the status of their requests for access to content owned by other users. Prior art file sharing applications do not provide users the ability to request access to specific content nor do they provide a single view to the users of their business social status and activity as defined in the Smart Business Social Graph Block 232. FIG. 50 shows how users can view and navigate the profiles of users in their connected workspaces.

In one example, if a user wants to view the status of his/her pending requests for access:
 1. A request is sent to the API.
 2. Fetch all requests from the Collaborations Collection for the OwnerID.
 3. Return all found objects as a response and display the objects in the Your Pending Requests section in the right hand area.

In another example, if a user wants to view the status of other users' requests for sharing:
 1. A request is sent to the API.
 2. Fetch all requests from Collaborations Collection for the UserID.
 3. Return all found objects as a response and display the objects in the Other's Request for Sharing.

In one example, if a user wants to Accept other users' requests to share (i.e., Visual Folder/Content):
1. A request is sent to the API containing the ID of the user who has requested access, the ID of the requested content/Visual Folder and the type of the requested content/Visual Folder.
2. Fetch the object from the Collaborations Collection for the OwnerID who requested access that was sent to Content.
3. Update the Collaborations Collection. Depending of the type in the request, add a new read permission for the user.
4. If the requested access is for a Visual Folder:
    a) Check in which tree the Visual Folder belongs.
    b) Add the new permission for the user where the UserID=ID of the user who has requested access and set the Permission level=Read.
5. If the requested access is for a Mini-object:
    a) Find the object in the Mini-object permission collection.
    b) Add the new permission for the user where the UserID=ID of the user who has requested access and set the Permission level=Read.
6. If the requested access is for a Macro-object:
    a) Find the object in the Macro-object permission collection.
    b) Add the new permission for the user where the UserID=ID of the user who has requested access and set the Permission level=Read.

In an example, if the owner rejects other's request (Visual Folder/Content):
1. A request is sent to the API containing the ID of the user who has requested access to a Visual Folder/content and the ID and the type of the requested Visual Folder/content.
2. Fetch the object from the Collaborations Collection and set the "is pending" flag to false.
3. For this object, update the IsPending flag to false.
4. Update the Collaborations Collection.
5. Send a notification to the requestor informing him/her of the decision made by owner.

In one example, the owner can view his/her own workspace:
1. My Profile: Display My Connected Workspaces
    a) A request is sent to the API.
    b) Create a new list of users, and find users with whom the logged-in user has shared content.
    c) Get all distinct User IDs from the Mini-object permissions collection.
    d) For every found UserID from the previous step, find the user in the Users Collection with this ID and add the UserID to the newly created users' list from step b.
    e) Get all distinct UserIDs from the Macro-object permissions Collection
    f) For every found UserID in the previous step e, find the user in the Users Collection with that UserID.
    g) Check if the user already exists in the list from step b.
      If yes, no action taken.
      If no, add the user in the users' list.
      Find users with whom the logged-in user has shared Visual Folders.
    h) Fetch all distinct UsedDs from the Visual Topic Tree permissions collection.
    i) For every found UserID in the previous step h, find the user in Users Collection with that UserID.
    j) Return the users' list as a response, and the users will be displayed under the My Connected Workspaces section in the right hand area.
2. My Profile: To the user whom is the owner is following:
    a) A request is sent to the API.
    b) Find the logged-in user in the Follow Collection.
    c) Get the list of following UserIDs of the user.
    d) Create a new list of following users.
    e) For every UserID in the list from step c find the user with that ID in the Users Collection and add the UserID to the newly created users' list from step d.
    f) Return the list of following users from step 4 as a response and display the users.
3. My Profile: Display users following the owner
    a) A request is sent to the API.
    b) Find all distinct OwnerIDs from follow collection
    c) Create new list of users.
    d) For every found OwnerID from step c, find the user with this id in the Users Collection and add it to the list of users from step c.
    e) Return the list of followers for the logged user as response and these users will be displayed under Followers Section in the right hand area.

For all three of these sections (i.e., My Connected Workspaces, Following and Followers), mini avatars are shown. Hover reveals First and Last Name and Location. Select goes to the user's Public Profile.

In an example, a user views someone else's Public Profile.
1. In the main area, below public content, the user will view the other user's workspace, excluding any Confidential Visual Folders to which other users do not have access. The user can (i.e., select the arrow) expand the trees and Visual Folders and contract the other user, just as in My Workspace.

In one example, for any Visual Folder to which the user has Read permissions, the user may subscribe to that Visual Folder by selecting the "Subscribe" icon, to the right of the Visual Folder name. If the user selects the "Subscribe" icon:
1. A request is sent to the API containing the ID of the owner's Public Profile, the ID of the Visual Folder, and the type of Visual Folder.
2. Find the Visual Folder in Visual Topics Tree permissions/Macro-object Topics Tree permissions/Collection depending on the type of the Visual Folder.
3. Check if the user with the ID sent in the request has Read permissions for this Visual Folder.
    If the user has Read permission:
      i. Find the owner with the OwnerID
    If the user is null:
      i. A new object is created with the OwnerID.
4. Save the object in the Subscription Collection.
    If the user is not null:
      i. A new subscription user object is created for the owner with the UserID.
5. Update the object in the subscription collection.

In one example, for any Visual Folder to which the user does not have Read permissions, the user may request access to that Visual Folder by selecting the "Request Access" icon. When the user selects the "Request Access" icon:
1. A request is sent to the API containing the ID of the owner's Public Profile and the ID of the Visual Folder for which the user requests access.
2. Find the object in Collaborations Collection for the OwnerID.
3. If the object—null, a new pending request for sharing is created.

4. If the object is not null, create a new User Collaboration object for the UserID
5. Update the Collaborations Collection.

In an example, users can rate Macro- and Mini-objects belonging to other users who have shared their content with the user as follows:

"Average Rating" with five starts to the right, highlighted as rated, 0-5, and total ratings.

"Your Rating" with five blank starts to the right. The user may hover to see the stars highlight, with a tooltip explanation, e.g., "Very Good", and may select the star to set his/her rating. The user may rate as many times as he/she wants. Note that owners may not rate their own content.

Rate Content: When a user rates someone's content:
1. A request is sent to the API containing the ID of the user who owns that content, the ID of the content, and the rating value.
2. Determine if the object for the logged-in user exists in the Rating Collection (OwnerID=ServiceContext.Current.User.Id).
3. If the object does not exist, create a new object where OwnerID=ServiceContext.Current.User.Id, and create a new RatingContent object for this owner where UserID=ID of the user sent in the request, ContentID=ID of the content sent in the request, and RatingValue=value sent in the request.
4. If the object exists, add a new RatingContent object for this owner where: UserID=ID of the user sent in the request, ContentID=ID of the content sent in the request, and RatingValue=value sent in the request.
5. Update the Rating Collection.

In one example, a user can add comments to any Macro- or Mini-object that is shared with that user. The user may write a comment in the comment text area by entering a maximum 500 characters.

When the user selects the "Add comment" button:
1. A request is sent to the API containing the ID of the loaded content and the written comment that was posted.
2. Find the object in the Comments Collection, where ContentID=ID of the content sent in the request.
3. Create a new Comment object.
4. Add the comment object to the list of comments for the content objects.
5. Save the object in the database.
6. Fetch the user object and time stamp of the added comment and return in the response.
7. Show the new comment as newest below the comment text area.

In an example, delete will be visible on user's own comments. When delete is selected, the following occurs:
1. A request is sent to the API containing the ID of the content loaded in the metadata, the ID of the comment, and the ID of the poster.
2. Find the object in the Comments Collection, where ContentID=ID of the content sent in the request.
3. Find the comment with the commentID sent in the request and UserPosterID=ID of the poster sent in the request.
4. Delete the found comment. That will automatically delete all sub-comments (i.e., replies) to that comment.
5. Save the object in the database.
6. Return a response confirming that the action is successful.
7. Remove that comment and any sub-comments from the metadata.

In one example, "Reply" will be visible only on first-level comments. If "Reply" is selected:
1. A request is sent to the API containing the ID of the content loaded in the metadata, the ID of the comment to which "Reply" is selected, and the comment and the comment that was posted.
2. Find the object in Comments Collection where ContentID=ID of the content sent in the request.
3. From the list of comments for that content, find the comment object with ID=ID of the comment to which the "Reply" pertains.
4. Set DateModified of the comment to DateTime.UtcNow.
5. Create a new reply.
6. Add the new reply to the list of replies for the comment.
7. Save the object in the database.
8. Here will follow the steps for creating social notifications that will be sent to the owner of the content and to the poster of the first-level comment. The steps will be described below.
9. Create a response containing the user object along with the timestamp of creating the reply, and return the response.
10. Display the reply under the appropriate comment.

In one example, when a reply is added to a comment, a social notification is sent to the poster of first-level comment "[Avatar] [First Last] posted a reply to your comment. See the comment."
1. Get the UserPosterID of the first-level comment.
2. Create social notification with:
   OwnerID=ServiceContext.Current.User.Id
   DateCreated=DateTime.UtcNow
   Seen=false
   User ID=UserPosterId
   Type=ReplyToComment
   ContentType=the type of the content loaded in metadata.
3. Save the social notification in the Social Notifications database.

In another example, if the user who received notification selects the link from the social notification to view, the following steps take place:
1. A request is sent to the API containing the content ID, the ID of the comment, and the ID of the user who posted the comment.
2. Find the comment with the comment ID sent in the request.
3. Create a comment object the same as the found object, and add new empty list as the list of replies.
4. From the found comment from step 2, find the reply with the ID sent in the request.
5. Add the found reply object to the newly created list of replies to the previously created comment from step 3.
6. Return this object as a response and show the pop up which will display the original comment of the user with the reply below it.

The Manage Workspaces Block 234 enables users to manage and organize their connected workspaces (single and groups) in the Coleo Cloud by hiding workspaces, adding workspaces to favorites, etc. This capability helps users hide content from some users in order to better organize their workspaces and to give prominence to content from certain users. Prior art file sharing applications do not enable organizing content by the owner of content and thus do not enable any of the capabilities defined in the Manage Workspaces Block 234.

In one example, workspaces and groups are divided into Shown and Hidden. Hidden will be below all shown workspaces and groups, and by default will be collapsed. Shown workspaces and groups will be displayed above Hidden. By default, all existing shared workspaces, new shared workspaces, and new groups will be in Shown until Hidden.
1. Hiding and showing workspaces and groups—A user may hide a workspace or group by going to: [Workspace/Group Name]>⇒>Hide. If selected, the workspace or group will be moved under "Hidden". A user may choose to show a workspace or group again by going to: Hidden (select to expand)>[Workspace/Group Name]>⇒>Show. If selected, the workspace or group will be moved to "Shown." The user can drag-and-drop a shown workspace/group into Hidden, and drag-and-drop a hidden workspace/group into Shown. When a user hides/shows a workspace/group, the workspace/group is added in the default alphabetical (A-Z) order.
2. My Favorites: By default no workspace and/or group will be underneath this section. Users/groups that are in My Favorites will be sorted alphabetically, A-Z. The user can add/remove a workspace/group to My Favorites, excluding My Workspace:
    a) Not in My Favorites—⇒>Add to My Favorites
        Only shown in workspaces/groups that are not in My Favorites.
        If selected, the workspace/group is set to a favorite.
            a) If the workspace/group is under Shown, the workspace/group will be moved to My Favorites.
            b) If the workspace/group is under Hidden, the workspace/group will not be moved to My Favorites and remains in Hidden.
    b) In My Favorites—⇒>Remove from My Favorites
        Only shown on users/groups that are in My Favorites.
        If selected, the workspace/group is no longer set to a favorite.
            a) If the workspace/group is under Shown, the workspace/group is removed from My Favorites and placed back in Shown in alphabetical order below My Favorites.
            b) If the workspace/group is under Hidden, the workspace/group remains in Hidden.
3. My Favorites and Hidden interactions: If a workspace or group is in My Favorites and then is set to Hidden, the workspace/group will be moved to Hidden. The designation as a favorite will not be removed. As such, if the user moves the workspace/group back to Shown, the workspace/group will be placed under My Favorites again. If a workspace or group is in Hidden and is set to My Favorites, the workspace/group will set it to a favorite, but the workspace or group will not be moved under My Favorites until the user opts to make the workspace/group Shown, as described above.

In one example, the user may search for users within connected workspaces by simply typing the first few letters of the user's name. Even if the user workspace is hidden, the Manage Workspaces Block 234 will reveal the user, and the searcher can unhide the user if desired.

Figure 54:
Figure 55:
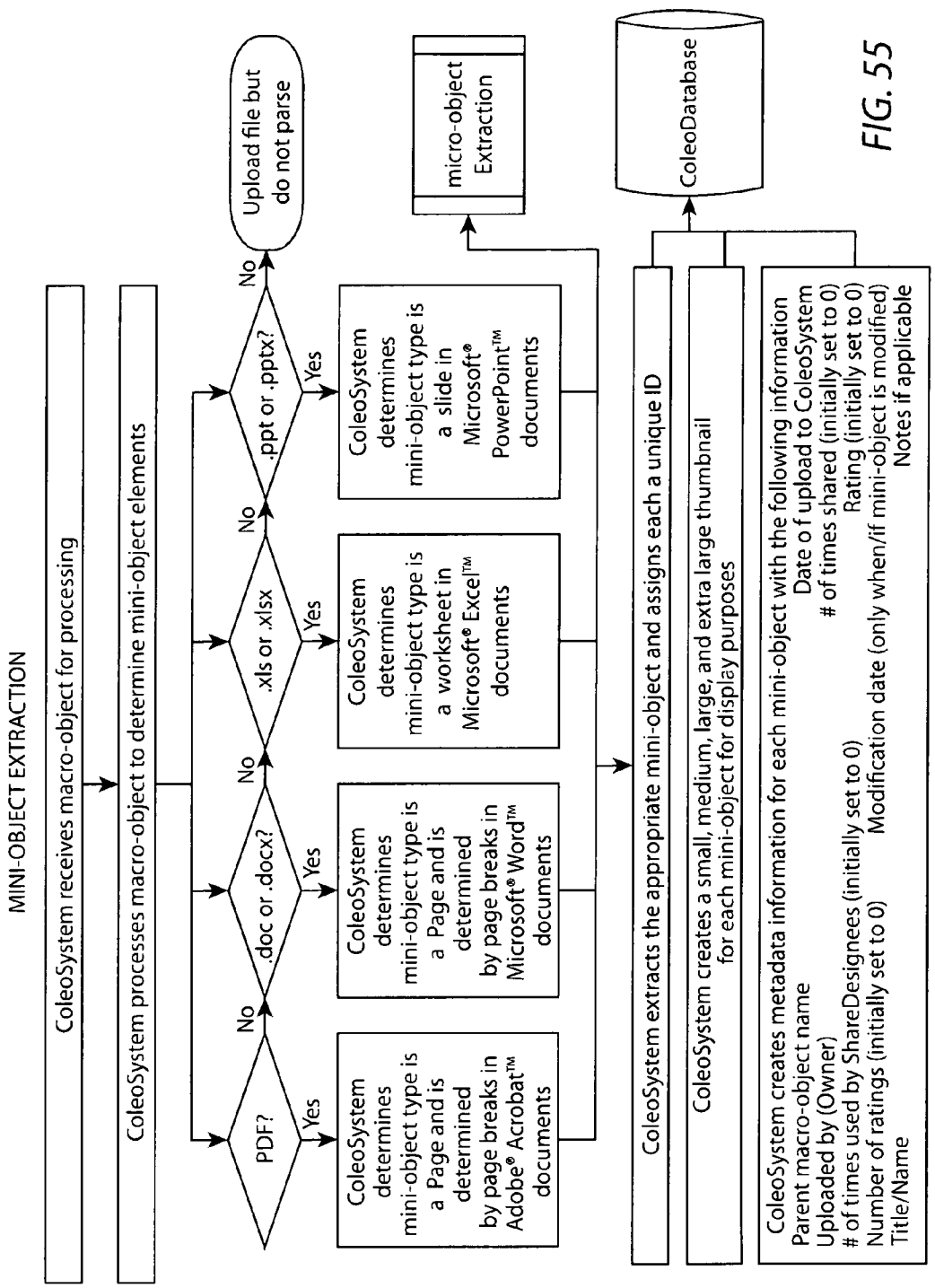
Figure 56:
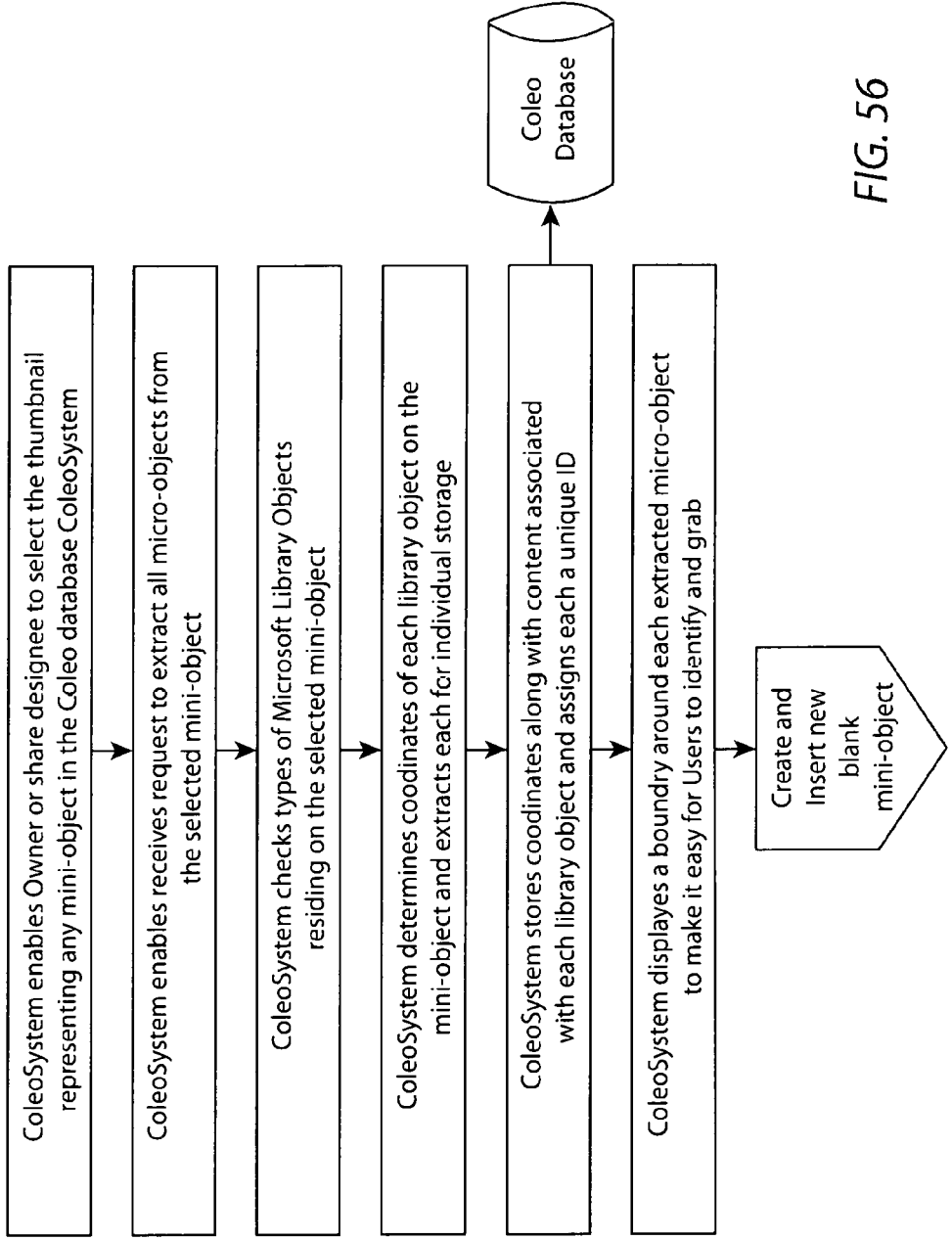
Figure 57:
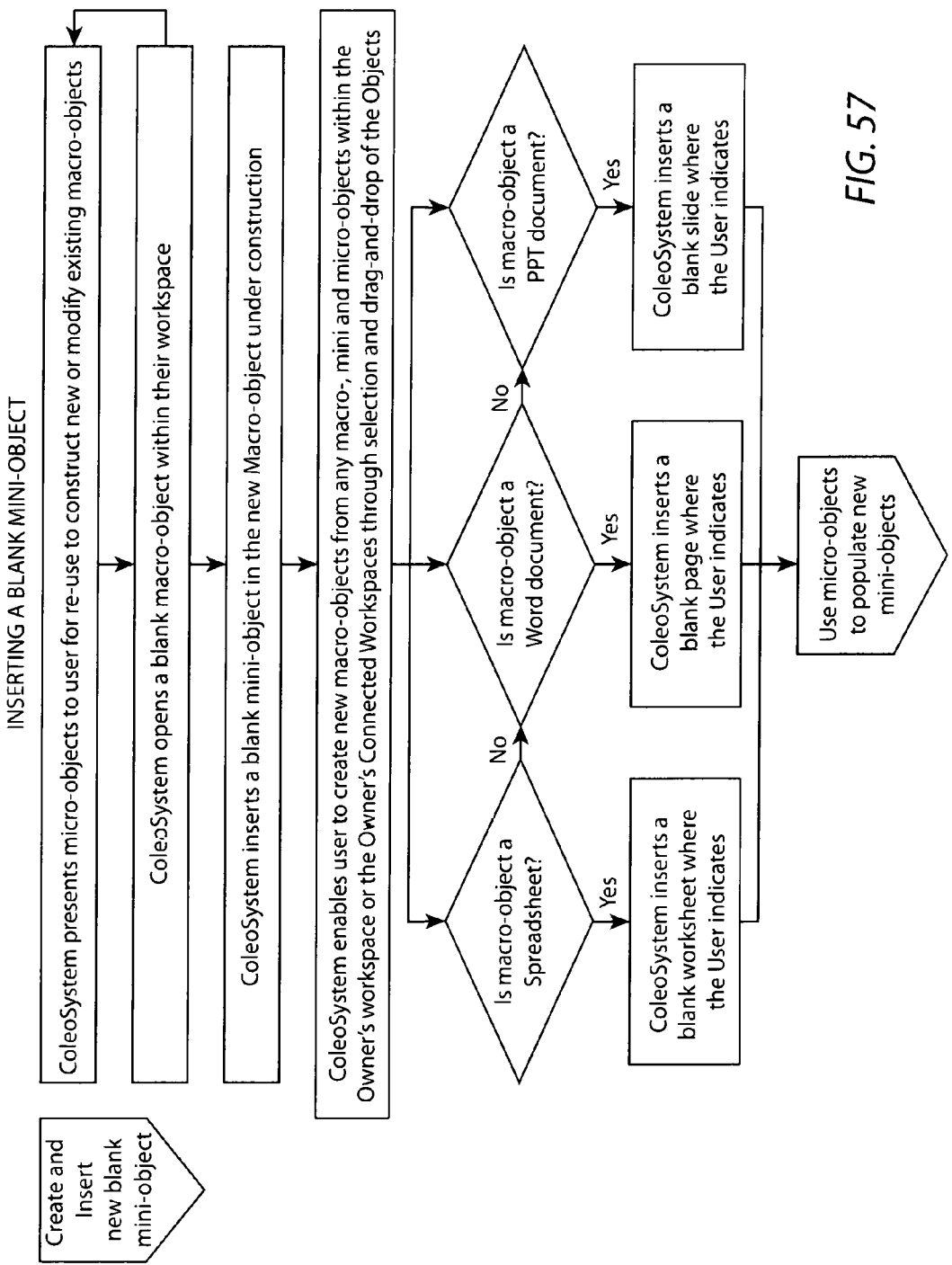

FIG. 54 illustrates how users can manage their connected workspaces or view content within a specific folder in accordance with one example.

In an example, the user may wish to view all public content belonging to another user in their connected workspaces or within the connected workspace of that user.
1. For each piece of public content owned by the user:
    a) Audio and video will only have a thumbnail and not be capable of being played.
    b) Each Mini-object thumbnail will have an icon with the file type.
    c) Forward/backward arrows will be available for users to go forward/backward.

In one example, the user may wish to subscribe to specific content in another user's workspace. Every time the user adds content to the folder, the subscriber will receive a notification. The user may subscribe to another user's folder by selecting the subscribe icon next to the folder(s) to which he/she wants to subscribe. The user may unsubscribe at any time.

In another example, the user may want to navigate My Workspace as well as all Connected Workspaces. This is accomplished in a manner similar to navigation utilizing the Desktop Coleo Block 222.

Figure 51:
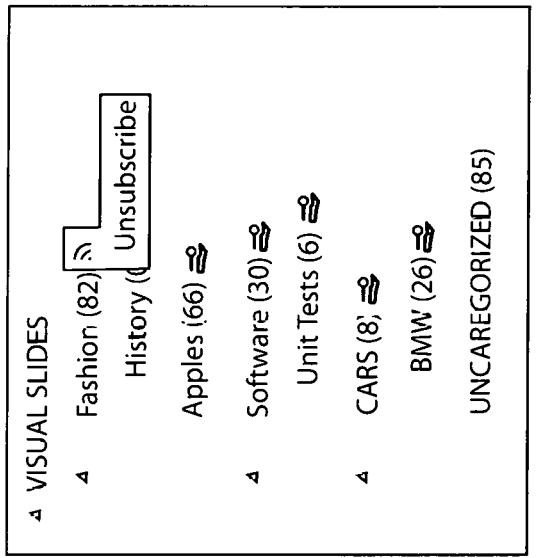
Figure 53:
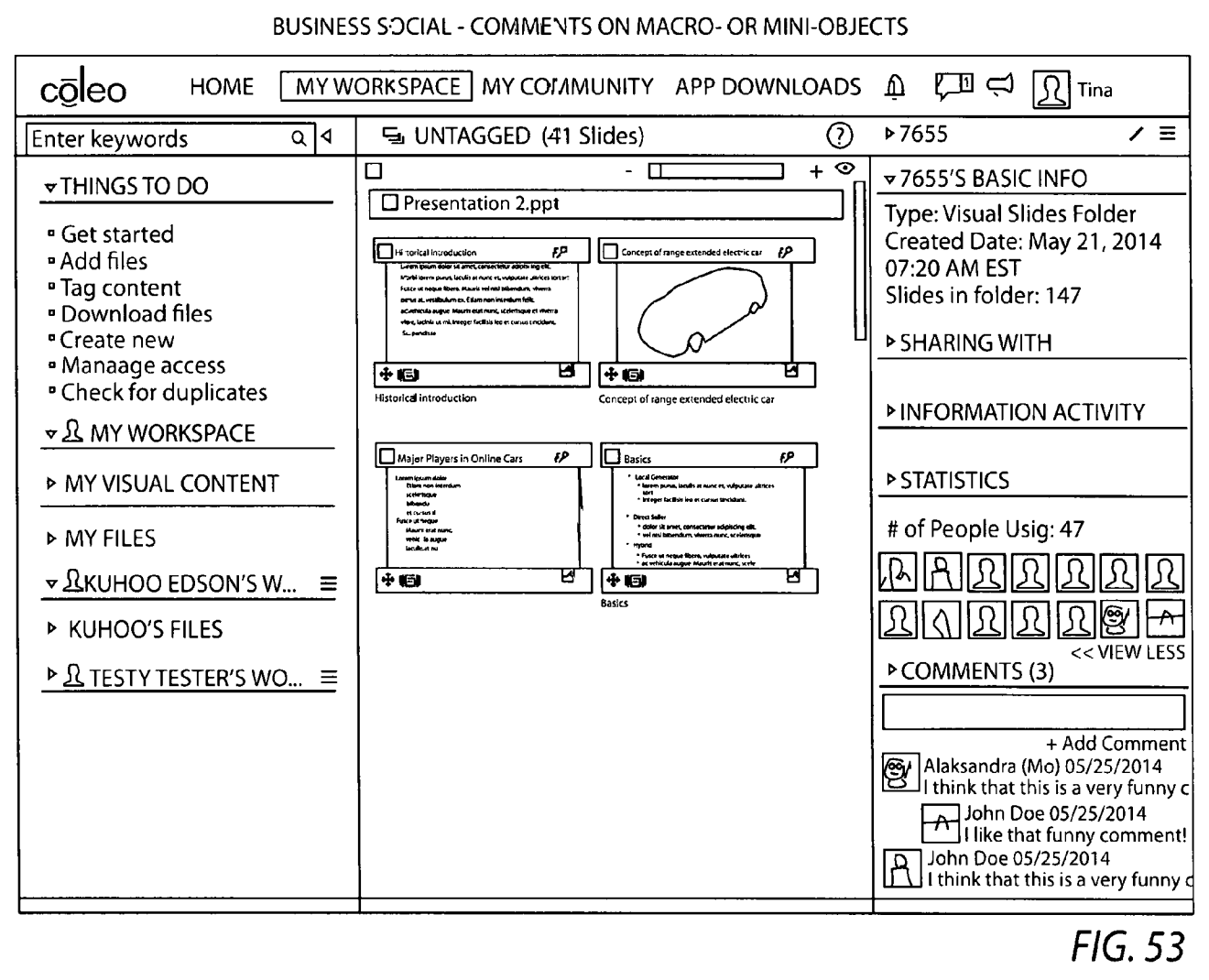

FIG. 51 illustrates how a user can subscribe/unsubscribe to another user's workspace folders. FIG. 53 shows how users can comment and respond to comments made on Macro- or Mini-objects in accordance with one example.

The Smart Statistics Block 236 enables useful statistics to be provided to the owner of content. Prior art file sharing applications do not provide the statistics provided by the Smart Statistics Block 236.

In one example, the owner can track his/her content to which access has been granted by viewing general statistical information, running a report, or by selecting the content and viewing the metadata area (i.e., the right-hand area.)
1. Right-hand metadata information: In the right-hand metadata area of My Workspace, the user can view every other user who has access to any specific content (e.g., folders, Macro-objects, Mini-objects, etc.), including whether the permission is Read, co-edit, or Read+co-edit access. For each Mini-object selected, the user can also view every user who has used that Mini-object in his/her own Macro-object. A section will be displayed in the right-hand metadata, called "Statistics", which includes:
    a) "# of People Using the mini-object"—This is a linked object that expands to show the avatars of all the users of that Mini-object. The count is calculated for each unique user that has added that Mini-object to a Macro-object. If a single user adds the item of content to numerous custom files, the count is still considered as "1".
    b) Avatars—The avatars of users of the item of content are displayed below the statistic, with the option for owner to view the name of the user and go to their Public Profile.
    c) The owner is able to revoke access/remove the Mini-object from that user's Macro-objects from directly below the avatar.

In an example, the owner can find the following statistics directly in the user interface:
1. Duplicate content—link: Loads the Duplicate Visual Folders in My Workspaces tab.
2. Untagged content—link: Loads the Untagged Visual Folders in My Workspaces tab.
3. Total Macro-objects—link: Loads "View All Available Files" in My Workspaces tab.
4. All content to which the user has access in his/her Connected Workspaces—not a link.
5. # of the user's Mini-objects used by other users—link: Loads all Mini-objects that are used by other users. The owner may then revoke access, replace, modify, or delete Mini-objects in every Macro-object in which the Mini-object(s) exist.
6. Total available Macro-objects—link: Loads all Macro-objects utilizing the Smart View Block 228.

In another example, in addition to the metadata area and the general statistics, the owner can view more detailed information by running a number of reports from the main area of Home, including how many times the content owned by him/her has been re-shared, how many times that content was used directly versus indirectly (i.e., resulting from re-shares), content that has not been used for some time, content that has not be shared, etc. An item is considered re-shared if a user other than the owner shared that content. An item is considered to be used directly if that content is used by the owner or another user who was granted access to the content by the owner. Otherwise, the content is considered to be used indirectly.

1. The "Old content" report enables the user to view the last modification date of content and then opt to delete that content.
2. The "Unused content" report enables the user to view his/her own content which has not been used for some period of time and then opt to delete that content. The user can set the following options when running this report:
    a) Content type—Checkboxes with "All" marked by default (and all options marked). The user can select/de-select Macro-object types as desired, but at least one type of content must be selected in order to run the report.
    b) Length of time since last use—drop down, with options.
    c) Exclude My Stats—checkbox, marked by default.
        If unmarked, an item of content is not returned if the owner has used that content in a file other than the parent file.
        If marked, an item of content will be returned, even if the owner has used that content in a file other than the parent file.
    d) If a report is run, the results are based upon selected parameters.
        No results—"No results found!"
        Results—columns are provided for the following:
            a) Content Type—name of the content type. There is a default column for sorting in alphanumerical order.
            b) Modified Date—the last modified date of the content.
            c) Content Title—the content's title. This is what is displayed below the thumbnail in the main area when navigating Visual Folders. If there is no content title, Content Title is left blank. There is a secondary column for sorting in alphanumerical with a blank first.
            d) Last Used Date—the last (i.e., most recent) date any user has added the item of content to his/her file.
            e) Days Since Last Used—a count of days since any user has added the item of content to his/her file. For example, if the Last Used Date is 2014-05-01, and today is 2014-05-30, the count is "30".
        Actions
            a) Delete—icon; If selected, utilizes a delete confirmation dialog asking if the user wants to delete in "My Workspace" or "Everywhere". Depending upon the user's selection, appropriate action is taken.
3. The "Content not reshared" report enables the user to view hos/he own content that has not been reshared for some period of time and then opt to delete the content. The same filters as described above apply.
4. The "Reshared content" report enables the user to view his/her own content that has been reshared, the recipients of the reshared content, and then opt to revoke access for a user(s) or delete the content. The same filters as described above apply.
    a) No results—"No results found!"
    b) Results—columns for the following:
        Content Type—name of the content type. The default column for sorting is alphanumerical order.
        Modified Date—the last date that the content was modified.
        Content Title—the content's title. This is what is displayed below the thumbnail in the main area when navigating Visual Folders. If there is no content title, the Modified Date is left blank. The secondary column for sorting is alphanumerical with a blank first.
        Grantor—the name of the user who has granted access to that item of content to one or more other users.
            Sub-rows—Because there can be more than one user that reshared the item of content, these are sub-rows within the row for that item of content.
        Grantee—name of a user to whom the grantor has granted access one or more times to that item of content.
            Sub-sub-rows—Because there can be more than one user to whom the grantor granted access to that item of content, the sub-sub-rows are sub-rows of the grantor column.
        # of Times Reshared—a count of the number of times the grantor has reshared that specific item of content to one or more grantees. For example, if the grantor reshared "Slide A" with five grantees, the # of Times Reshared is "5".
            Sub-rows—Because there can be more than one grantor who reshared the item of content to one or more grantees, these are sub-rows within the row for that item of content.
        Total—a sum of the total number of times reshared by all grantees. For example, if UserA reshared the item f content three times, UserB six times, and UserC one time, the total is 3+6+1=10.
        The user cannot sort by this row.
        Actions
            Revoke access—icon: If selected, the selection confirms that the owner wants to revoke access for that particular grantee. If confirmed, access to that item of content is revoked for that grantee.
            Delete—icon: If selected, the selection launches a standard delete confirmation dialog asking if the user wants to delete in "My Workspace" or "Everywhere". Depending upon user's selection, appropriate action is taken.
5. The "Used content" report enables owners to view their content that has been used by other users in their own Macro-objects, and enables the owner to opt to revoke access for a user(s) or delete the content. The same filters described above apply.
    No results—"No results found!"
    Results—columns for the following:
        Content Type—name of the content type. The default column for sorting is alphanumerical.
        Modified Date—the last date that the content was modified.
        Content Title—the content's title. This is what is displayed below the thumbnail in the main area when navigating Visual Folders. If there is no content title, Content Title is left blank. The secondary column for sorting is alphanumerical with a blank first.

Used By—the name(s) of the user(s) who have added that item of content into one or more files. The user(s) can include the owner of the content, if he/she has used that item of content in another file. Used By does not include the parent file.

# of Times Used—the count of the number of times that the specific user has added the specific item of content to one or more of his/her files. For example, if the user added "Slide A" to five presentations, # of Times Used is "5".

Total—a sum of the total number of times that the item of content is used by all users. For example, if UserA used the item of content three times, UserB six times, and UserC one time, the total is: 3+6+1=10.

Actions—the same actions as above apply (i.e., revoke access or delete content)

FIG. 52 illustrates one example of how the results from the used by reports are shown to the user.

The Object Extraction Block 238 extracts Micro-objects (e.g., charts, tables, images, text, graphics, etc.) from within Mini-objects. The Object Extraction Block 238 enables users to pick and choose these extracted Micro-objects and add them to empty Mini-objects from directly within the Coleo Cloud. Prior art applications do not offer this capability. In fact, the only way users can pick and choose objects from documents to add to other documents is by opening each document, locating the object they wish to copy, copy and then paste that object into their new document. They have to repeat this procedure for every object in every document that they desire to reuse.

Figure 58:
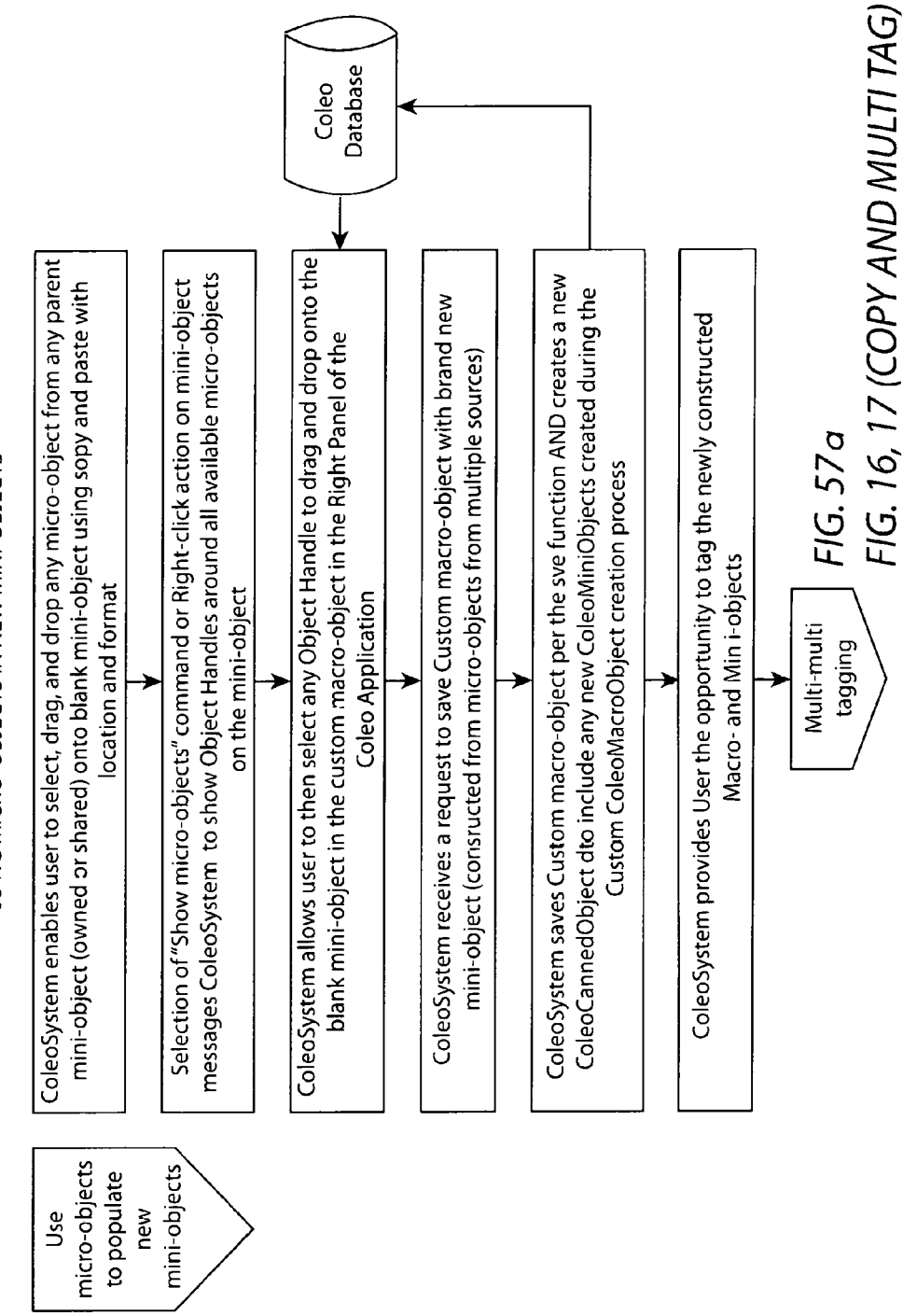
Figure 59:
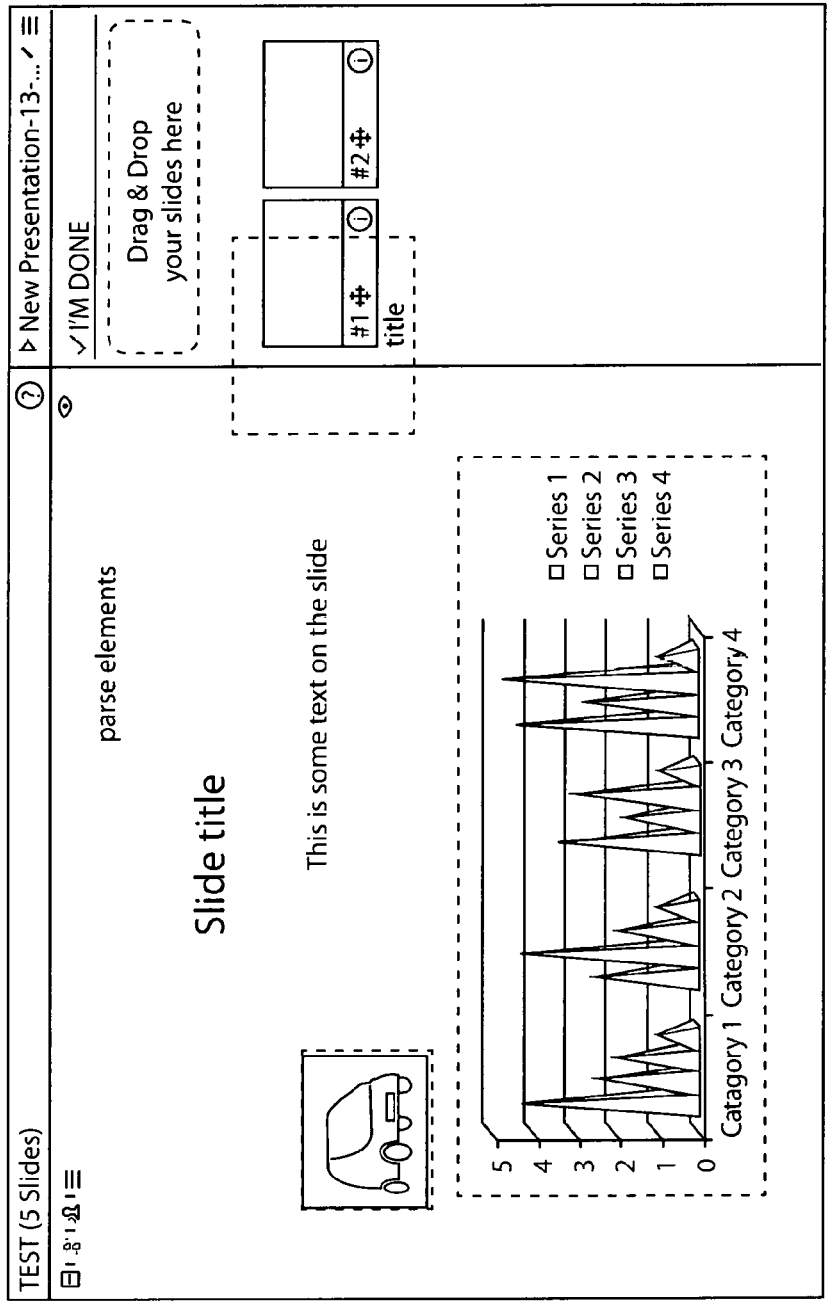

FIGS. 55-76 illustrate a flowchart for Mini- and Micro-object extraction performed by the Micro-Object Extraction Block 238 in accordance with one example. FIG. 58 shows examples of Micro-objects extracted in accordance with the functionality shown in FIGS. 55-76. FIG. 59 shows how users can select objects from one Mini-object and add them to other Mini-objects in accordance with one example.

The Remove Duplicate Block 240 enables users to identify and eliminate duplicate Mini-objects from within their Macro-objects, ensuring every Mini-object has only one copy existing in a user's workspace so when changes are made to that one copy, the changes are reflected within every Macro-object in which the Mini-object resides. Users can chose to have the function ignore Mini-object elements such as headers, footers, and templates so the focus is only the content. In addition, users may choose to search for Mini-objects matching their own across other users' workspaces and replace their own copies of Mini-objects with those found in other workspaces. In this scenario, any changes owners of the copied Mini-objects make to their Mini-objects will be reflected across all the workspaces that perform the find duplicate and replace function. Prior art applications only enable finding of exact duplicates including templates, headers, and footers within only one type of document, namely, presentations, and within only a single central database.

Figure 60:
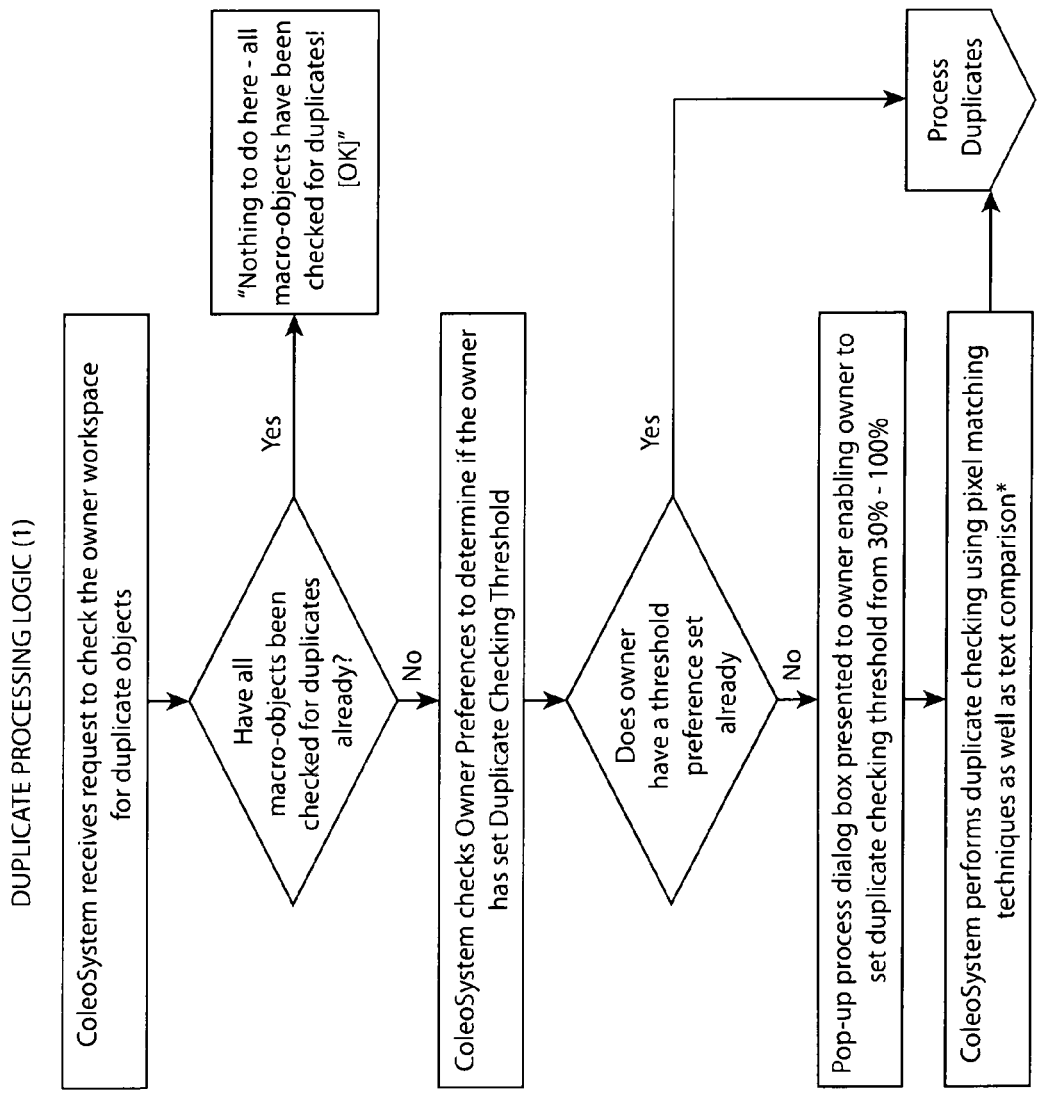
Figure 61:
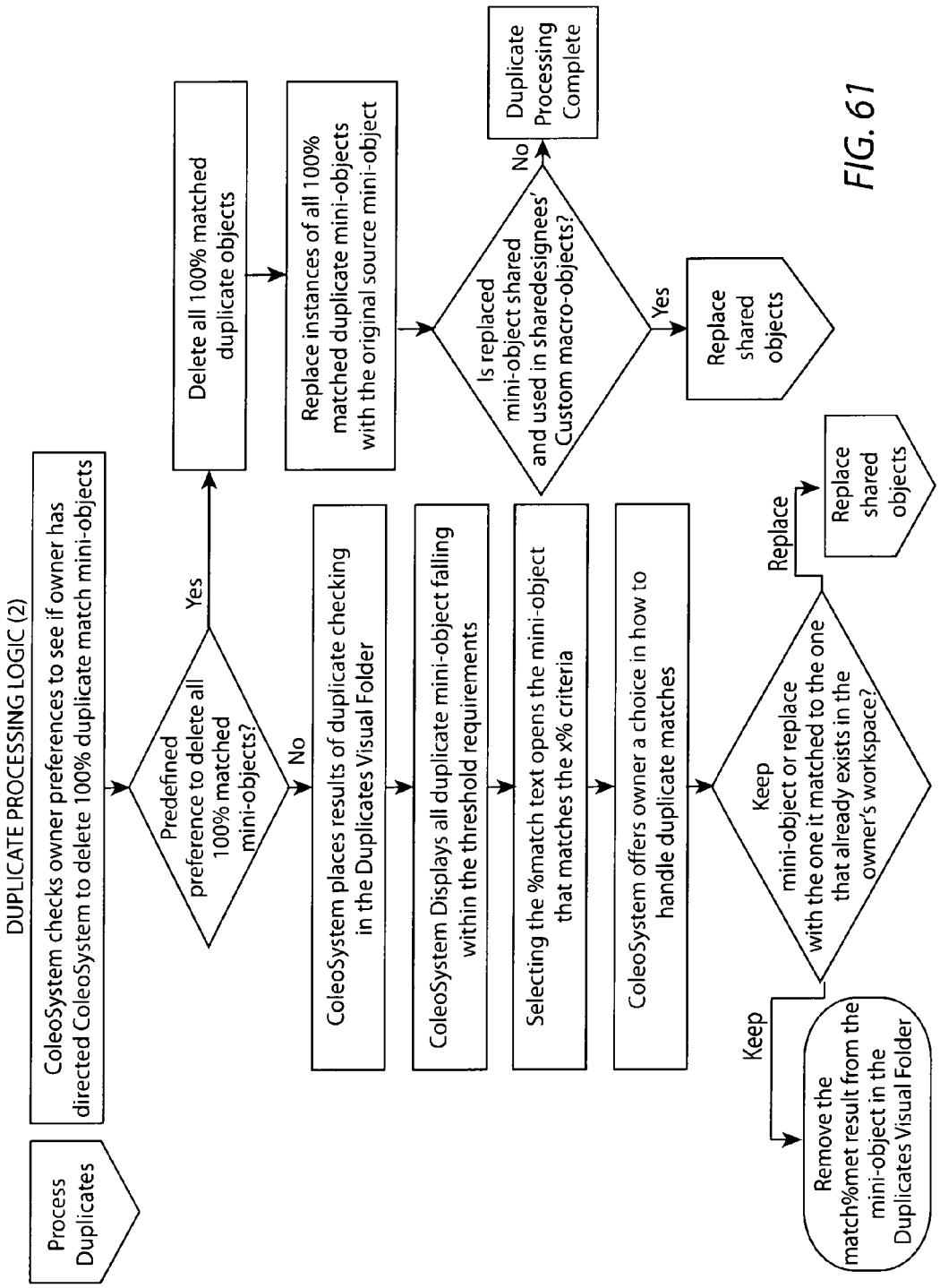

FIGS. 60-61 show the flowchart operations performed when finding redundant content in accordance with one example.

In another example, when a user opts to check for duplicates, there is the option to ignore templates and/or graphics in a presentation or header and/or footer information in other file types when looking for similar content. An item of content is considered a match if it is an exact (i.e., 100%) match. If the user chooses the option to ignore information such as header/footer, that exact match is based on what remains. This can be both text, images, formulas, graphs, tables, etc. When comparing Mini-objects, the Remove Duplicate Block 240 compares the same types of content. For example, a slide is compared against other slides, and a spreadsheet is compared against other spreadsheets. If the user has chosen to include everything, the template/graphics or header/footer must match exactly as well as the main content. If the user has chosen to exclude either some portion, such as the template, then all other content must match, but the template is not checked. This means that the comparison is not done pixel by pixel but by template, header, footer, text, and/or images. Once identified, duplicates are placed in a reserved folder called Duplicates and are displayed and acted upon in a similar manner to the results returned utilizing the Smart Search and Find Similar Blocks 208 and 212, respectively.

The Create New Document Block 242 enables users to mix-and-match Mini-objects from multiple workspaces across the distributed cloud databases from within the Coleo Cloud interface to create new Macro-objects. Prior art cloud file sharing applications do not provide this capability.

In one example, the user selects the Create New File option which opens a blank document for the user to populate. The user can then select and drag-and-drop thumbnails from all My Workspace or from any or all Connected Workspaces to create the new document.

1. If all Mini-objects selected are the same content type, a brand new document will be created for that type of Mini-object. For example, if all objects the user selects are slides, a PowerPoint® presentation will be generated when the user selects "I'm Done". If all Mini-objects selected are Microsoft Word pages, then a Word document will be generated when the user selects "I'm Done".
2. If the Mini-objects selected are different content types, an Adobe® Acrobat® PDF file will be created.

Referring again to FIG. 1, the devices 102, 104 might include, for example, one or more processors, controllers, control modules, or other processing devices. Modules might be implemented using a general-purpose or special-purpose processing engine such as, for example, a microprocessor, controller, or other control logic. The modules may be connected to a bus, although any communication medium can be used to facilitate interaction with other components of computing modules or to communicate externally.

The devices 102, 104 might also include one or more memory modules, simply referred to herein as main memory. For example, preferably random access memory (RAM) or other dynamic memory, might be used for storing information and instructions to be executed by a processor. Main memory might also be used for storing temporary variables or other intermediate information during execution of instructions to be executed by processor. A computing module might likewise include a read only memory (ROM) or other static storage device coupled to bus for storing static information and instructions for the processor.

The devices 102, 104 might also include one or more various forms of information storage mechanisms, which might include, for example, a hard disk, floppy disk, magnetic tape, cartridge, optical disk, a CD, DVD, or Blu-ray, or other fixed or removable medium that is read by, written to, or accessed by a media drive. As these examples illustrate, the storage media can include a computer usable storage medium having stored therein computer software or data.

In alternative examples, the information storage mechanism might include other similar instrumentalities for allowing computer programs or other instructions or data to be loaded into the computing module. Such instrumentalities might include, for example, a fixed or removable storage unit and an interface. Examples of such storage units and interfaces can include a program cartridge and cartridge interface, a removable memory (e.g., a flash memory or other removable memory module) and memory slot, a PCMCIA slot and card, and other fixed or removable storage units and interfaces that allow software and data to be transferred from the storage unit to the computing module.

The devices 102, 104 might also include a communications interface such as an Ethernet, network interface card, WiFi-Media, IEEE 802.XX, or other interface, or other communications interface. Data transferred via communications interface might typically be carried on signals, which can be electronic, electromagnetic (which includes optical), or other signals capable of being exchanged by a given communications interface. These signals might be provided to the communications interface via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

In general, the routines executed to implement the examples of the present invention may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the present invention. Moreover, while the present invention has been described in the context of fully functioning computers and computer systems, persons skilled in the art will appreciate that the various examples of the present invention are capable of being distributed as a program product in a variety of forms, and that the present invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and flash drives among others.

Figure 62:
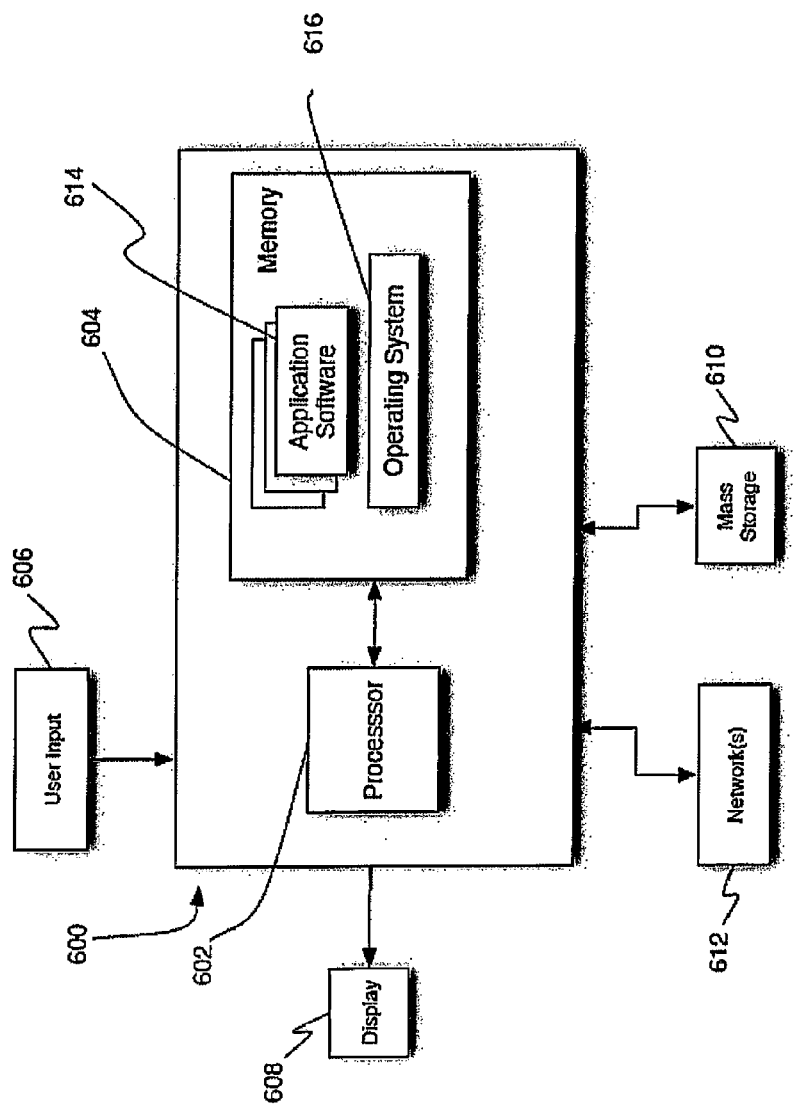
FIG. 62 shows a high-level block diagram of hardware for implementing a server device and/or a client device in accordance with an example of the present invention.

FIG. 62 shows an example of hardware 600 that may be used to implement any of the devices 104,108. The hardware 600 typically includes at least one processor 602 coupled to a memory 604. The processor 602 may represent one or more processors (e.g., microprocessors), and the memory 604 may represent random access memory (RAM) devices comprising a main storage of the hardware 600, as well as any supplemental levels of memory, e.g., cache memories, non-volatile or back-up memories (e.g., programmable or flash memories), read-only memories, etc. In addition, the memory 604 may be considered to include memory storage physically located elsewhere in the hardware 600, e.g., any cache memory in the processor 602, as well as any storage capacity used as a virtual memory, e.g., as stored on a mass storage device 610.

The hardware 600 also typically receives a number of inputs and outputs for communicating information externally. For interface with a user or operator, the hardware 600 may include one or more user input devices 606 (e.g., a keyboard, a mouse, a scanner, etc.) and a display 608 (e.g., a Liquid Crystal Display (LCD) panel). For additional storage, the hardware 600 may also include one or more mass storage devices 610, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware 600 may include an interface with one or more networks 512 (e.g., a local area network (LAN), a wide area network (WAN), a wireless network, and/or the Internet among others) to permit the communication of information with other computers coupled to the networks. It should be appreciated that the hardware 600 typically includes suitable analog and/or digital interfaces between the processor 602 and each of the components 604, 606, 608, and 612 as is well known in the art.

The hardware 600 operates under the control of an operating system 614, and executes various computer software applications, components, programs, objects, modules, etc., indicated collectively by reference numeral 616, to perform the functions described above.

Although the present invention has been described with reference to specific examples, it will be evident that various modifications and changes can be made to these examples without departing from the broader spirit of the present invention. Accordingly, the specification and drawing figures are to be regarded in an illustrative sense rather than in a restrictive sense.

While various examples of the present invention have been described above, it should be understood that they have been presented by way of example only, and not of limitation. Likewise, the various diagrams may depict an example architectural or other configuration for implementation of the present invention, which is done to aid in understanding the features and functionality that can be included in the present invention. The present invention is not restricted to the illustrated example architectures or configurations, but the desired features can be implemented using a variety of alternative architectures and configurations. Indeed, it will be apparent to persons skilled in the art how alternative functional, logical, or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various examples be implemented to perform the recited functionality in the same order unless the context dictates otherwise.

"Example" is used to provide exemplary instances of the item in discussion, not an exhaustive or limiting list thereof; the terms "a" or "an" should be read as meaning "at least one", "one or more", or the like; and adjectives such as "conventional", "traditional", "normal", "standard", "known", and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to persons skilled in the art, such technologies encompass those apparent or known to the skilled artisan now or at any time in the future.

The presence of broadening words and phrases such as "one or more", "at least", "but not limited to", or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various examples set forth herein are described in terms of exemplary block diagrams, flow charts, and other illustrations. As will become apparent to persons skilled in the art after reading this document, the illustrated examples and their various alternatives can be implemented without confinement to the illustrated examples. For example, block diagrams and their accompanying description should not be construed as mandating a particular architecture or configuration. Also, techniques, devices, subsystems, and methods described and illustrated in the various examples as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable persons skilled in the art, upon or subsequent to studying the examples disclosed herein, may be made without departing from the spirit and scope of the present technology.

Various examples of the present disclosure, as discussed above, may be practiced with steps and/or operations in a different order, and/or with hardware elements in configurations which are different than those which are disclosed. Therefore, although the technology has been described based upon these examples, it is noted that certain modifications, variations, and alternative constructions may be apparent and well within the spirit and scope of the technology. Although various examples of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A cloud-based system comprising:
   at least one local client device communicatively coupled, via an intermediate network, with a server device, comprising an information processing, organization, and management engine, and distributed local and cloud databases across separately owned user accounts;
   wherein the information processing, organization, and management engine comprises:
   a Connected Workspaces Block to determine how an owner of information Macro-objects, Mini-objects, and Micro-objects has selected to share content by granting one or more users secure access to information of the owner, and how the information is visually displayed for the one or more users who have access to said information and how said one or more users are able to use, manage, and manipulate said information, and to organize and display available users with whom the owner may share said information; a Grant Access/Smart Sharing Block to connect a workspace of the owner to a workspace of at least one of the users; a Smart Security Block to enable the owner to apply security to Macro-objects and Mini-objects, to apply inheritance rules, to protect information which is marked confidential, to notify the owner when confidential information is re-shared, and to enable the owner to revoke access by at least one of the users who has access to the confidential information via a re-share; a Make Content Non-Editable Block to determine if the owner has selected to prevent at least one of the users from editing portions of a Macro-object or Mini-object to which the at least one user has been granted access by enabling the owner to mark portions of Macro-objects or Mini-objects as uneditable by users; a Smart Search Block to enable at least one of the users to find and access the information across multiple distributed cloud-based user accounts or across an enterprise; a Display Search Results Block to determine how search results are displayed and to enable at least one of the users to request access to results to which the at least one user does not have access; a Find Similar Block to enable at least one of the users to search across connected workspaces or the enterprise to find content similar to content of the at least one user, including searching for an image within searched content, and to replace content of the at least one user, in the workspace of the at least one user or every workspace where the content has been used, with content located during the search; a Smart Version Management Block to maintain versions of Macro-objects and Mini-objects as changed by at least one of the users who has been enabled to edit the Macro-objects and Mini-objects through permissions and to enable the owner of the information to roll back to a previous version of a Mini-object that has been modified; a Smart Copy/Create New Block to enable at least one of the users to copy content owned by another user to the workspace of the at least one user and maintain provenance of the content including attribution to allow an original creator of content to be identified; a Smart Replace Block to enable the owner of original Mini-objects to replace the original Mini-objects of the owner with replacement Mini-objects of a same type and to propagate the replacement Mini-objects across workspaces and within Macro-objects that included the original Mini-objects; a Slide Presentation Block to enable at least one of the users to access and use connected workspaces from the cloud or from a desktop of the at least one user directly from within a slide presentation to access Macro-objects and Mini-objects to which the at least one user has been granted access within the slide presentation to create new Macro-objects or modify existing Macro-objects and Mini-objects; a Desktop Block to control synchronization of owned and shared content to the client device of the owner including synchronization of Macro-objects and Mini-objects and to enable at least one of the users to grant access to other users directly from the local database of the at least one user; a Synchronization Block to synchronize both Macro-objects and Mini-objects of at least one of the users once the at least one user is connected to the network; a Smart Delete Block to enable at least one of the users to delete Macro-objects and Mini-objects of the at least one user from either only the workspace of the at least one user, or in every workspace where the Macro-objects and Mini-objects are used, including Macro-objects in the workspace of another user; a Smart View Block to enable at least one of the users to view uploaded Macro-object and Mini-object content and filter the uploaded content regardless of a folder in which the uploaded content resides; a Smart Categorization/Tagging Block to enable content to be categorized automatically based on user defined rules as the content of at least one of the users is being uploaded to the workspace of the at least one user; a Smart Business Social Graph Block to enable the users who share content to take advantage of online business social communities of the users to gain access to content to which said users would not otherwise have access; a Manage Workspaces Block to enable the users to manage and organize connected workspaces of said users in the cloud by hiding workspaces or adding workspaces to favorites; a Smart Statistics Block to enable statistics to be provided to the owner of information respecting use of said information by at least one of the users; an Object Extraction Block to extract Macro-objects and Mini-objects as well as Micro-objects from within the Mini-objects; a Remove Duplicate Block to enable at least one of the users to identify and eliminate duplicate Mini-objects from within Macro-objects of the at least one user, ensuring every Mini-object has only one copy existing in the workspace of said at least one user so when changes are made to the one copy, the changes are reflected within every Macro-object in which the Mini-object resides; and a Create New File Block to enable at least one of the users to mix-and-match Mini-objects from multiple workspaces across the distributed cloud databases from within the cloud to create new Macro-objects.

2. A system as in claim 1 wherein the Find Similar Block enables the at least one user to search across connected workspaces or the enterprise to find content similar to content of said at least one user using a percentage range of similarity specified by said at least one user.

3. A system as in claim 1 wherein the Slide Presentation Block further comprises a font crawler function which enables at least one of the users to modify fonts in an entire presentation and for all presentations within the workspace of the at least one user.

4. A system as in claim 1 wherein the Smart View Block enables at least one of the users to view content within a date range selected by said at least one user.

5. A system as in claim 1 wherein the Remove Duplicate Block enables at least one of the users to select to ignore Mini-object elements comprising headers, footers, or templates.

* * * * *